US 11,490,188 B2

(12) United States Patent
Zhang et al.

(10) Patent No.: US 11,490,188 B2
(45) Date of Patent: Nov. 1, 2022

(54) ACOUSTIC OUTPUT DEVICE AND COMPONENTS THEREOF

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/233,526

(22) Filed: Apr. 18, 2021

(65) Prior Publication Data

US 2021/0243518 A1    Aug. 5, 2021

Related U.S. Application Data

(63) Continuation of application No. PCT/CN2020/070545, filed on Jan. 6, 2020.

(30) Foreign Application Priority Data

Apr. 30, 2019  (CN) .......................... 201910364346.2
Sep. 19, 2019  (CN) .......................... 201910888067.6
Sep. 19, 2019  (CN) .......................... 201910888762.2

(51) Int. Cl.
*H04R 1/02*         (2006.01)
*H04R 1/10*         (2006.01)
(Continued)

(52) U.S. Cl.
CPC .......... *H04R 1/1016* (2013.01); *G02C 11/10* (2013.01); *G06F 3/16* (2013.01); *G06F 3/162* (2013.01);
(Continued)

(58) Field of Classification Search
CPC . H04R 1/00; H04R 1/02; H04R 1/026; H04R 1/028; H04R 1/10; H04R 1/1008;
(Continued)

(56) References Cited

U.S. PATENT DOCUMENTS

2005/0013447 A1    1/2005  Crump et al.
2006/0113143 A1*   6/2006  Ishida ................... H04M 1/035
                                                                 181/148
(Continued)

FOREIGN PATENT DOCUMENTS

CN         201774654 U       3/2011
CN         202710871 U       1/2013
(Continued)

OTHER PUBLICATIONS

International Search Report in PCT/CN2020/070545 dated Apr. 15, 2020, 5 pages.
(Continued)

*Primary Examiner* — Thang V Tran
(74) *Attorney, Agent, or Firm* — Metis IP LLC

(57) ABSTRACT

The present disclosure relates to an acoustic output device. The acoustic output device may include an earphone core, a controller, a power source, and a flexible circuit board. The earphone core may include at least one low-frequency acoustic driver configured to output sounds from at least two first guiding holes and the at least one high-frequency acoustic driver configured to output sounds from at least two second guiding holes. The controller may be configured to direct the at least one low-frequency acoustic driver to output the sounds in a first frequency range and direct the at least one high-frequency acoustic driver to output the sounds in a second frequency range. The power source may be configured to provide power supply for the earphone core.
(Continued)

The flexible circuit board may be configured to connect the earphone core with the power source.

19 Claims, 25 Drawing Sheets

(51) Int. Cl.

| | |
|---|---|
| *H04R 3/00* | (2006.01) |
| *H04R 1/26* | (2006.01) |
| *H04R 1/44* | (2006.01) |
| *G06F 3/16* | (2006.01) |
| *H04M 1/03* | (2006.01) |
| *H04M 1/78* | (2006.01) |
| *H04R 1/24* | (2006.01) |
| *H04R 1/28* | (2006.01) |
| *H04R 3/02* | (2006.01) |
| *H04R 1/34* | (2006.01) |
| *H04W 4/80* | (2018.01) |
| *H04R 1/22* | (2006.01) |
| *H04R 5/02* | (2006.01) |
| *G10L 21/038* | (2013.01) |
| *H04R 5/033* | (2006.01) |
| *H04S 7/00* | (2006.01) |
| *G02C 11/00* | (2006.01) |
| *H04R 1/38* | (2006.01) |
| *H04R 9/06* | (2006.01) |
| *G10L 21/0208* | (2013.01) |
| *G02C 11/06* | (2006.01) |
| *G10L 21/0216* | (2013.01) |

(52) U.S. Cl.
CPC ........... *G06F 3/165* (2013.01); *G10L 21/0208* (2013.01); *G10L 21/038* (2013.01); *H04M 1/03* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .. H04R 1/1016; H04R 1/1025; H04R 1/1041; H04R 1/105; H04R 1/1075; H04R 1/1083; H04R 1/22; H04R 1/24; H04R 1/245; H04R 1/26; H04R 1/28; H04R 1/34; H04R 1/342; H04R 1/345; H04R 1/347; H04R 1/38; H04R 1/44; H04R 1/2803; H04R 1/2807; H04R 1/2811; H04R 1/2896; H04R 3/00; H04R 3/02; H04R 5/005; H04R 5/02; H04R 5/033; H04R 5/0335; H04R 9/06; H04R 2201/103; H04R 2410/05; H04R 2420/07; G10L 21/0208; G10L 21/038; G10L 2021/02166; G02C 11/06; G02C 11/10; H04S 7/304; H04S 2400/11; G06F 3/162; G06F 3/165; H04W 4/80; H04M 1/03; H04M 1/78

See application file for complete search history.

(56) References Cited

U.S. PATENT DOCUMENTS

| | | | |
|---|---|---|---|
| 2012/0177206 A1* | 7/2012 | Yamagishi | H04R 1/345 381/26 |
| 2013/0051585 A1* | 2/2013 | Karkkainen | H04R 1/1075 381/151 |
| 2016/0302012 A1 | 10/2016 | Sprague et al. | |
| 2017/0201823 A1 | 7/2017 | Shetye et al. | |
| 2018/0091283 A1 | 3/2018 | Howes et al. | |
| 2018/0295449 A1* | 10/2018 | Morgan | H04R 1/105 |
| 2019/0052954 A1* | 2/2019 | Rusconi Clerici Beltrami | H04R 5/02 |
| 2020/0252708 A1* | 8/2020 | Zhu | H04R 1/08 |
| 2021/0160606 A1 | 5/2021 | Zhang et al. | |

FOREIGN PATENT DOCUMENTS

| | | | | |
|---|---|---|---|---|
| CN | 102780938 B | 4/2015 | | |
| CN | 204859471 U | 12/2015 | | |
| CN | 102647646 B | 3/2016 | | |
| CN | 205081951 U | 3/2016 | | |
| CN | 106231462 A | 12/2016 | | |
| CN | 107071607 A | * | 8/2017 | ........... H04R 1/1091 |
| CN | 107820169 A | 3/2018 | | |
| CN | 207070281 U | * | 3/2018 | ........... H04R 1/1058 |
| CN | 207340117 U | 5/2018 | | |
| CN | 207340125 U | 5/2018 | | |
| CN | 109495809 A | 3/2019 | | |
| CN | 109511065 A | 3/2019 | | |
| CN | 105208480 B | 7/2019 | | |
| CN | 209184799 U | 7/2019 | | |
| CN | 209267805 U | 8/2019 | | |
| CN | 209358728 U | 9/2019 | | |

OTHER PUBLICATIONS

Written Opinion in PCT/CN2020/070545 dated Apr. 15, 2020, 6 pages.

* cited by examiner

1010

1020

ACOUSTIC OUTPUT DEVICE AND COMPONENTS THEREOF

CROSS-REFERENCE TO RELATED APPLICATION

This application is a Continuation of International Application No. PCT/CN2020/070545, filed on Jan. 6, 2020, which claims priority of Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the contents of each of which are incorporated herein by reference.

TECHNICAL FIELD

The present disclosure relates to acoustic output devices, in particular, to components and a flexible printed circuit (FPC) in an acoustic output device.

BACKGROUND

With the development of speaker technology, electronic products (e.g., earphones, MP3, etc.) have been widely used. Acoustic output devices may have different product forms. For example, an acoustic output device may be integrated on a pair of glasses (e.g., sunglasses, swimming glasses, etc.) or may be immobilized inside an ear or near the ear of a user through a structure (e.g., an ear hook). With the more diversified functions of the acoustic output device, there are more and more multiple internal modules and wires in the acoustic output device, and the wiring of the acoustic output device may be complicated. The complicated wiring may greatly occupy an internal space of the acoustic output device, and unreasonably distributed wires may interfere each other, thereby affecting the sound quality of the acoustic output device. Therefore, it is desirable to provide an efficient wiring method to simplify the wiring of the acoustic output device and improve the sound quality of the acoustic output device.

SUMMARY

The present disclosure provides an acoustic output device. The acoustic output device may include an earphone core, a controller, a power source, and a flexible circuit board. The earphone core may include at least one low-frequency acoustic driver and at least one high-frequency acoustic driver. The at least one low-frequency acoustic driver may be configured to output sounds from at least two first guiding holes, and the at least one high-frequency acoustic driver may be configured to output sounds from at least two second guiding holes. The controller may be configured to direct the at least one low-frequency acoustic driver to output the sounds in a first frequency range and direct the at least one high-frequency acoustic driver to output the sounds in a second frequency range. The second frequency range may include one or more frequencies higher than one or more frequencies in the first frequency range. The power source may be configured to provide power supply for the earphone core. The flexible circuit board may be configured to connect the earphone core with the power source.

In some embodiments, a first distance may be between the two first guiding holes, a second distance may be between the two second guiding holes, and the first distance may exceed the second distance.

In some embodiments, the first distance may be not greater than 40 millimeters, and the second distance may be not greater than 7 millimeters.

In some embodiments, the first distance may be at least twice of the second distance.

In some embodiments, the first frequency range may include frequencies lower than 650 Hz, and the second frequency range may include frequencies higher than 1000 Hz.

In some embodiments, the first frequency range may overlap with the second frequency range.

In some embodiments, the controller may include an electronic frequency division module configured to divide an audio source signal to generate a low-frequency signal corresponding to the first frequency range and a high-frequency signal corresponding to the second frequency range. The low-frequency signal may drive the at least one low-frequency acoustic driver to generate the sounds in the first frequency range, and the high-frequency signal may drive the at least one high-frequency acoustic driver to generate the sounds in the second frequency range.

In some embodiments, the electronic frequency division module may include at least one of a passive filter, an active filter, an analog filter, or a digital filter.

In some embodiments, the at least one low-frequency acoustic driver may include a first transducer. The at least one high-frequency acoustic driver may include a second transducer. The first transducer and the second transducer may have different frequency response characteristics.

In some embodiments, the first transducer may include a low-frequency loudspeaker and the second transducer may include a high-frequency loudspeaker.

In some embodiments, at least two first acoustic routes may be formed between the at least one low-frequency acoustic driver and the at least two first guiding holes. At least two second acoustic routes may be formed between the at least one high-frequency acoustic driver and the at least two second guiding holes. The at least two first acoustic routes and the at least two second acoustic routes may have different frequency selection characteristics.

In some embodiments, each of the at least two first acoustic routes may include an acoustic resistance material, and an acoustic impedance of the acoustic resistance material may be in a range of 5 MKS Rayleigh-500 MKS Rayleigh.

In some embodiments, a supporting structure may be configured to support the at least one high-frequency acoustic driver and the at least one low-frequency acoustic driver and keep the at least two second guiding holes closer to the user's ears than the at least two first guiding holes when the user wears the audio glasses.

In some embodiments, the at least two first guiding holes and the at least two second guiding holes may be disposed on the supporting structure.

In some embodiments, the supporting structure may include a first housing. The low-frequency acoustic driver may be encapsulated by the first housing. The first housing may define a front chamber and a rear chamber of the low-frequency acoustic driver.

In some embodiments, the front chamber of the low-frequency acoustic driver may be acoustically coupled to one of the at least two first guiding holes, and the rear chamber may be acoustically coupled to the other first guiding hole of the at least two first guiding holes.

In some embodiments, the supporting structure may include a second housing, the high-frequency acoustic driver may be encapsulated by the second housing, and the second housing may define a front chamber and a rear chamber of the high-frequency acoustic driver.

In some embodiments, the front chamber of the high-frequency acoustic driver may be acoustically coupled to one of the at least two second guiding holes, and the rear chamber of the high-frequency acoustic driver may be acoustically coupled to the other second guiding hole of the at least two second guiding holes.

In some embodiments, the sounds output from the at least two first guiding holes may have opposite phases.

In some embodiments, the flexible circuit board may include one or more first bonding pads and one or more second bonding pads. At least one of the one or more first bonding pads may be connected with at least one component of the acoustic output device. At least one of the one or more first bonding pads may be connected with at least one of the one or more second bonding pads. At least one of the one or more second bonding pads may be connected with at least one component of the acoustic output device that is different from the at least one component of the acoustic output device connected with the at least one of the one or more first bonding pads.

In some embodiments, at least one of the first bonding pads and at least one of the second bonding pads may be connected via a flexible wire.

In some embodiments, a count of the one or more second bonding pads may be two.

In some embodiments, at least one of the one or more second bonding pads and the controller may be connected via a flexible wire.

In some embodiments, at least one of the one or more first bonding pads may be configured to connect the power source and the controller.

In some embodiments, the power source may include a battery. The battery may include a body area and a sealing area. A thickness of the body area may be greater than a thickness of the sealing area such that a stepped structure is formed between a side surface of the sealing area and a side surface of the body area.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
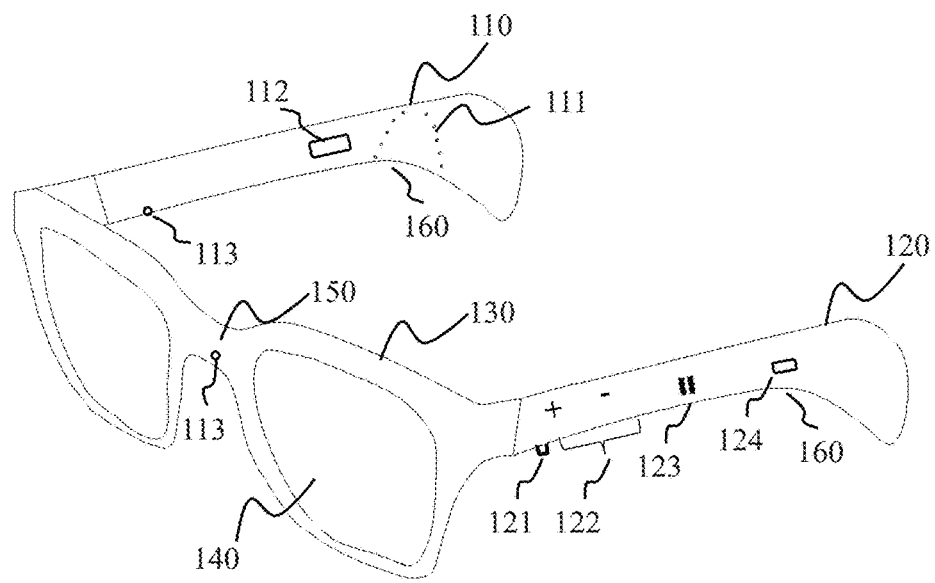
FIG. 1 is a schematic diagram illustrating exemplary glasses according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on. The term "one embodiment" means "at least one embodiment". The term "another embodiment" means "at least one other embodiment". Related definitions of other terms will be disposed in the descriptions below. In the following, without loss of generality, the description of "speaker device", "speaker", or "headphone" will be used when describing the speaker related technologies in the present disclosure. This description is only a form of speaker application. For a person of ordinary skill in the art, "speaker device", "speaker", or "earphone" can also be replaced with other similar words, such as "player", "hearing aid", or the like. In fact, various implementations in the present disclosure may be easily applied to other non-speaker-type hearing devices. For example, for those skilled in the art, after understanding the basic principles of the speaker device, multiple variations and modifications may be made in forms and details of the specific methods and steps for implementing the speaker device, in particular, an addition of ambient sound pickup and processing functions to the speaker device so as to enable the speaker device to function as a hearing aid, without departing from the principle. For example, a sound transmitter such as a microphone may pick up an ambient sound of the user/wearer, process the sound using a certain algorithm, and transmit the processed sound (or a generated electrical signal) to a user/wearer. That is, the speaker device may be modified and have the function of picking up ambient sound. The ambient sound may be processed and transmitted to the user/wearer through the speaker device, thereby implementing the function of a hearing aid. For example, the algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

An acoustic output device refers to a device with a function of sound output. In actual application, the acoustic output device may include various product forms, such as a bracelet, glasses, a helmet, a watch, clothing, a backpack, or the like, or any combination thereof. For illustration purposes, glasses with a function of sound output may be described as an example of the acoustic output device in the present disclosure. The glasses may include myopia glasses, sports glasses, hyperopia glasses, reading glasses, presbyopic glasses, sand-proof glasses, sunglasses, UV-proof glasses, welding glasses, infrared-proof glasses, virtual reality (VR) glasses, augmented reality (AR) glasses, mixed reality (MR) glasses, mediated reality glasses or the like, or a combination thereof.

FIG. 1 is a schematic diagram illustrating exemplary glasses according to some embodiments of the present disclosure. As shown in FIG. 1, glasses 100 may include a frame and one or more lenses 140. The frame may include a temple 110, a temple 120, one or more glasses rings 130, and a nose pad 150. The temple 110 and the temple 120 may be configured to support the glasses ring 130 and the lens(es) 140, and immobilize the glasses 100 on the face of a user. The glasses ring 130 may be configured to support the lens(es) 140. The nose pad 150 may be configured to immobilize the glasses 100 above the nose of the user.

In some embodiments, the glasses 100 may include one or more components configured to implement one or more functions. Exemplary components may include a power source configured to supply power for other components of the glasses 100, an acoustic driver configured to generate a sound, a microphone configured to detect sounds (e.g., environment sounds, the voice of a user wearing the glasses 100), a Bluetooth module configured to connect the glasses 100 with other devices, a controller configured to control operations of other components of the glasses 100, or the like, or any combination thereof. In some embodiments, the temple 110 and/or the temple 120 may include a hollow structure configured to accommodate at least one of the one or more components of the glasses 100.

A plurality of hole-shaped structures may be disposed on the glasses 100. For example, as shown in FIG. 1, one or more guiding holes 111 may be disposed on a side of the temple 110 and/or the temple 120 that does not contact the face of the user when the user wears the glasses 100. The guiding hole(s) 111 may be connected with one or more acoustic drivers inside the glasses 100 to propagate sounds generated by the acoustic drivers. In some embodiments, the guiding hole(s) 111 may be disposed at a position on the temple 110 and/or the temple 120 that is close to the ear of the user, such as, a rear end of the glasses ring 130 far away from the temple 110 and/or the temple 120, a bent portion 160 of the temple 110 and/or the temple 120, etc. As another example, the glasses 100 may include a power interface 112 configured to charge the one or more components of the glasses 100. In some embodiments, the power interface 112 may be disposed on one side of the temple 110 and/or the temple 120 facing to the face of the user when the user wears the glasses 100. Exemplary power interfaces may include a dock charging interface, a direct current (DC) charging interface, a universal serial bus (USB) charging interface, a lightning charging interface, a wireless charging interface, or the like, or any combination. In some embodiments, the glasses 100 may include one or more sound inlets 113 for transmitting sounds (e.g., a voice of the user, environmental sounds, etc.) into the microphone in the glasses 100. The sound inlet(s) 113 may be disposed at a position on the glasses 100 where the voice of the user may be easily obtained. The position where the sound inlet(s) 113 is disposed may include a position on the temple 110 and/or the temple 120 close to the mouth of the user, a position of a lower side of the glasses ring 130 close to the mouth of the user, a position of the nose pad 150, or the like, or any combination thereof. In some embodiments, a shape, size, count, etc. of the one or more hole-shaped structures of the glasses 100 may be determined based on actual conditions. For example, the shape of the hole-shaped structures may include a square, a rectangle, a triangle, a polygon, a circle, an ellipse, an irregular shape, or the like.

In some embodiments, one or more buttons may be disposed on the glasses 100 to realize an interaction between the user and the glasses 100. As shown in FIG. 1, the one or more buttons may include a power button 121, a sound adjustment button 122, a play control button 123, a Bluetooth button 124, etc. The power button 121 may include a power-on button, a power-off button, a power hibernation button (e.g., a button configured to cause the power to keep a stand-by state or a ready state), or the like, or any combination thereof. The sound adjustment button 122 may include a sound increase button, a sound decrease button, or the like, or any combination thereof. The play control button 123 may include a button for playing, a button for pausing a play, a button for resuming a play, a button for playing and answering a call, a button for hanging up a call, a button for holding a call, or the like, or any combination thereof. The Bluetooth button 124 may include a button for a Bluetooth connection, a button for closing the Bluetooth, a button for selecting a connection object, or the like, or any combination thereof. In some embodiments, the button(s) may be disposed on the glasses 100. For example, the power button may be disposed on the temple 110, the temple 120, or the glasses ring(s) 130. In some embodiments, the button(s) may be disposed in one or more control devices. The glasses 100 may be connected with the one or more control devices via a wired manner or a wireless manner. The control device may transmit an instruction inputted by the user to the glasses 100 to control operations of the one or more components of the glasses 100.

In some embodiments, the glasses 100 may include one or more indicator lights. The one or more indicator lights may be configured to indicate information related to the one or more components of the glasses 100. For example, the indicator light may be configured to indicate a state of the power supply, a connection state of the Bluetooth, a state of play, or the like, or any combination thereof. In some embodiments, the indicator light(s) may use different states (e.g., different colors, different times, etc.) to indicate the information related to the component(s) of the glasses 100. For example, when the power source lacks electricity, the indicator light(s) may emit red light. As another example, when the power source is saturated or the electricity of the power source is greater than an electricity threshold, the indicator light(s) may emit green light. As yet another example, when the glasses 100 is being connected with a device (e.g., an external device) via Bluetooth, the indicator light(s) may keep intermittently flashing. As yet another example, when the glasses 100 is successfully connected with the device, the indicator light(s) may emit blue light.

In some embodiments, a sheath may be disposed on the temple 110 and/or the temple 120. The sheath may be made of a soft material with certain elasticity, such as a soft silica gel, a rubber, etc., to provide a better touch sense for the user.

In some embodiments, the frame may be integrally formed or may be assembled via an inserting connection, a snapping connection, or the like, or any combination thereof. In some embodiments, the material of the frame may include steel, alloy, plastic, and single or composite materials. The steel material may include stainless steel, carbon steel, etc. The alloy may include aluminum alloy, chromium-molybdenum steel, scandium alloy, magnesium alloy, titanium alloy, magnesium-lithium alloy, nickel alloy, or the like, or any combination thereof. The plastic may include Acrylonitrile Butadiene Styrene (ABS), Polystyrene (PS), High Impact Polystyrene (HIPS), Polypropylene (PP), Polyethylene Terephthalate (PET), Polyester (PES), Polycarbonate (PC), Polyamides (PA), Polyvinyl Chloride (PVC), Polyethylene and Blown Nylon, etc. The single or composite material may include glass fiber, carbon fiber, boron fiber, graphite fiber, graphene fiber, silicon carbide fiber or aramid fiber or other reinforcing materials, a composite of other organic and/or inorganic materials, such as glass fiber reinforced unsaturated polyester, epoxy resin or phenolic resin matrix composed of various types of glass fiber reinforced plastic, etc.

It should be noted that the descriptions of the glasses 100 in FIG. 1 are intended to be illustrative, which does not limit the scope of the present disclosure. Various substitutions, modifications, and changes may be obvious to those skilled in the art. For example, the glasses 100 may include one or more cameras configured to collect environmental information (e.g., capturing the scene in front of the user). As another example, the glasses 100 may include one or more projectors for projecting an image (e.g., an image seen by the user through the glasses 100) onto a display screen.

Figure 2:
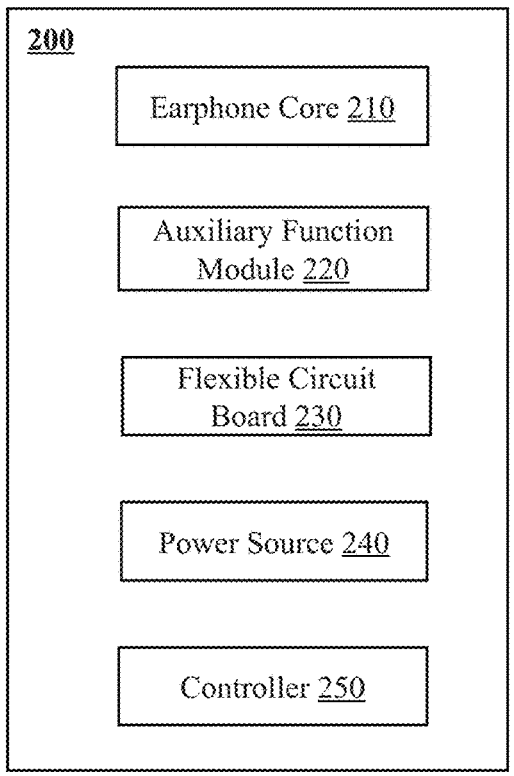
FIG. 2 is a schematic diagram illustrating components of an exemplary acoustic output device according to some embodiments of the present disclosure.

FIG. 2 is a schematic diagram illustrating components of an exemplary acoustic output device (e.g., the glasses 100 shown in FIG. 1) according to some embodiments of the present disclosure. As shown in FIG. 2, an acoustic output device 200 may include an earphone core 210, an auxiliary function module 220, a flexible circuit board 230, a power source 240, a controller 250, or the like, or any combination thereof.

The earphone core 210 may be configured to process a signal including audio information and convert the signal including the audio information into a voice signal. The audio information may include a video, an audio file with a specific data format, or data or a file that may be converted into sound. The signal containing audio information may include an electrical signal, an optical signal, a magnetic signal, a mechanical signal, or the like, or any combination thereof. During the conversion process of the signal, a plurality of types of energy may coexist and be converted. For example, an electrical signal may be directly converted into mechanical vibration through the earphone core 210 to generate sound. As another example, the audio information may be contained in an optical signal, and the earphone core 210 may perform the process of converting the optical signal into a vibration signal. Other types of energy that may exist and be converted during a working process of the earphone core 210 may include thermal energy, magnetic field energy, or the like, or any combination thereof.

In some embodiments, the earphone core 210 may include one or more acoustic drivers. The acoustic drivers may be configured to convert an electrical signal into a sound to be played. For example, the earphone core 210 may include at least two sets of acoustic drivers, and the at least two sets of acoustic drivers may include at least one set of high-frequency acoustic drivers and at least one set of low-frequency acoustic drivers. Each of the at least two sets of the acoustic drivers may be configured to generate a sound with a specific frequency range, and propagate sound outward through at least two guiding holes acoustically coupled to the set of acoustic drivers. As another example, the earphone core 210 may include at least one set of acoustic drivers, and the sound generated by the at least one set of acoustic drivers may be propagated outward through at least two guiding holes acoustically coupled to the at least one set of acoustic drivers. Optionally, the at least two guiding holes may be respectively distributed on two sides of a baffle (e.g., the auricle of a user), and the at least two guiding holes may have different acoustic routes to the user's ear canal. More descriptions regarding the acoustic drivers may be found elsewhere in the present disclosure. See, e.g., FIG. 8 and the relevant descriptions thereof.

The auxiliary function module 220 may be configured to receive an auxiliary signal and perform an auxiliary function. The auxiliary function module 220 may include one or more microphones, one or more buttons, a Bluetooth module, a sensor, or the like, or any combination thereof. Specifically, the auxiliary signals may include a state (e.g., an open state, a closed state, a sleep state, a connection state, etc.) signal of the auxiliary function module 220, a signal generated according to the user operation (e.g., an input and output signal generated according to user's input through a button, a user's voice input), or the like, or any combination thereof. In some embodiments, the auxiliary function module 220 may transmit the received auxiliary signal to other components of the acoustic output device 200 in a wired or wireless manner for processing.

The button(s) may be configured to control the acoustic output device 200 and realize the interaction between the user and the acoustic output device 200. The user may send an instruction to the acoustic output device 200 through the button(s) to control the operation of the acoustic output device 200. In some embodiments, the button(s) may include a power source button, a playback control button, a sound adjustment button, a phone control button, a recording button, a noise reduction button, a Bluetooth button, a return button, or the like, or any combination thereof. The power source button may be configured to control the power source 240 to turn on, off, sleep, or the like, or any combination thereof. The playback control button may be configured to control the playback of a sound in the earphone core 5510, for example, playback information, pause playback information, continue playback information, play the previous item, play the next item, play mode selection (e.g., a sports mode, a work mode, an entertainment mode, a stereo mode, a folk mode, a rock mode, a heavy bass mode, etc.), playback environment selection (e.g., indoor, outdoor, etc.), or the like, or any combination thereof. The sound adjustment button may be configured to control the sound played by the earphone core 5510, for example, increase a volume of the sound, decrease the volume of the sound, or the like. The phone control button may be configured to control the answering, rejecting, hanging up, dialing back, holding, storing, etc., of a call. The record button may be configured to record and store sound information. The noise reduction button may be configured to select the degree of noise reduction. For example, the user may manually select a level or degree of noise reduction, or the acoustic output device 200 may automatically select the level or degree of noise reduction according to the detected environmental sound or the playback mode selected by the user. The Bluetooth button may be configured to turn on Bluetooth, turn off Bluetooth, perform a Bluetooth matching, perform a Bluetooth connection, select a connection device, or the like, or any combination thereof. The return button may be configured to return to a previous menu, an interface, etc.

The sensor may be configured to detect information related to the acoustic output device 200. For example, the sensor may be configured to detect the user's fingerprint and transmit the detected fingerprint to the controller 250. The controller 250 may match the received fingerprint with a reference fingerprint stored in the acoustic output device 200 in advance. If the matching is successful, the controller 250 may generate an instruction to turn on the acoustic output device 200, and the instruction may be transmitted to each component of the acoustic output device 200 to perform the operation of turning on the acoustic output device 200. As another example, the sensor may be configured to detect the position of the acoustic output device 200. When the sensor detects that the acoustic output device 200 is detached from the user's face, the sensor may transmit the detected information to the controller 250, and the controller 250 may generate an instruction to pause or close the playback of the acoustic output device 200. In some embodiments, the sensor may include a ranging sensor (e.g., an infrared ranging sensor, a laser ranging sensor, etc.), a speed sensor, a gyroscope, an accelerometer, a positioning sensor, a displacement sensor, a pressure sensor, a gas sensor, a light sensor, a temperature sensor, a humidity sensor, a fingerprint sensor, an image sensor, an iris sensor (e.g., a camera, etc.), or the like, or any combination thereof.

The flexible circuit board 230 may be configured to connect different components of the acoustic output device 200. The flexible circuit board 230 may include a flexible circuit board (FPC). In some embodiments, the flexible circuit board 230 may include one or more bonding pads and/or one or more flexible wires. The one or more bonding pads may be configured to connect one or more components of the acoustic output device 200 or other bonding pads. One or more flexible wires may be configured to connect components and the bonding pads, a bonding pad and another bonding pad of the acoustic output device 200, or the like. In some embodiments, the flexible circuit board 230 may include one or more flexible circuit boards. Merely by way of example, the flexible circuit board 230 may include a first flexible circuit board and a second flexible circuit board. The first flexible circuit board may be configured to connect two or more of the microphones, the earphone core 210, and the controller 250. The second flexible circuit board may be configured to connect two or more of the power source 240, the earphone core 210, the controller 250, etc. In some embodiments, the flexible circuit board 230 may include an integral structure that includes one or more regions. For example, the flexible circuit board 230 may include a first region and a second region. The first region may include flexible wires for connecting the bonding pads on the flexible circuit board 230 and other components of the acoustic output device 200. The second region may include one or more bonding pads. In some embodiments, the power source 240 and/or the auxiliary function module 260 may be disposed on the flexible circuit board 230, and connected with the flexible circuit board 230 through the flexible wires on the flexible circuit board 230 (e.g., the bonding pads of the flexible circuit board 230). More descriptions regarding the flexible circuit board units may be found elsewhere in the present disclosure. See, e.g., FIG. 4 and the descriptions thereof.

The power source 240 may be configured to provide power supply for other components of the acoustic output device 200. In some embodiments, the power source 240 may include a flexible circuit board, a battery, or the like. The flexible circuit board may be configured to connect the battery and the other components (e.g., the earphone core 210) of the acoustic output device to provide power supply for operations of the other components. In some embodiments, the power source 240 may transmit state information thereof to the controller 250 and receive an instruction from the controller 250 to perform corresponding an operation. The state information of the power source 240 may include an on/off state, a remaining power, a usage time of the remaining power, a charging time, or the like, or any combination thereof.

The controller 250 may generate the instruction to control the power source 240 according to information of the one or more components of the acoustic output device 200. For example, the controller 250 may generate a control instruction to control the power source 240 to provide the earphone core 210 with power to generate a sound. As another example, when the acoustic output device 200 does not receive input information within a specific period, the controller 250 may generate a control instruction to control the power source 240 to enter the sleep state (i.e., stand by or ready mode). In some embodiments, the battery of the power source 240 may include an accumulator, a dry battery, a lithium battery, a Daniell battery, a fuel cell, or the like, or any combination thereof.

Merely by way of example, the controller 250 may receive a user's voice signal from the auxiliary function module 260, for example, "play a song." By processing the voice signal, the controller 250 may generate a control instruction related to the voice signal, for example, controlling the earphone core 210 to obtain information of the song to be played from a storage device (or other devices), and accordingly, generating an electrical signal to control the vibration of the earphone core 210, etc.

In some embodiments, the controller 250 may include one or more electronic frequency division modules. The one or more electronic frequency division modules may perform frequency division processing on a sound source signal. The sound source signal may be obtained from one or more sound source devices (e.g., a memory for storing audio data) integrated into the acoustic output device. The sound source signal may include an audio signal (e.g., an audio signal received from the auxiliary function module 260) received by the acoustic output device in a wired or wireless manner. In some embodiments, the electronic frequency division modules may decompose the input sound source signal into two or more frequency-divided signals containing different frequency components. For example, the electronic frequency division modules may decompose the sound source signal into a first frequency-divided signal with high-frequency components and a second frequency-divided signal with low-frequency components. The signals processed by the electronic frequency division modules may be transmitted to the acoustic driver of the earphone core 210 in a wired or wireless manner. More descriptions regarding the electronic frequency division module may be found elsewhere in the present disclosure. See, e.g., FIG. 8 and the relevant descriptions thereof.

In some embodiments, the controller 250 may include a central processing unit (CPU), an application-specific integrated circuit (ASIC), an application-specific instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced Instruction set computer (RISC), a microprocessor, or the like, or any combination thereof.

In some embodiments, one or more of the earphone core 210, the auxiliary function module 220, the flexible circuit board 230, the power source 240, the controller 250 may be disposed in the frame of the glasses 100. Specifically, one or more electronic components may be disposed in the hollow structure of the temple 110 and/or the temple 120. The electronic components disposed in the temple 110 and/or the temple 120 may be connected and/or communicated in a wired or wireless manner. The wired manner may include a metal cable, an optical cable, a hybrid cable, or the like, or any combination thereof. The wireless manner may include a local area network (LAN), a wide area network (WAN), Bluetooth, ZigBee, near field communication (NFC), or the like, or any combination thereof.

It should be noted that the descriptions of the acoustic output device 200 in FIG. 2 are intended to be illustrative, which does not limit the scope of the present disclosure. Various substitutions, modifications, and changes may be obvious to those skilled in the art. For example, the acoustic output device 200 may include a storage module for storing signals including audio information. For another example, the acoustic output device 200 may include one or more processors, and the processors may execute one or more voice signal processing algorithms to process the voice signal. These changes and modifications are still within the protection scope of the present disclosure.

Figure 3:
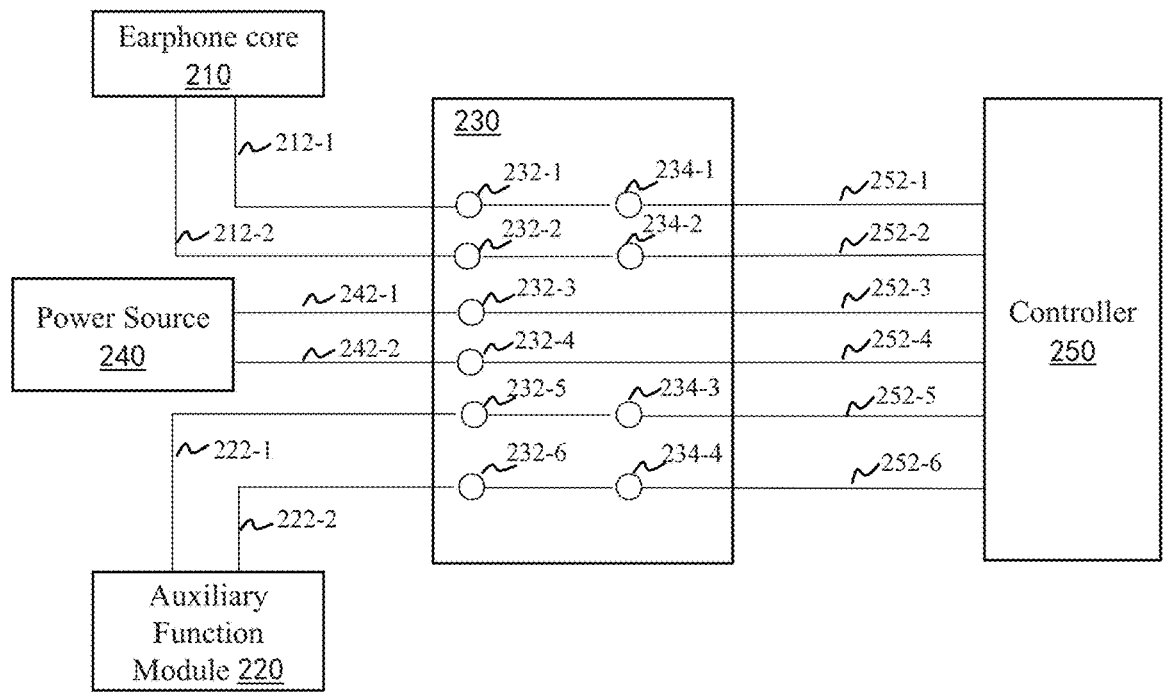
FIG. 3 is a schematic diagram illustrating connections between components of an acoustic output device according to some embodiments of the present disclosure.

FIG. 3 is a schematic diagram illustrating connections between components of an acoustic output device according to some embodiments of the present disclosure. For illustration purposes, merely a connection of some exemplary components is shown in FIG. 3.

As shown in FIG. 3, a flexible circuit board 230 may include one or more first bonding pads (i.e., first bonding pads 232-1, 232-2, 232-3, 232-4, 232-5, 232-6), one or more second bonding pads (i.e., second bonding pads 234-1, 234-2, 234-3, 234-4), and one or more wires. At least one first bonding pad in the flexible circuit board 230 may be connected with at least one second bonding pad in a wired manner, respectively. For example, the first bonding pad 232-1 and the second bonding pad 234-1 may be connected via a flexible wire, the first bonding pad 232-2 and the second bonding pad 234-2 may be connected via a flexible wire, the first bonding pad 232-5 and the second bonding pad 234-3 may be connected via a flexible wire, or the first bonding pad 232-6 and the second bonding pad 234-4 may be connected via a flexible wire.

In some embodiments, each of at least a portion of the components of the acoustic output device 200 may be connected with one or more bonding pads. For example, the earphone core 210 may be electrically connected with the first bonding pad 232-1 and the first bonding pad 232-2 through a wire 212-1 and a wire 212-2, respectively. The auxiliary function module 220 may be connected with the first bonding pad 232-5 and the first bonding pad 232-6 through a wire 222-1 and a wire 222-2, respectively. The controller 250 may be connected with the second bonding pad 234-1 through a wire 252-1, with the second bonding pad 234-2 through a wire 252-2, with the first bonding pad 232-3 through a wire 252-3, with the first bonding pad 232-4 through a wire 252-4, with the second bonding pad 234-3 through a wire 252-5, and/or with the second bonding pad 234-4 through a wire 252-6. The power source 240 may be connected with the first bonding pad 232-3 through a wire 242-1 and may be connected with the first bonding pad 232-4 through a wire 242-2. The wire may include a flexible wire or an external wire. The external wire may include an audio signal wire, an auxiliary signal wire, or the like, or any combination thereof. The audio signal wire may include a wire that is connected with the earphone core 210 and transmit a voice signal to the earphone core 210. The auxiliary signal wire may include a wire that is connected with the auxiliary function module 220 and perform signal transmission with the auxiliary function module 220. For example, the wire 212-1 and the wire 212-2 may include voice signal wires. As another example, the wire 222-1 and the wire 222-2 may include auxiliary signal wires. As yet another example, the wire 252-1 to the wire 252-6 may include the audio signal wires and/or the auxiliary signal wires. In some embodiments, the acoustic output device 200 may include one or more buried grooves for placing wire and/or flexible leads.

As an example, the user of an acoustic output device (e.g., the glasses 100) may send a signal (e.g., a signal to play music) to the acoustic output device by pressing a button. The signal may be transmitted to the first bonding pad 232-5 and/or the first bonding pad 232-6 of the flexible circuit board 230 through the wire 222-1 and/or the wire 222-2, and then to the second bonding pad 234-3 and/or the second bonding pad 234-4 through the flexible lead. The signal may be transmitted to the controller 250 through the wire 252-5 and/or the wire 252-6 connected with the second bonding pad 234-3 and/or the second bonding pad 234-4. The controller 250 may analyze and process the received signal, and generate a corresponding instruction according to the processed signal. The instruction generated by the controller 250 may be transmitted to the flexible circuit board module 230 through one or more wires of the wires 252-1 to 252-6. The instruction generated by the controller 250 may be transmitted to the earphone core 210 through the wire 212-1 and/or the wire 212-2 connected with the flexible circuit board 230, and control the earphone core 210 to play the music. The instruction generated by the controller 250 may be transmitted to the power source 240 through the wire 242-1 and/or the wire 242-2 connected with the flexible circuit board 230, and the power source 240 may be controlled to provide other components with the power required to play the music. The connection of the flexible circuit board 230 may simplify the leading manner between different components of the acoustic output device 200, reduce the mutual influence of the wires and/or flexible leads, and save the space occupied by the wires and flexible leads of the acoustic output device 200.

Figure 4:
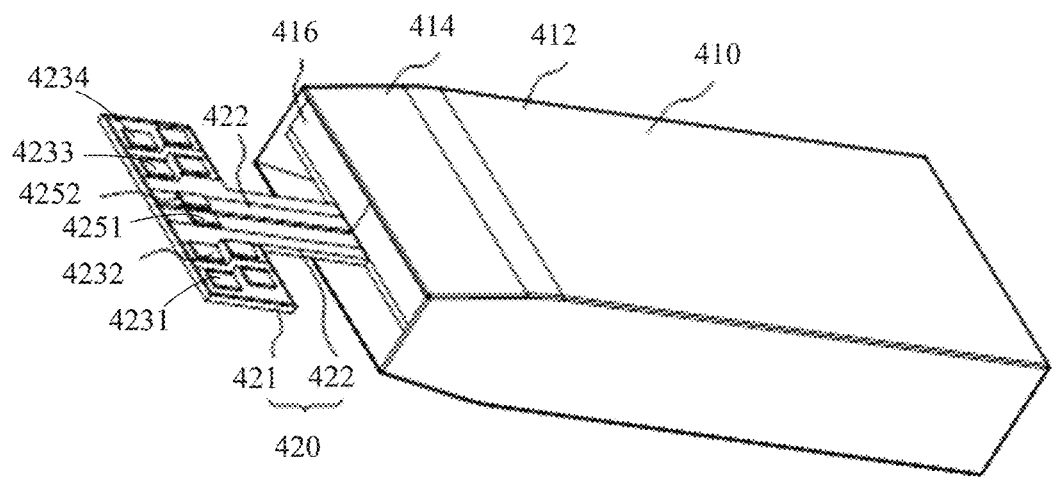
FIG. 4 is a schematic diagram illustrating an exemplary power source according to some embodiments of the present disclosure.

FIG. 4 is a schematic diagram illustrating an exemplary power source according to some embodiments of the present disclosure. As shown in FIG. 4, a power source 400 may include a battery 410 and a flexible circuit board 420. In some embodiments, the battery 410 and the flexible circuit board 420 may be disposed in a housing of an acoustic output device (e.g., the temple 110 or the temple 120 of the glasses 100).

The battery 410 may include a body area 412 and a sealing area 414. In some embodiments, the sealing area 414 may be disposed between the flexible circuit board 420 and the body area 412 and may be connected with the flexible circuit board 420 and the body area 412. The connection between the sealing area 414 and the flexible circuit board 420 and the connection between the sealing area 414 and the body area 412 may include a fixed connection and/or a movable connection. In some embodiments, the sealing area 414 and the body area 412 may be tiled, and a thickness of the sealing area 414 may be equal to or less than a thickness of the body area 412, thus a stepped structure may be formed between at least one side surface of the sealing area 414 and a side surface of the body area 412 adjacent to the at least one side surface of the sealing area 414. In some embodiments, the battery 410 may include a positive electrode and a negative electrode. The positive electrode and the negative electrode may be directly connected or indirectly connected with other components of the acoustic output device (e.g., through the flexible circuit board 420), respectively.

In some embodiments, the flexible circuit board 420 may include a first board 421 and a second board 422. The first board 421 may include one or more first bonding pads, one or more second bonding pads, and flexible wires. The first bonding pads may include a third bonding pad set 4231, a third bonding pad set 4232, a third bonding pad set 4233, and a third bonding pad set 4234. Each third bonding pad set may include one or more fourth bonding pads, for example, two fourth bonding pads. The second bonding pads may include a second bonding pad 4251 and a second bonding pad 4252. One or more fourth bonding pads in each set of the third bonding pad sets in the first bonding pads may connect two or more components of the acoustic output device. For example, a fourth bonding pad in the third bonding pad set 4231 may be connected with an earphone core (e.g., the earphone core 210) through an external wire, and a fourth bonding pad may be connected with another fourth bonding pad in the third bonding pad set 4231 through a flexible wire disposed on the first board 421, and the other fourth bonding pads in the third bonding pad set 4231 may be connected with the controller (e.g., the controller 250) through one or more external wires, thereby realizing communication between the earphone core and the controller by connecting the earphone core and the controller. As another example, a fourth bonding pad in the third bonding pad set 4232 may be connected with a Bluetooth module through an external wire, a fourth bonding pad in the third bonding pad set 4232 may be connected with the other fourth bonding pads in the third bonding pad set 4232 through a flexible wire, and/or another fourth bonding pad in the third bonding pad set 4232 may be connected with the earphone core 210 through an external wire, thereby connecting the earphone core 210 with the Bluetooth module, thus the acoustic output device may play audio information through a Bluetooth connection. One or more second bonding pads (e.g., the second bonding pad 4251, the second bonding pad 4252) may be configured to connect one or more components of the acoustic output device to the battery 410. For example, the second bonding pad 4251 and/or the second bonding pad 4252 may be connected with the earphone core 210 through one or more external wires, and/or the second bonding pad 4251 and/or the second bonding pad 4252 may be connected with the battery 410 through a flexible wire disposed on the second board 422, thereby connecting the earphone core 210 and the battery 410.

The first bonding pads 423 and the second bonding pads 425 may be disposed via various manners. For example, all the bonding pads may be disposed at intervals along a straight line or arranged at intervals in other shapes. In some embodiments, one or more sets of first bonding pads 423 may be disposed at intervals along a length direction of the first board 421 as indicated by arrow A in FIG. 4. One or more fourth bonding pads in each third bonding pad set in one or more first bonding pads 423 may be disposed along a width direction of the first board 421 as indicated by arrow B in FIG. 4, which may be staggered and arranged at intervals along the width direction of the first board 421. The one or more second bonding pads 425 may be disposed in a middle area of the first board 421. The one or more second bonding pads 425 may be disposed along the length direction of the first board 421. In this case, the formation of a flush interval space between the two adjacent sets of the first bonding pads 423 may be avoided, thereby improving the distribution uniformity of intensity of the first board 421, reducing bending between two adjacent sets of the first bonding pads 423, and reducing the probability that the first board 421 breaks off due to the bending, and protecting the first board 421. In addition, distances between the bonding pads may be reduced, thereby facilitating soldering and reducing the short circuit between different bonding pads.

In some embodiments, the second board 422 may include one or more flexible wires 422 configured to connect the bonding pads on the first board 421 and the battery 410. For example, the second board 422 may include two flexible wires. One end of each of the two flexible wires may be connected with one of the positive and negative electrodes of the battery 410, and another end of each of the two flexible leads may be connected with one of the bonding pads on the first board 421. It is not necessary to dispose additional bonding pads to lead the positive and negative electrodes of the battery 410, thereby reducing the count (or the number) of the bonding pads and simplifying the structure and process of the power source 400. Due to only flexible wires may be disposed on the first board 421, in some embodiments, the second board 422 may be bent according to specific conditions. For example, one end of the first board 421 may be fixed to the battery 410 by bending the second board 422, thereby reducing the bulk of the power source 400, saving the space of the housing of the acoustic output device, and improving space utilization. As another example, by folding the second board 422, the first board 421 may be attached to a side surface of the battery 410, the second board 422 and the battery 410 may be stacked, thereby greatly reducing the space occupied by the power source 400.

In some embodiments, the flexible circuit board 420 may be a whole, and the first board 421 and the second board 422 may be two areas of the integral flexible circuit board 420. In some embodiments, the flexible circuit board 420 may be divided into two independent parts. For example, the first board 421 and the second board 422 may be two independent boards. In some embodiments, the flexible printed board 420 may be disposed in the space formed by the body area 412 and/or the sealing area 414 of the battery 410, and it is not necessary to provide a separate space for the flexible circuit board 420, thereby improve the space utilization of the power source 400.

In some embodiments, the battery source 400 may further include a hard circuit board 416. The hard circuit board 416 may be disposed in the sealing area 414. The positive and negative electrodes of the battery 410 may be disposed on the hard circuit board 416. Alternatively, a protection circuit may be disposed on the hard circuit board 416 to protect the battery 410 from overloading. The end of the second board 422 away from the first board 421 may be fixedly connected with the hard circuit board 416, and the flexible wires on the second board 422 may be connected with the positive and negative electrodes of the battery 410. In some embodiments, the second board 422 and the hard circuit board 416 may be pressed together during the manufacture of the power source 400.

In some embodiments, shapes of the first board 421 and the second board 422 may be determined according to actual conditions. The shape of each of the first board 421 and the second board 422 may include a square, a rectangle, a triangle, a polygon, a circle, an ellipse, an irregular shape, or the like. In some embodiments, the shape of the second board 422 may match a shape of the sealing area 414 of the battery 410. For example, the shape of the sealing area 414 and the second plate 422 may both be rectangular, and the shape of the first plate 421 may also be rectangular. In addition, the first board 421 may be placed at one end of the second board 422 along the length direction of the second board 422, and the length direction of the first board 421 (i.e., the direction denoted by arrow A) may be perpendicular to the length direction of the second board 422 (i.e., the direction denoted by arrow B). Specifically, the second board 422 may be connected with a middle area in the length direction of the first board 421, and the first board 421 and the second board 422 may form a T-shaped structure.

It should be noted that the descriptions of the battery 410 and the flexible circuit board 420 of the power source 400 of the acoustic output device may be intended to be illustrative, which does not limit the scope of the present disclosure. Various substitutions, modifications, and changes may be obvious to those skilled in the art. For example, the acoustic output device may include auxiliary function units such as a voice control unit, a microphone unit, etc. Such modifications and changes are still within the protection scope of the present disclosure.

The present disclosure provides an acoustic output device. When a user wears the acoustic output device, the acoustic output device may be at least disposed on one side of the user's head, close to but not block the user's ear(s). The acoustic output device may be worn on the user's head (e.g., an opening earphone designed as glasses, a headband, etc.), or on other parts of the user's body, such as an area of the user's neck or shoulder.

In some embodiments, the acoustic output device may include at least two sets of acoustic drivers (e.g., the earphone core 210 including two sets of acoustic drivers). The at least two sets of acoustic drivers may include at least one set of high-frequency acoustic drivers and at least one set of low-frequency acoustic drivers. Each of the two sets of acoustic drivers may be configured to generate sounds with certain frequency ranges, and propagate the sounds outward through at least two guiding holes (e.g., the guiding hole(s) 111) acoustically coupled with the two sets of acoustic drivers, respectively. In some embodiments, a frequency division operation may be performed on an audio signal (e.g., decomposing the audio signal into a high-frequency signal and a low-frequency signal), and different distances of the guiding holes may be set for the divided signals within different frequency ranges (e.g., a distance between two guiding holes corresponding to the low-frequency acoustic driver may be greater than a distance between at least two guiding holes corresponding to the high-frequency acoustic driver), thereby reducing sound leakage of an open binaural earphone (e.g., the acoustic output device 200).

In some embodiments, the acoustic output device may include a baffle, and the at least two guiding holes may be disposed on two side of the baffle, respectively. In some embodiments, the at least two guiding holes may be disposed on two sides of the user's auricle when a user wears the acoustic output device. In this case, the auricle may be regarded as the baffle to separate the at least two guiding holes, and the at least two guiding holes may correspond to different acoustic routes to the user's ear canal, thereby further reducing sound leakage of the open binaural earphone.

Figure 5:
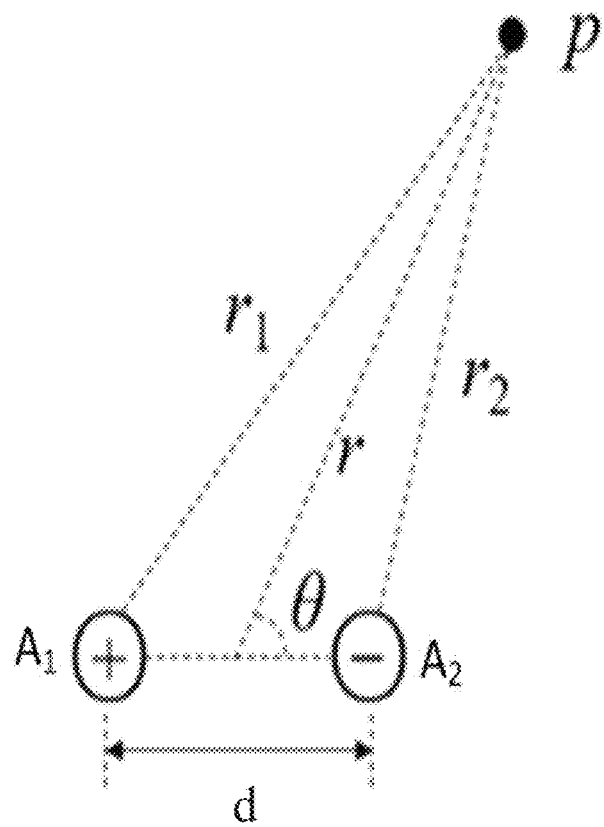
FIG. 5 is a schematic diagram illustrating an exemplary dual-point sound source according to some embodiments of the present disclosure.

FIG. 5 is a schematic diagram illustrating an exemplary dual-point sound source according to some embodiments of the present disclosure. To further illustrate the effect of the setting of guiding holes of an acoustic output device on an output sound of the acoustic output device, and considering that the sound propagates outward from the guiding holes, the guiding holes of the acoustic output device may be regarded as sound sources for sound output in the present disclosure.

Merely for the convenience of description and illustration purposes, when a size of each of the guiding holes of the acoustic output device is relatively small, the each guiding hole may be regarded as a point sound source. In some embodiments, any guiding holes disposed on the acoustic output device for outputting sound may be regarded as a single point sound source of the acoustic output device. A sound pressure of a sound field p generated by a single point sound source may be represented by Equation (1) below:

$$p = \frac{j\omega\rho_0}{4\pi r} Q_0 \exp j(\omega t - kr), \tag{1}$$

where $\omega$ refers to an angular frequency, $\rho_0$ refers to the air density, r refers to a distance between a target point and a sound source, $Q_0$ refers to a volume velocity of the sound source, and k refers to a wave number. It can be seen that the sound pressure of the sound field of the point sound source may be inversely proportional to the distance between the target point to the point sound source. It should be noted that a guiding hole for outputting a sound is regarded as a point sound source in the present disclosure may be only an example of the principle and effect, which does not limit the shape and size of the guiding hole in practical applications. In some embodiments, a guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without paying any creative activity, it may be known that the sound generated by the structures such as the guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without paying any creative activity, it may be known that the acoustic effect achieved in a case in which a sound generated by an acoustic driver may be propagated outward through at least two guiding holes illustrated in the present disclosure may be achieved by other acoustic structures mentioned above, such as the sound generated by the at least one set of acoustic drivers may be propagated outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein.

As mentioned above, at least two guiding holes corresponding to the same acoustic driver of an acoustic output device disclosed in the present disclosure may be used to construct a dual-point sound source, thereby reducing the sound radiated by the acoustic output device to the surrounding environment. For convenience, the sound radiated by the acoustic output device to the surrounding environment may be referred to as a far-field leakage sound due to that the sound may be heard by other people in the environment. The sound that the acoustic output device radiates to the ears of the user wearing the acoustic output device may be referred to as a near-field sound due to the acoustic output device is close to the user. In some embodiments, the sound output by two guiding holes (i.e., a dual-point sound source) may have a certain phase difference. As used herein, a phase of the sound output by a point sound source (e.g., a guiding hole) may also be referred to as a phase of the point sound source. When positions of the two point sound sources of the dual-point sound source and the phase difference satisfy certain conditions, the acoustic output device may show different sound effects in the near-field (e.g., a hearing position of the user's ear) and the far-field. For example, when the phases of the point sound sources corresponding to the two guiding holes are opposite, that is, when an absolute value of the phase difference between the two point sound sources is 180 degrees, a far-field leakage may be reduced according to the principle of sound wave anti-phase cancellation. More descriptions regarding improving the sound output effect of an acoustic output device may be found in International Patent Application No. PCT/CN2019/130884 filed on Dec. 31, 2019, the entire contents of which are hereby incorporated by reference.

As shown in FIG. 5, the sound pressure p of the sound field generated by the dual-point sound source may be represented by Equation (2) below:

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ refer to the intensities of the two point sound sources of the dual-point sound source, respectively, $\varphi_1$ and $\varphi_2$ refer to the phases of the two point sound sources of the dual-point sound source, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r refers to a distance between any target point in space and a center position of the two point sound sources of the dual-point sound source, θ refers to an angle between a line connecting the target point and the center position of the dual-point sound source and a line where the dual-point sound source locates (i.e., the line connecting the two point sound sources of the dual-point sound source), and d refers to a distance between the two point sound sources of the dual-point sound source.

According to Equation (3), the sound pressure of the target point in the sound field may relate to the intensity of each point sound source, the distance between the two point sound sources, the phases of the two point sound sources, and a distance between the target point and the dual-point sound source.

The dual-point sound source with different output performance may be formed by setting the guiding holes. In this case, a volume in the near-field sound may be increased, and a volume of the leakage sound in the far-field may be decreased. For example, an acoustic driver may include a vibration diaphragm. When the vibration diaphragm vibrates, sounds may be transmitted from a front side and a rear side of the vibration diaphragm, respectively. The front side of the vibration diaphragm in the acoustic output device may include a front chamber for transmitting a sound. The front chamber may be acoustically coupled with a guiding hole. The sound transmitted from the front side of the vibration diaphragm may be transmitted to the guiding hole through the front chamber and further transmitted outwards. The rear side of the vibration diaphragm in the acoustic output device may be provided with a rear chamber for transmitting a sound. The rear chamber may be acoustically coupled with another guiding hole, and the sound transmitted from the rear side of the vibration diaphragm may be transmitted to the guiding hole through the rear chamber and propagate outwards. It should be noted that, when the vibration diaphragm vibrates, the front side and the rear side of the vibration diaphragm may generate sounds with opposite phases, respectively. In some embodiments, the structures of the front chamber and rear chamber may be specially set so that the sounds output by the acoustic driver at different guiding holes may meet specific conditions. For example, lengths of the front chamber and the rear chamber may be specially designed such that sounds with a specific phase relationship (e.g., opposite phases) may be output from the two guiding holes. As a result, problems that the acoustic output device has a low volume in the near-field and the sound leakage in the far-field may be effectively resolved.

Under certain conditions, compared to a single point sound source, the volume of the far-field sound of the dual-point sound source may be increased with the frequency. In other words, the leakage reduction capability of the dual-point sound source in the far-field may be decreased as the frequency increases. For further description, a curve of far-field leakage with frequency may be described in connection with FIG. 6.

Figure 6:
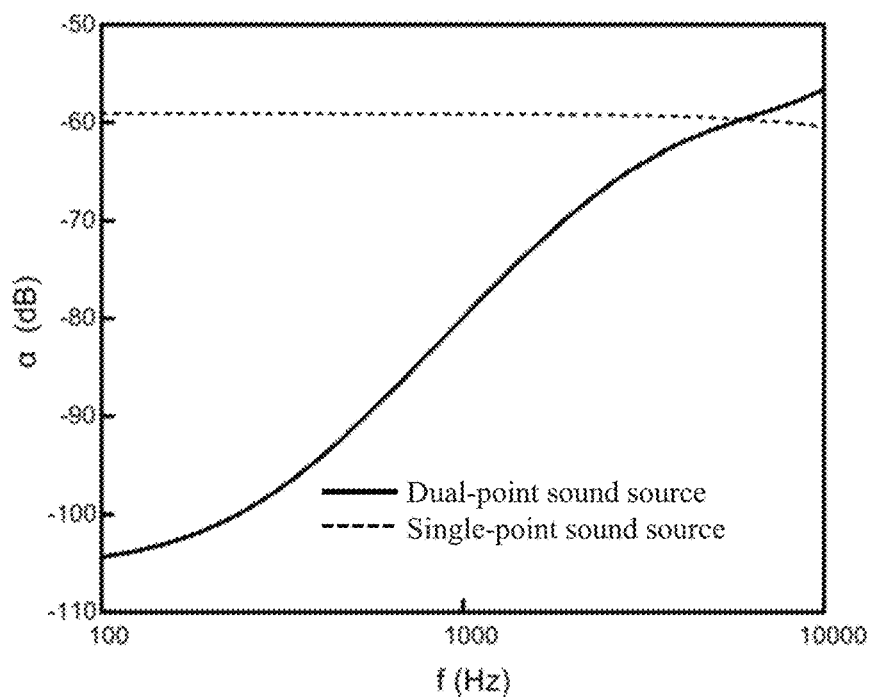
FIG. 6 is a schematic diagram illustrating changes of leakage sounds of a dual-point sound source and a single point sound source along with a frequency according to some embodiments of the present disclosure.

FIG. 6 is a schematic diagram illustrating changes of leakage sounds of a dual-point sound source and a single point sound source along with a frequency according to some embodiments of the present disclosure. A distance between the two point sound sources of the dual-point sound source in FIG. 6 may be constant, and the dual-point sound source may have the same (or substantially same) amplitude and opposite phases. A dotted line represents the variation of a volume of the leakage sound of the single point sound source at different frequencies. A solid line represents the variation of a volume of the leakage sound of the dual-point sound source at different frequencies. The abscissa represents the sound frequency (f), and the unit is Hertz (Hz). The ordinate adopts a normalization parameter a to evaluate a volume of a leakage sound. The parameter a may be represented by Equation (4) below:

$$\alpha = \frac{|P_{far}|^2}{|P_{ear}|^2}, \qquad (4)$$

where $P_{far}$ represents a sound pressure of the acoustic output device in a far-field (i.e., the sound pressure of the far-field sound leakage). $P_{ear}$ represents a sound pressure around the user's ear(s) (i.e., a sound pressure of the near-field sound). The greater the value of a, the greater the far-field leakage sound relative to the near-field sound may be, which may indicate that the capability of the acoustic output device for reducing the far-field sound leakage may be worse.

As shown in FIG. 6, when the frequency is below 6000 Hz, the far-field leakage sound produced by the dual-point sound source may be less than the far-field leakage sound produced by the single point sound source, and the far-field leakage sound may be increased as the frequency increases. When the frequency is close to 10000 Hz (e.g., about 8000 Hz or above), the far-field leakage sound produced by the dual-point sound source may be greater than the far-field leakage sound produced by the single point sound source. In some embodiments, a frequency corresponding to an intersection of the variation curves of the dual-point sound source and the single point sound source may be determined as an upper limit frequency that the dual-point sound source can reduce the sound leakage.

For the purposes of illustration, when the frequency is relatively small (e.g., in a range of 100 Hz to 1000 Hz), the capability of reducing sound leakage of the dual-point sound source may be relatively strong (i.e., the value of a may be small which is below −80 dB). In such a frequency band, increment of the volume of the hearing sound may be determined as an optimization goal. When the frequency is relatively great, (e.g., in a range of 1000 Hz to 8000 Hz), the capability of reducing sound leakage of the dual-point sound source may be relatively weak (i.e., the value of a may be large which is above −80 dB). In such a frequency band, decrease of the sound leakage may be determined as the optimization goal.

Referring to FIG. 6, a frequency division point of the frequency may be determined based on the variation tendency of the capability of the dual-point sound source in reducing the sound leakage. Parameters of the dual-point sound source may be adjusted according to the frequency division point so as to reduce the sound leakage of the acoustic output device. For example, the frequency corresponding to a with a specific value (e.g., −60 dB, −70 dB, −80 dB, −90 dB, etc.) may be used as the frequency division point. Parameters of the dual-point sound source may be determined by setting the frequency band below the frequency division point to improve volume of the near-field sound, and setting the frequency band above the frequency division point to reduce the far-field sound leakage. In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. More descriptions regarding the frequency division point may be found elsewhere in the present disclosure. See, e.g., FIG. 8 and the relevant descriptions thereof.

In some embodiments, the measurement and calculation of the sound leakage may be adjusted according to the actual conditions. For example, an average value of amplitudes of the sound pressures of a plurality of points on a spherical surface centered at the dual-point sound source with a radius of 40 cm may be determined as the value of the sound leakage. A distance between the near-field hearing position and the point sound source may be less than a distance between the point sound source and the spherical surface for measuring the far-field sound leakage. Optionally, the ratio of the distance between the near-field hearing position and the center of the dual-point sound source to the radius r may be less than 0.3, 0.2, 0.15, or 0.1. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, and an average value may be taken as the value of the sound leakage. These measurement and calculation methods may be adjusted by those skilled in the art according to actual conditions, which are not limited herein.

According to FIG. 6, it can be concluded that in the high-frequency band (e.g., a relatively high frequency band determined according to the frequency division point), the dual-point sound source may have a relatively weak capability to reduce sound leakage, and in the low-frequency band (e.g., a relatively low frequency band determined according to the frequency division point), the dual-point sound source may have a relatively strong capability to reduce sound leakage. At a certain sound frequency, the amplitudes, phase differences, etc., of the two point sound sources of the dual-point radiation source may be different, and the capability of the two point sound sources of the dual-point radiation source to reduce sound leakage may be different, and the difference between a volume of the heard sound and a volume of the leakage sound may also be different. For a better description, the curve of the far-field leakage as a function of the distance between the two point sound sources of the dual-point radiation source may be described with reference to FIGS. 7A and 7B.

Figure 7A:
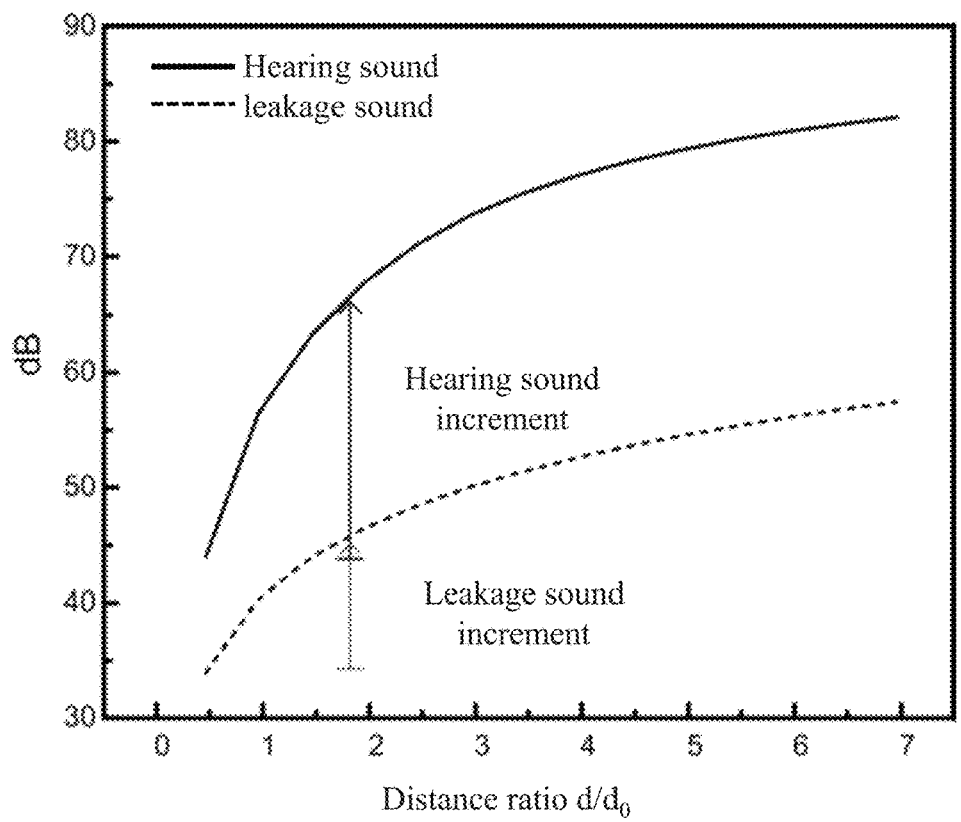
FIG. 7A and FIG. 7B are graphs illustrating changes of a volume of a near-field sound and a volume of the far-field leakage with a distance between two point sound sources of a dual-point sound source according to some embodiments of the present disclosure.
Figure 7B:
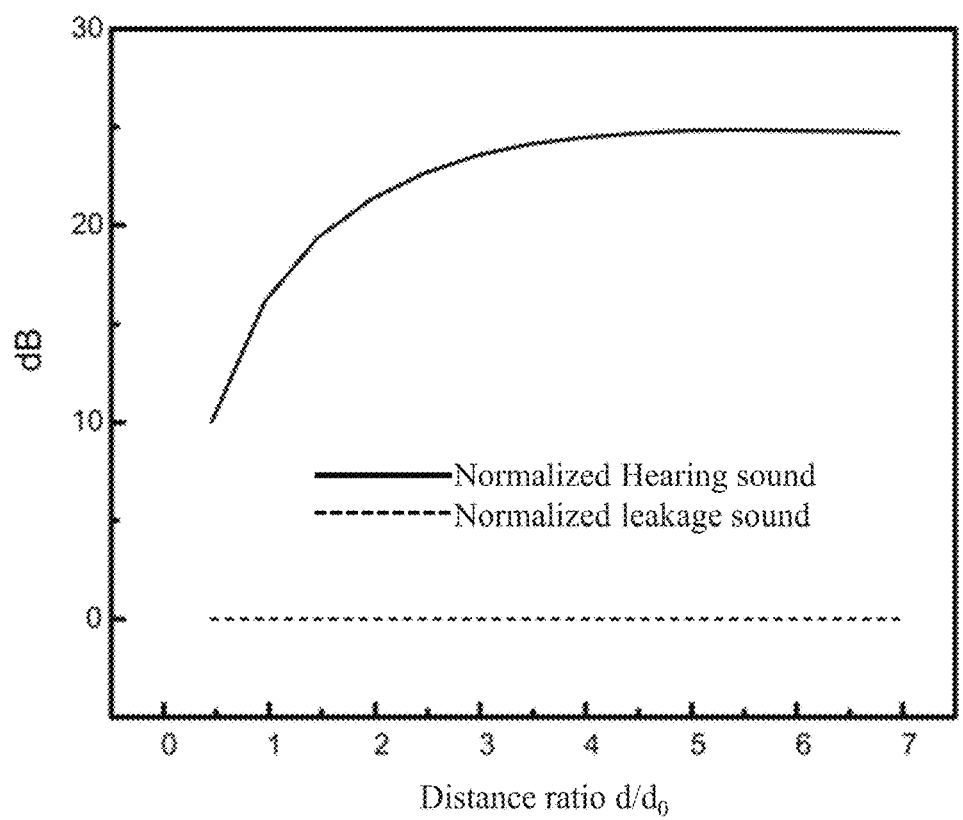

FIG. 7A and FIG. 7B are graphs illustrating changes of a volume of a near-field sound and a volume of a far-field leakage with a distance between two point sound sources of a dual-point sound source according to some embodiments of the present disclosure. FIG. 7B is the graph which is generated by performing a normalization on the graph in FIG. 7A.

As shown in FIG. 7A, a solid line represents a variation curve of a hearing sound of the dual-point sound source with the distance between the two point sound sources of the dual-point sound source, and a dotted line represents a variation curve of a leakage sound of the dual-point sound source with the distance between the two point sound sources of the dual-point sound source. The abscissa represents a distance ratio d/d0 of the distance d between the two point sound sources of the dual-point sound source to a reference distance d0. The ordinate represents a sound volume (the unit is decibel (dB)). The distance ratio d/d0 may reflect a change of the distance between the two point sound sources of the dual-point sound source. In some embodiments, the reference distance d0 may be determined within a specific range. For example, d0 may be a specific value in the range of 2.5 millimeters-10 millimeters. Merely by way of example, d0 may be 5 millimeters. In some embodiments, the reference distance d0 may be determined based on a hearing position. For example, a distance between the hearing position to a nearest point sound source among the two point sound sources of the dual-point sound source may be regarded as the reference distance d0. It should be known that the reference distance d0 may be determined as any other suitable values according to the actual conditions, which is not limited herein. Merely by way of example, in FIG. 7A, d0 may be 5 millimeters as the reference value for the change of the distance between the two point sound sources of the dual-point sound source.

When the sound frequency is constant, a volume of the hearing sound and a volume of the leakage sound of the dual-point sound source may increase as the distance between the two point sound sources of the dual-point sound source increases. When the distance ratio d/d0 is less than a ratio threshold, as the distance between the two point sound sources of the dual-point sound source increases, the increment of the volume of the hearing sound may be greater than the increment of the volume of the leakage sound. That is, the increment of the volume of the hearing sound may be more significant than that of the volume of the leakage sound. For example, as shown in FIG. 7A, when the distance ratio d/d0 is 2, a difference between the volume of the hearing sound and the volume of the leakage sound may be about 20 dB. When the distance ratio d/d0 is 4, the difference between the volume of the hearing sound and the volume of the leakage sound may be about 25 dB. In some embodiments, when the distance ratio d/d0 reaches the ratio threshold, a ratio (or the difference) of the volume of the hearing sound and the volume of the leakage sound may reach a maximum value, and as the distance of the two point sound sources of the dual-point sound source further increases, the curve of the volume of the hearing sound and the curve of the volume of the leakage sound may gradually go parallel. That is, the increment of the volume of the hearing sound and the increment of the volume of the leakage sound may be the same (or substantially same). For example, as shown in FIG. 7B, when the distance ratio d/d0 is 5, 6, or 7, the difference between the volume of the hearing sound and the volume of the leakage sound may be the same (or substantially same), which may be about 25 dB. That is, the increment of the volume of the hearing sound may be the same as the increment of the volume of the leakage sound. In some embodiments, the ratio threshold of the distance ratio d/d0 of the dual-point sound source may be in the range of 0-7. For example, the ratio threshold of d/d0 may be in the range of 0.5-4.5. As another example, the ratio threshold of d/d0 may be in the range of 1-4.

In some embodiments, the ratio threshold may be determined based on the change of the difference between the volume of the hearing sound and the volume of the leakage sound of the dual-point sound source in FIG. 7A. For example, the ratio of the volume of the hearing sound to the volume of the leakage sound may be determined as the ratio threshold when a maximum difference between the volume of the hearing sound and the volume of the leakage sound is reached. As shown in FIG. 7B, when the distance ratio d/d0 is less than the ratio threshold (e.g., 4), as the distance between the two point sound sources of the dual-point sound source increases, a normalized curve of a hearing sound may show an upward trend (e.g., a slope of the normalized curve is greater than 0). That is, the increment of the volume of the hearing sound may be greater than the increment of the volume of the leakage sound. When the distance ratio d/d0 is greater than the ratio threshold, as the distance between the two point sound sources of the dual-point sound source increases, the slope of the normalized curve of the hearing sound may gradually approach 0. The normalized curve of the hearing sound may be parallel to the normalized curve of the leakage sound. That is, as the distance between the two point sound sources of the dual-point sound source increases, the increment of the volume of the hearing sound may be no longer greater than the increment of the volume of the leakage sound.

Based on the description mentioned above, it can be seen that when the hearing position is constant and the parameters of the dual-point sound source may be adjusted by certain means, thereby achieving significantly increasing the volume of the near-field sound and slightly increasing the volume of the far-field leakage (that is, the increment of the volume of the near-field sound is greater than the increment of the volume of the far-field leakage). For example, two or more of dual-point sound sources (e.g., a high-frequency dual-point sound source and a low-frequency dual-point sound source) may be disposed, the distance between two point sound sources of each of the dual-point sound sources may be adjusted by a certain means, and the distance between two point sound sources of the high-frequency dual-point sound source may be less than the distance between two point sound sources of the low-frequency dual-point sound source. Due to the low-frequency dual-point sound source may have a small sound leakage (i.e., the low-frequency dual-point sound source may have a relatively strong capability to reduce the sound leakage), and the high-frequency dual-point sound source may have a relatively great sound leakage (i.e., the high-frequency dual-point sound source may have a relatively weak capability to reduce the sound leakage). The volume of the hearing sound may be significantly greater than the volume of the leakage sound when the distance between the two point sound sources of the dual-point sound source in the high-frequency band is relatively small, thereby reducing the sound leakage.

In the embodiments of the present disclosure, a distance may be between two guiding holes corresponding to each set of acoustic drivers, and the distance may affect the volume of the near-field sound transmitted by the acoustic output device to the user's ears and the volume of the far-field leakage transmitted by the acoustic output device to the environment. In some embodiments, when the distance between the guiding holes corresponding to a high-frequency acoustic driver is less than the distance between the guiding holes corresponding to a low-frequency acoustic driver, the volume of the hearing sound may be increased and the volume of the leakage sound may be reduced, thereby preventing the sound from being heard by others near the user of the acoustic output device. According to the above descriptions, the acoustic output device may be effectively used as an open binaural earphone even in a relatively quiet environment.

Figure 8:
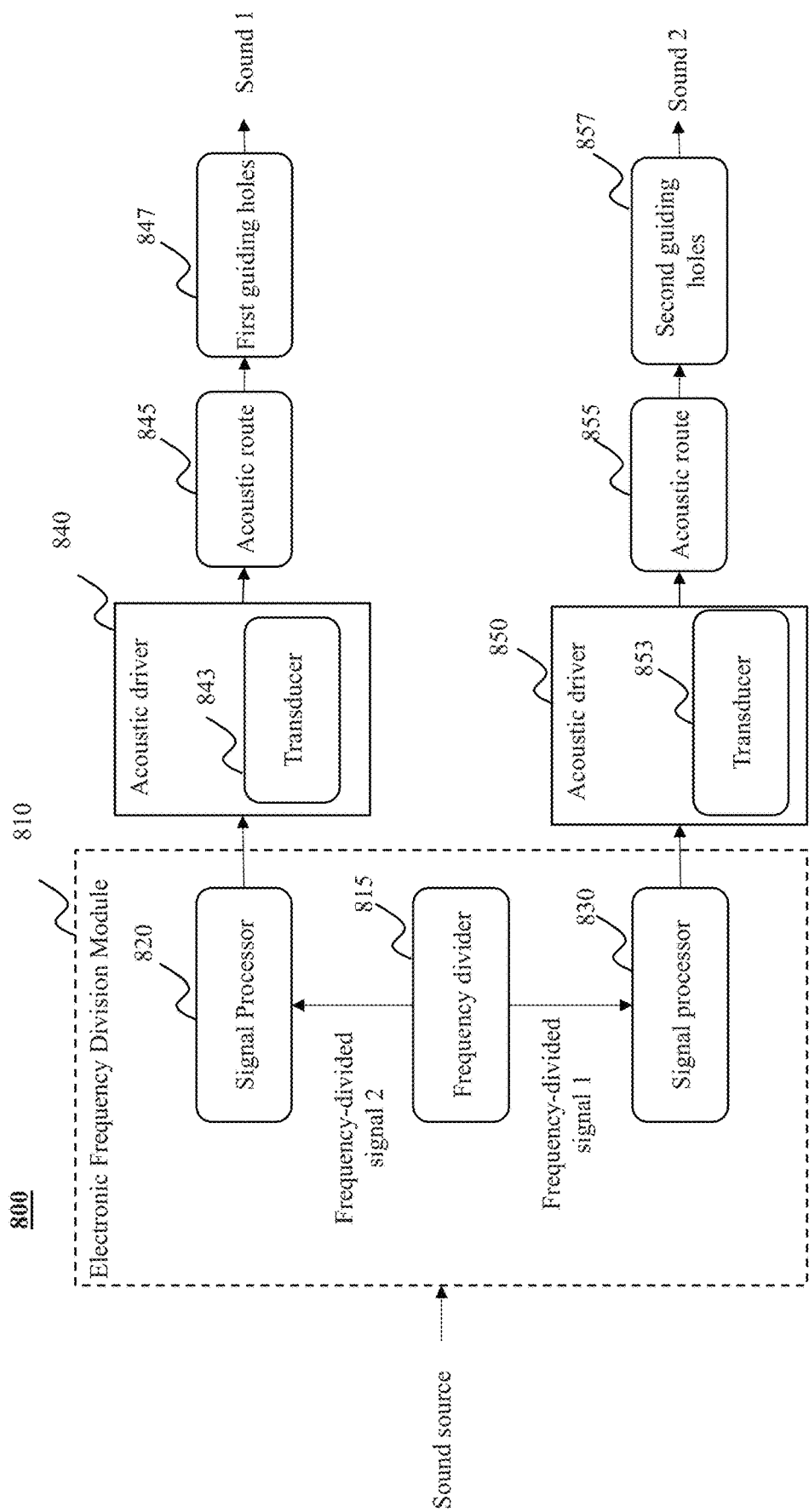
FIG. 8 is a schematic diagram illustrating an exemplary acoustic output device according to some embodiments of the present disclosure.

FIG. 8 is a schematic diagram illustrating an exemplary acoustic output device according to some embodiments of the present disclosure. As shown in FIG. 8, an acoustic output device 800 may include an electronic frequency division unit 810, an acoustic driver 840, an acoustic driver 850, an acoustic route 845, an acoustic route 1855, at least two first guiding holes 847, and at least two second guiding holes 857. In some embodiments, the acoustic output device 800 may further include a controller (not shown in the figure). The electronic frequency division unit 810, as part of the controller, may be configured to generate electrical signals that are input into different acoustic drivers. The connection between different components in the acoustic output device 800 may be wired or wireless. For example, the electronic frequency division unit 810 may send signals to the acoustic driver 840 and/or the acoustic driver 850 via a wired transmission manner or a wireless transmission manner.

The electronic frequency division unit 810 may divide a frequency of a source signal. The source signal may come from one or more sound source apparatuses (e.g., a memory storing audio data) integrated into the acoustic output device 800. The source signal may also be an audio signal that the acoustic output device 800 received by a wired or wireless means. In some embodiments, the electronic frequency division unit 810 may decompose the input source signal into two or more frequency-divided signals containing different frequencies. For example, the electronic frequency division unit 810 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a voice signal with frequencies in a first frequency range. The high-frequency signal may refer to a voice signal with frequencies in a second frequency range.

For the purposes of illustration, a low-frequency signal described in some embodiments of the present disclosure may refer to a voice signal with a frequency in a first frequency range with relatively low frequencies, and a high-frequency signal may refer to a voice signal with a frequency in a second frequency range with relatively great frequencies. The first frequency range and the second frequency range may include or not include overlapping frequency ranges, and the second frequency range may include frequencies higher than the frequencies in the first frequency range. Merely by way of example, the first frequency range may include frequencies below a first frequency threshold, and the second frequency range may include frequencies above a second frequency threshold. The first frequency threshold may be lower than the second frequency threshold, equal to the second frequency threshold, or higher than the second frequency threshold. For example, the first frequency threshold may be smaller than the second frequency threshold (e.g., the first frequency threshold may be 600 Hz, and the second frequency threshold may be 700 Hz), which may indicate that there is no overlap between the first frequency range and the second frequency range. As another example, the first frequency threshold may be equal to the second frequency (e.g., both the first frequency threshold and the second frequency threshold may be 650 Hz or other frequency values). As yet another example, the first frequency threshold may be greater than the second frequency threshold, which may indicate that there is an overlap between the first frequency range and the second frequency range. In this case, a difference between the first frequency threshold and the second frequency threshold may not exceed a third frequency threshold. The third frequency threshold may be a value, for example, 20 Hz, 50 Hz, 100 Hz, 150 Hz, 200 Hz, etc., or may be a value related to the first frequency threshold and/or the second frequency threshold (e.g., 5%, 10%, 15%, etc., of the first frequency threshold). The third frequency threshold may be a value determined by a user according to the actual needs, which is not limited herein. It should be known that the first frequency threshold and the second frequency threshold may be determined according to different situations, which are limited herein.

In some embodiments, the electronic frequency division unit 810 may include a frequency divider 815, a signal processor 820, and a signal processor 830. The frequency divider 815 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 815 may be an electronic device that may implement the signal decomposition function, including but not limited to one of a passive filter, an active filter, an analog filter, a digital filter, or any combination thereof. In some embodiments, the frequency divider 815 may divide the sound source signal based on one or more frequency division points. A frequency division point refers to a signal frequency that distinguishes the first frequency range from the second frequency range. For example, when the first frequency range and the second frequency range include an overlapping frequency range, the frequency division point may be a feature point within the overlapping frequency range (e.g., a low-frequency boundary point, a high-frequency boundary point, a center frequency point, etc., of the overlapping frequency range). In some embodiments, the frequency division point may be determined according to a relationship (e.g., the curves shown in FIG. 6, FIG. 7A, or FIG. 7B) between a frequency and the sound leakage of the acoustic output device. For example, considering that the leakage sound of the acoustic output device may vary with a change of the frequency, a frequency point corresponding to the volume of the leakage sound that meets a certain condition may be selected as the frequency division point, for example, 1000 Hz shown in FIG. 6. More descriptions regarding the change of the leakage sounds with the frequency may be found elsewhere in the present disclosure. See, e.g., FIG. 6 and the relevant descriptions thereof. In some alternative embodiments, a user may directly determine a specific frequency as the frequency division point. For example, considering that the frequency range of sounds that a human ear can hear is 20 Hz-20 kHz, the user may select a frequency point in this range as the frequency division point. Merely by way of example, the frequency division point may be 600 Hz, 800 Hz, 1000 Hz, 1200 Hz, etc. In some embodiments, the frequency division point may be determined according to performance of the acoustic driver. For example, considering that the low-frequency acoustic driver and the high-frequency acoustic driver may have different frequency response curves, the frequency division point may be determined in a frequency range above ½ of an upper limiting frequency of the low-frequency acoustic driver and below 2 times of a low limiting frequency of the high-frequency acoustic driver. As another example, the frequency division point may be determined in a frequency range above ⅓ of the upper limiting frequency of the low-frequency acoustic driver and below 1.5 times of the low limiting frequency of the high-frequency acoustic driver. In some embodiments, in the overlapping frequency range, a position relationship between point sound sources may affect the volume produced by the acoustic output device in the near-field and the far-field. More descriptions regarding the effect of the position relationship between point sound sources on the volume produced by the acoustic output device in the near-field and the far-field may be found in International application No. PCT/CN2019/130886, filed on Dec. 31, 2019, the entire contents of which are hereby incorporated by reference.

The signal processors 820 and 830 may respectively process the frequency-divided signals to meet requirements of subsequent sound output. In some embodiments, the signal processor 820 or 830 may include one or more signal processing units. For example, the signal processor may include, but not limited to, an amplifier, an amplitude modulator, a phase modulator, a delayer, or a dynamic gain controller, or the like, or any combination thereof. Merely by way of example, the processing of the voice signal by the signal processor 820 and/or the signal processor 830 may include adjusting the amplitude corresponding to some frequencies in the voice signal. Specifically, when the first frequency range has an overlapping frequency range with the second frequency range, the signal processors 820 and 830 may adjust an intensity of the voice signal corresponding to the frequency in the overlapping frequency range (e.g., reduce the amplitude of a signal corresponding to a frequency in the overlapping frequency range), thereby avoiding excessive volume in the overlapping frequency range in the subsequent output sound caused by superposition of multiple voice signals.

After the processing operations are performed by the signal processor 820 or the signal processor 830, the frequency-divided signals may be transmitted to the acoustic drivers 840 and 850, respectively. In some embodiments, the voice signal transmitted to the acoustic driver 840 may be a voice signal including a relatively low frequency range (e.g., the first frequency range), and the acoustic driver 840 may also be referred to as a low-frequency acoustic driver. The voice signal transmitted into the acoustic driver 850 may be a voice signal including a relatively high frequency range (e.g., the second frequency range), and the acoustic driver 850 may also be referred to as a high-frequency acoustic driver. The acoustic driver 840 and the acoustic driver 850 may convert the voice signals into a low-frequency sound and a high-frequency sound, respectively, then propagate the converted sound outwards.

In some embodiments, the acoustic driver 840 may be acoustically coupled to at least two first guiding holes (e.g., two first guiding holes 847) (e.g., connected with the two first guiding holes 847 via two acoustic routes 845 respectively). Then the acoustic driver 840 may propagate the sound through the at least two first guiding holes. The acoustic driver 850 may be acoustically coupled to at least two second guiding holes (e.g., two second guiding holes 857) (e.g., connected with the two second guiding holes 857 via two acoustic routes 855, respectively). Then the acoustic driver 850 may propagate the sound through the at least two second guiding holes. Each of the guiding holes (e.g., the at least two first guiding holes or the at least two second guiding holes) may be a relatively small hole formed on the acoustic output device with a specific opening and allow the sound to pass through. The shape of the guiding hole may include but is not limited to a circle shape, an oval shape, a square shape, a trapezoid shape, a rounded quadrilateral shape, a triangle shape, an irregular shape, or the like, or any combination thereof. In addition, a count of the guiding holes coupled to the acoustic driver 840 or 850 may be not limited to two, which may be determined based on actual needs, for example, 3, 4, 6, or the like.

In some embodiments, in order to reduce the far-field leakage of the acoustic output device 800, the acoustic driver 840 may be used to generate low-frequency sounds with equal (or approximately equal) amplitude and opposite (or approximately opposite) phases at the at least two first guiding holes, respectively. The acoustic driver 850 may be used to generate high-frequency sounds with equal (or approximately equal) amplitude and opposite (or approximately opposite) phases at the at least two second guiding holes, respectively. In this way, the far-field leakage of low-frequency sounds (or high-frequency sounds) may be reduced according to the principle of acoustic interference cancellation. In some embodiments, according to FIG. 6, FIG. 7A, and FIG. 7B, further considering that a wavelength of the low-frequency sound is longer than that of the high-frequency sound, and in order to reduce the interference cancellation of the sound in the near-field (e.g., a position of the user's ear), a distance between the two first guiding holes and a distance between the two second guiding holes may be set to be different values. For example, assuming that there is a first distance between the two first guiding holes and a second distance between the two second guiding holes, the first distance may be longer than the second distance. In some embodiments, the first distance and the second distance may be arbitrary values. Merely by way of example, the first distance may be less than or equal to 40 millimeters, for example, the first distance may be in the range of 20 millimeters-40 millimeters. The second distance may be less than or equal to 12 millimeters, and the first distance may be greater than the second distance. In some embodiments, the first distance may be greater than or equal to 12 millimeters, and the second distance may be less than or equal to 7 mm, for example, in the range of 3 millimeters-7 millimeters. In some embodiments, the first distance may be 30 millimeters, and the second distance may be 5 millimeters. In some embodiments, the first distance may be at least twice of the second distance. In some embodiments, the first distance may be at least 3 times of the second distance. In some embodiments, the first distance may be at least 5 times of the second distance.

As shown in FIG. 8, the acoustic driver 840 may include a transducer 843. The transducer 843 may transmit sound to the first guiding holes 847 through the acoustic route 845. The acoustic driver 850 may include a transducer 853. The transducer 853 may transmit sound to the second guiding holes 857 through the acoustic route 855. In some embodiments, the transducer (e.g., the transducer 843 or the transducer 853) may include, but not be limited to, a transducer of a gas-conducting acoustic output device, a transducer of a bone-conducting acoustic output device, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (e.g., the low-frequency acoustic driver 840, the high-frequency acoustic driver 850) may include transducers with different properties or numbers. For example, each of the low-frequency acoustic driver 840 and the high-frequency acoustic driver 850 may include a transducer (e.g., a low-frequency speaker unit and a high-frequency speaker unit) having different frequency response characteristics. As another example, the low-frequency acoustic driver 840 may include two transducers (e.g., two low-frequency speaker units), and the high-frequency acoustic driver 850 may include two transducers 853 (e.g., two high-frequency speaker units).

In some alternative embodiments, the acoustic output device 800 may generate sound with different frequency ranges by other means, such as transducer frequency division, acoustic route frequency division, or the like. When the acoustic output device 800 uses a transducer or an acoustic route to divide the sound, the electronic frequency division unit 810 (a part inside the dotted box) may be omitted, and the voice signal may be transmitted to the acoustic driver 840 and the acoustic driver 850.

In some alternative embodiments, the acoustic output device 800 may use a transducer to achieve signal frequency division, the acoustic driver 840 and the acoustic driver 850 may convert the input sound source signal into a low-frequency sound and a high-frequency sound, respectively. Specifically, through the transducer 843 (such as a low-frequency speaker), the low-frequency acoustic driver 840 may convert the voice signal into the low-frequency sound with low-frequency components. In some embodiments, at least two first acoustic routes may be formed between the at least one low-frequency acoustic driver and the at least two first guiding holes. The low-frequency sound may be transmitted to the at least two first guiding holes 847 along at least two different acoustic routes (i.e., at least two first acoustic routes). Then the low-frequency sound may be propagated outwards through the first guiding holes 847. Through the transducer 853 (such as a high-frequency speaker), the high-frequency acoustic driver 850 may convert the voice signal into the high-frequency sound with high-frequency components. In some embodiments, at least two second acoustic routes may be formed between the at least one high-frequency acoustic driver and the at least two second guiding holes. The high-frequency sound may be transmitted to the at least two second guiding holes 857 along at least two different acoustic routes (i.e., the at least two second acoustic routes). Then the high-frequency sound may be propagated outwards through the second guiding holes 857. In some embodiments, the at least two first acoustic routes and the at least two second acoustic routes may have different frequency selection characteristics. As used herein, the frequency selection characteristic of an acoustic route refers to that a sound signal with a predetermined frequency range may be passed through the acoustic route. The frequency selection characteristic of an acoustic route may include the predetermined frequency range within which a sound can pass through the acoustic route. For example, a sound with low-frequency components within a first frequency range may be passed through the at least two first acoustic routes and a sound with high-frequency components within a second frequency range may be passed through the at least two second acoustic routes. The first frequency range may include frequencies less than frequencies in the second frequency range. In some embodiments, the first frequency range may include a maximum frequency that is less than or equal to the minimum frequency in the second frequency range. In some embodiments, the first frequency range may include the maximum frequency that exceeds the minimum frequency in the second frequency range and less than the maximum frequency in the second frequency range. In some embodiments, the at least two first acoustic routes may have different frequency selection characteristics. In some embodiments, the at least two first acoustic routes may have the same frequency selection characteristic. In some embodiments, the at least two second acoustic routes may have different frequency selection characteristics. In some embodiments, the at least two second acoustic routes may have the same frequency selection characteristic.

In some alternative embodiments, an acoustic route (e.g., the acoustic route 845 and the acoustic route 855) connecting a transducer and guiding holes may affect the nature of the transmitted sound. For example, an acoustic route may attenuate or change a phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route (e.g., at least one of the at least two first acoustic routes, at least one of the at least two second acoustic routes, etc.) may also include an acoustic resistance material, which may have a specific acoustic impedance. For example, the acoustic impedance may be in the range of 5 MKS Rayleigh to 500 MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes with different acoustic impedances, the acoustic output of the transducer may be acoustically filtered, such that the sounds output through different acoustic routes may have different frequency components.

In some alternative embodiments, the acoustic output device 800 may utilize acoustic routes to achieve signal frequency division. Specifically, the source signal may be input into a specific acoustic driver and converted into a sound containing high and low-frequency components. The voice signal may be propagated along acoustic routes having different frequency selection characteristics. For example, the voice signal may be propagated along the acoustic route with a low-pass characteristic to the corresponding guiding hole to generate low-frequency sound. In this process, the high-frequency sound may be absorbed or attenuated by the acoustic route with a low-pass characteristic. Similarly, the voice signal may be propagated along the acoustic route with a high-pass characteristic to the corresponding guiding hole to generate a high-frequency sound. In this process, the low-frequency sound may be absorbed or attenuated by the acoustic route with the high-pass characteristic.

In some embodiments, the acoustic output device 800 may include a controller (not shown in figure). The controller may cause the low-frequency acoustic driver 840 to output a sound in the first frequency range (i.e., low-frequency sound), and cause the high-frequency acoustic driver 850 to output a sound in the second frequency range (i.e., high-frequency sound). In some embodiments, the acoustic output device 800 may also include a supporting structure. The supporting structure may be used to support the acoustic driver (such as the high-frequency acoustic driver 850, the low-frequency acoustic driver 840, etc.), so that the guiding holes corresponding to the acoustic driver is positioned away from the user's ear. In some embodiments, the guiding holes (e.g., the at least two second guiding holes) acoustically coupled with the high-frequency acoustic driver 850 may be located closer to an expected position of the user's ear (e.g., the ear canal entrance), while the guiding holes (e.g., the at least two first guiding holes) acoustically coupled with the low-frequency acoustic driver 840 may be located further away from the expected position. For example, a distance between the guiding holes (e.g., the at least two second guiding holes) acoustically coupled with the high-frequency acoustic driver 850 and the expected position of the user's ear may be less than a first distance threshold, and a distance between the guiding holes (e.g., the at least first second guiding holes) acoustically coupled with the low-frequency acoustic driver 840 and the expected position of the user's ear may be greater than a second distance threshold. The first distance threshold and/or the second distance threshold may be determined according to an actual need. The first distance threshold may be less than the second distance threshold. In some embodiments, the supporting structure may be used to package the acoustic driver. The supporting structure of the packaged acoustic driver may be a housing made of various materials such as plastic, metal, tape, etc. The housing may encapsulate the acoustic driver and form a front chamber and a rear chamber corresponding to the acoustic driver. For example, the low-frequency acoustic driver may be encapsulated by a first housing, and the first housing may define a front chamber and a rear chamber of the low-frequency acoustic driver. As another example, the high-frequency acoustic driver may be encapsulated by a second housing, and the second housing may define a front chamber and a rear chamber of the high-frequency acoustic driver. In some embodiments, the second housing may be the same as or different from the first housing. The front chamber may be acoustically coupled to one of the at least two guiding holes. The rear chamber may be acoustically coupled to the other of the at least two guiding holes. For example, the front chamber of the low-frequency acoustic driver 840 may be acoustically coupled to one of the at least two first guiding holes 847. The rear chamber of the low-frequency acoustic driver 840 may be acoustically coupled to the other of the at least two first guiding holes 847. The front chamber of the high-frequency acoustic driver 850 may be acoustically coupled to one of the at least two second guiding holes 857. The rear chamber of the high-frequency acoustic driver 850 may be acoustically coupled to the other of the at least two second guiding holes 857. As used herein, a front chamber of a housing refers to a space (also referred to as a route) between the acoustic driver and one of the at least two guiding holes acoustically coupled to the acoustic driver, which is encapsulated by the housing. A rear chamber of the housing refers to a route between the acoustic driver and the other of the at least two guiding holes. For example, the front chamber of the low-frequency acoustic driver 840 may be a space between the low-frequency acoustic driver 840 and one of the first sounding guiding holes 847, which is encapsulated by the housing (e.g., the first housing). The rear chamber of the low-frequency acoustic driver 840 may be a space between the low-frequency acoustic driver 840 and the other of the first sounding guiding holes 847, which is encapsulated by the housing (e.g., the first housing). As another example, the front chamber of the high-frequency acoustic driver 850 may be a space between the high-frequency acoustic driver 850 and one of the first sounding guiding holes 857, which is encapsulated by the housing (e.g., the second housing). The rear chamber of the high-frequency acoustic driver 850 may be a space between the high-frequency acoustic driver 850 and the other of the first sounding guiding holes 857, which is encapsulated by the housing (e.g., the second housing). In some embodiments, the guiding holes (e.g., the first guiding holes 847 and the second guiding holes 857) may be disposed on the housing.

The above descriptions of the acoustic output device 800 may be merely some examples. Those skilled in the art may make adjustments and changes to the structure, quantity, etc. of the acoustic driver, which is not limiting in the present disclosure. In some embodiments, the acoustic output device 800 may include any number of the acoustic driver structures. For example, the acoustic output device 800 may include two sets of the high-frequency acoustic drivers 850 and two sets of the low-frequency acoustic drivers 840, or one set of the high-frequency acoustic drives 850 and two sets of the low-frequency acoustic drivers 840, and these high-frequency/low-frequency drivers may be used to generate a sound in a specific frequency range. As another example, the acoustic driver 840 and/or the acoustic driver 850 may include an additional signal processor. The signal processor may have the same or different structural components as the signal processor 820 or the signal processor 830.

It should be noted that the acoustic output device and its modules shown in FIG. 8 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output device 800 and its components is only for the convenience of description, and not intended to limit the scope of the present disclosure. It should be understood that, for those skilled in the art, after understanding the principle of the apparatus, it is possible to combine each unit or form a substructure to connect with other units arbitrarily without departing from this principle. For example, the signal processor 820 or the signal processor 830 may be a part independent of the electronic frequency division unit 810. Those modifications may fall within the scope of the present disclosure.

Figure 9A:
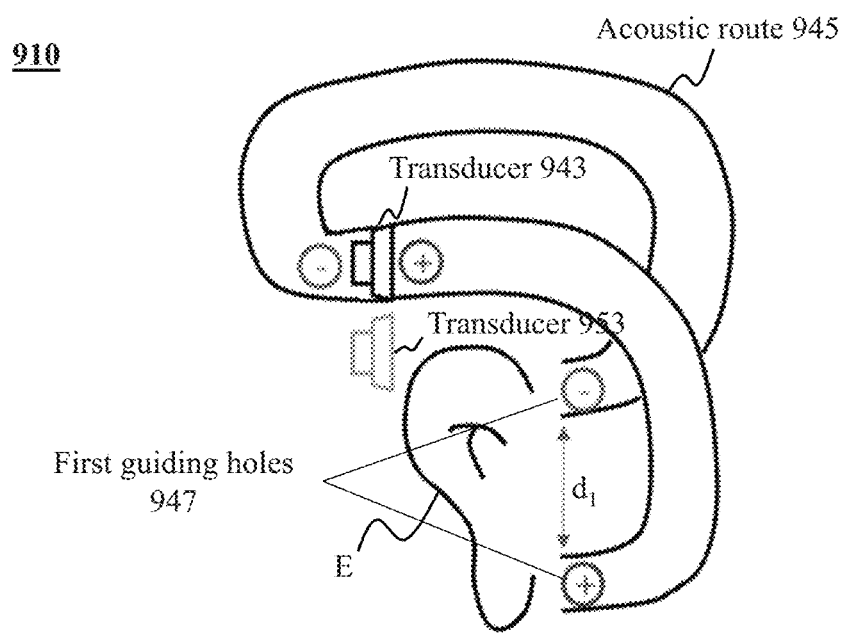
FIG. 9A and FIG. 9B are schematic diagrams illustrating an exemplary acoustic output device according to some embodiments of the present disclosure.
Figure 9B:
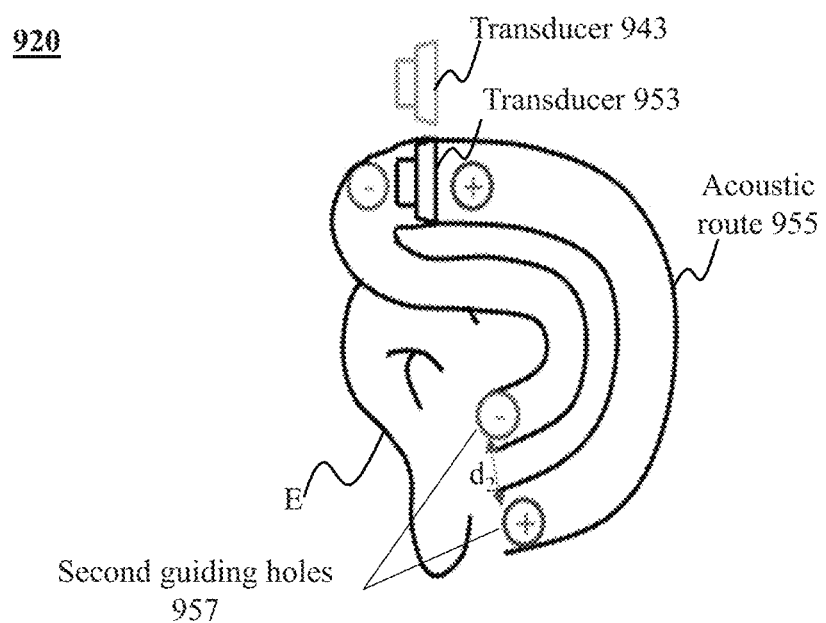

FIG. 9A and FIG. 9B are schematic diagrams illustrating an exemplary acoustic output device according to some embodiments of the present disclosure. For the purposes of illustration, an outward propagating sound formed by the same transducer coupled with different guiding holes may be described as an example. In FIG. 9A and FIG. 9B, each transducer may have a front side and a rear side, and a corresponding front chamber (i.e., a first acoustic route) and a rear chamber (i.e., a second acoustic route) may exist on the front side or the rear side of the transducer, respectively. In some embodiments, the front chamber and the rear chamber may have the same or the substantially same equivalent acoustic impedance, such that the transducers may be loaded symmetrically. The symmetrical load of the transducer may form sound sources satisfy an amplitude and phase relationship at different guiding holes (such as the "two point sound sources" having the same amplitude and opposite phases as described above), such that a specific sound field may be formed in high-frequency and/or low-frequency (e.g., a near-field sound may be enhanced and a far-field leakage may be suppressed).

As shown in FIG. 9A and FIG. 9B, the acoustic driver (e.g., the acoustic driver 910 or the acoustic driver 920) may include transducers, and acoustic routes and guiding holes connected with the transducer. In order to describe the actual application scenarios of the acoustic output device more clearly, a position of the user's ear E may also be shown in FIG. 9A and FIG. 9B for the explanation. FIG. 9A illustrates an application scenario of the acoustic driver 910. The acoustic driver 910 may include a transducer 943, and the transducer 943 may be coupled with two first guiding holes 947 through an acoustic route 945. FIG. (b) in FIG. 9A and FIG. 9B illustrates an application scenario of the acoustic driver 920. The acoustic driver 920 may include a transducer 953, and the transducer 953 may be coupled with two second guiding holes 957 through an acoustic route 955.

The transducer 943 or 953 may vibrate under the driving of an electric signal, and the vibration may generate sound with equal amplitudes and opposite phases (180 degrees inversion). The type of transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 943 or 953 may include a vibration diaphragm, which may vibrate when driven by an electrical signal, and the front and rear sides of the vibration diaphragm may simultaneously output a normal-phase sound and a reverse-phase sound. In FIG. 9A and FIG. 9B, "+" and "−" may be used to exemplify sounds with different phases, wherein "+" may represent a normal-phase sound, and "−" may represent a reverse-phase sound.

In some embodiments, the transducer may be encapsulated by a housing (e.g., a supporting structure), and the interior of the housing may be provided with sound channels connected with the front and rear sides of the transducer, respectively, thereby forming an acoustic route. For example, the front cavity of the transducer 943 may be coupled to one of the two first guiding holes 947 through a first acoustic route (i.e., the first half of the acoustic route 945), and the rear cavity of the transducer 943 may acoustically be coupled to the other guiding hole of the two first guiding holes 947 through a second acoustic route (i.e., the second half of the acoustic route 945). Normal-phase sound and reverse-phase sound that output from the transducer 943 may be output from the two first guiding holes 947, respectively. As another example, the front cavity of the transducer 153 may be coupled to one of the two guiding holes 957 through a third acoustic route (i.e., the first half of the acoustic route 955), and the rear cavity of the transducer 953 may be coupled to another guiding hole of the two second guiding holes 957 through a fourth acoustic route (i.e., the second half of the acoustic route 955). The normal-phase sound and the reverse-phase sound output from the transducer 153 may be output from the two second guiding holes 957, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5 MKS Rayleigh to 500 MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the guiding holes with the same size or shape, etc., may be used.

A distance between the two first guiding holes 947 of the low-frequency acoustic driver may be expressed as $d_1$ (i.e., a first distance). The distance between the two second guiding holes 157 of the high-frequency acoustic driver may be expressed as $d_2$ (i.e., a second distance). By setting the distance between the guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first guiding holes 947 is greater than the distance between the two second guiding holes 957 (i.e., $d_1 > d_2$).

In some embodiments, the transducer 943 and the transducer 953 may be housed together in a housing of an acoustic output device, and be placed in isolation in a structure of the housing.

In some embodiments, the acoustic output device may include multiple sets of high-frequency acoustic drivers and low-frequency acoustic drivers. For example, the acoustic output device 300 may include a group of high-frequency acoustic drivers and a group of low-frequency acoustic drivers for simultaneously outputting sound to the left and/or right ears. As another example, the acoustic output device may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values.

Figure 10A:
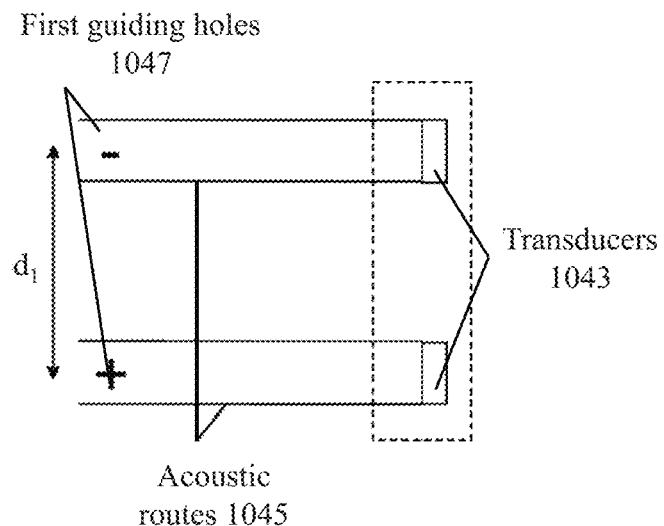
FIG. 10A, FIG. 10B, and FIG. 10C are schematic diagrams illustrating processes for sound output according to some embodiments of the present disclosure.
Figure 10B:
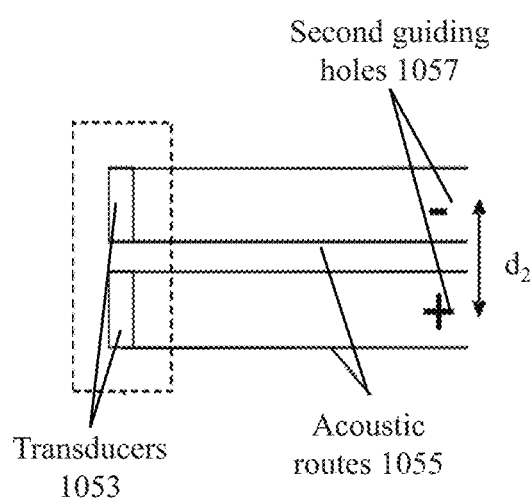
Figure 10C:
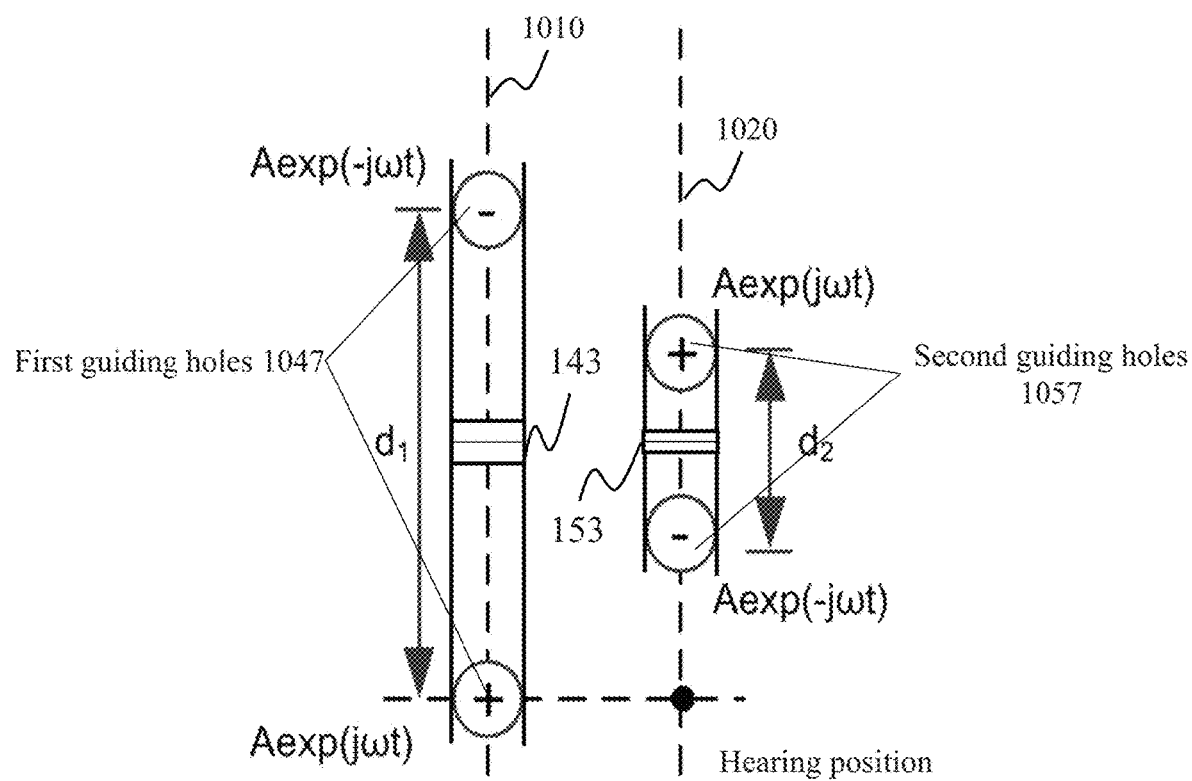

FIG. 10A, FIG. 10B, and FIG. 10C are schematic diagrams illustrating processes for sound output according to some embodiments of the present disclosure.

In some embodiments, an acoustic output device may generate sounds in the same frequency range through two or more transducers, and the sounds may propagate outwards through different guiding holes. In some embodiments, different transducers may be controlled by the same or different controllers, respectively, and may produce sounds that satisfy certain phase and amplitude conditions (e.g., sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as a low-frequency acoustic driver 1010 and a high-frequency acoustic driver 1020) may be arranged side by side in an acoustic output device, one of which may be used to output normal-phase sound, and the other may be used to output reverse-phase sound. As shown in FIG. 10A, the low-frequency acoustic driver 1010 may include two transducers 1043, two acoustic routes 1045, and two first guiding holes 1047. The high-frequency acoustic driver 1020 may include two transducers 1053, two acoustic routes 1055, and two second guiding holes 1057. Driven by electrical signals with opposite phases, the two transducers 1043 may generate a set of low-frequency sounds with opposite phases (180 degrees inversion). One of the two transducers 1043 may output normal-phase sound (such as the transducer located below), and the other may output reverse-sound (such as the transducer located above). The two sets of low-frequency sounds with opposite phases may be transmitted to the two first guiding holes 1047 along the two acoustic routes 1045, respectively, and propagate outwards through the two first guiding holes 1047. Similarly, driven by electrical signals with opposite phases, the two transducers 1053 may generate a set of high-frequency sounds with opposite phases (180 degrees inversion). One of the two transducers 1053 may output normal-phase high-frequency sound (such as the transducer located below), and the other may output a reverse-phase high-frequency sound (such as the transducer located above). The high-frequency sound with opposite phases may be transmitted to the two second guiding holes 1057 along the two acoustic routes 1055, respectively, and propagate outwards through the two second guiding holes 1057.

In some embodiments, the two transducers in the acoustic driver (e.g., the low-frequency acoustic driver 1010 and the high-frequency acoustic driver 1020) may be arranged relatively close to each other along the same straight line, and one of them may be used to output a normal-phase sound and the other may be used to output a reverse-sound. As shown in FIG. 10C, the left side may be the low-frequency acoustic driver 1010, and the right side may be the high-frequency acoustic driver 1020. The two transducers 1043 of the acoustic driver 1040 may generate a set of low-frequency sounds of equal amplitude and opposite phases under the control of the controller, respectively. One of the transducers may output normal low-frequency sound, and transmit the normal low-frequency sound along a first acoustic route to a first guiding hole. The other transducer may output reverse-phase low-frequency sound, and transmit the reverse-phase low-frequency sound along the second acoustic route to another first guiding hole. The two transducers 1053 of the high-frequency acoustic driver 1020 may generate high-frequency sound of equal amplitude and opposite phases under the control of the controller, respectively. One of the transducers may output normal-phase high-frequency sound, and transmit the normal-phase high-frequency sound along a third acoustic route to a second guiding hole. The other transducer may output reverse-phase high-frequency sound, and transmit the reverse-phase high-frequency sound along the fourth acoustic route to another second guiding hole.

In some embodiments, the transducer 1043 and/or the transducer 1053 may be of various suitable types. For example, the transducer 1043 and the transducer 1053 may be dynamic coil speakers, which may have the characteristics of a high sensitivity in low-frequency, a large dive depth of low-frequency, and a small distortion. As another example, the transducer 1043 and the transducer 1053 may be moving iron speakers, which may have the characteristics of a small size, a high sensitivity, and a large high-frequency range. As another example, the transducers 1043 and 1053 may be air-conducted speakers, or bone-conducted speakers.

As another example, the transducer 1043 and the transducer 1053 may be balanced armature speakers. In some embodiments, the transducer 1043 and the transducer 1053 may be different types of transducers. For example, the transducer 1043 may be a moving iron speaker, and the transducer 1053 may be a moving coil speaker. As another example, the transducer 1043 may be a moving coil speaker, and the transducer 1053 may be a moving iron speaker.

In FIGS. 10A-10C, the distance between the two point sound sources of the acoustic driver 1010 may be $d_1$, and the distance between the two point sound sources of the acoustic driver 1020 may be $d_2$, and $d_1$ may be greater than $d_2$. As shown in FIG. 10C, the hearing position (that is, the position of the ear canal when the user wears an acoustic output device) may be located on a line of a set of two point sound sources. In some alternative embodiments, the hearing position may be any suitable position. For example, the hearing position may be located on a circle centered on the center point of the two point sound sources. As another example, the hearing position may be on the same side of two sets two point sound sources connection, or in the middle of a line connecting the two sets two point sound sources.

It should be understood that the simplified structure of the acoustic output device shown in FIGS. 10A-10C may be merely by way of example, which may be not a limitation for the present disclosure. In some embodiments, the acoustic output device 400 and/or 500 may include a supporting structure, a controller, a signal processor, or the like, or any combination thereof.

Figure 11A:
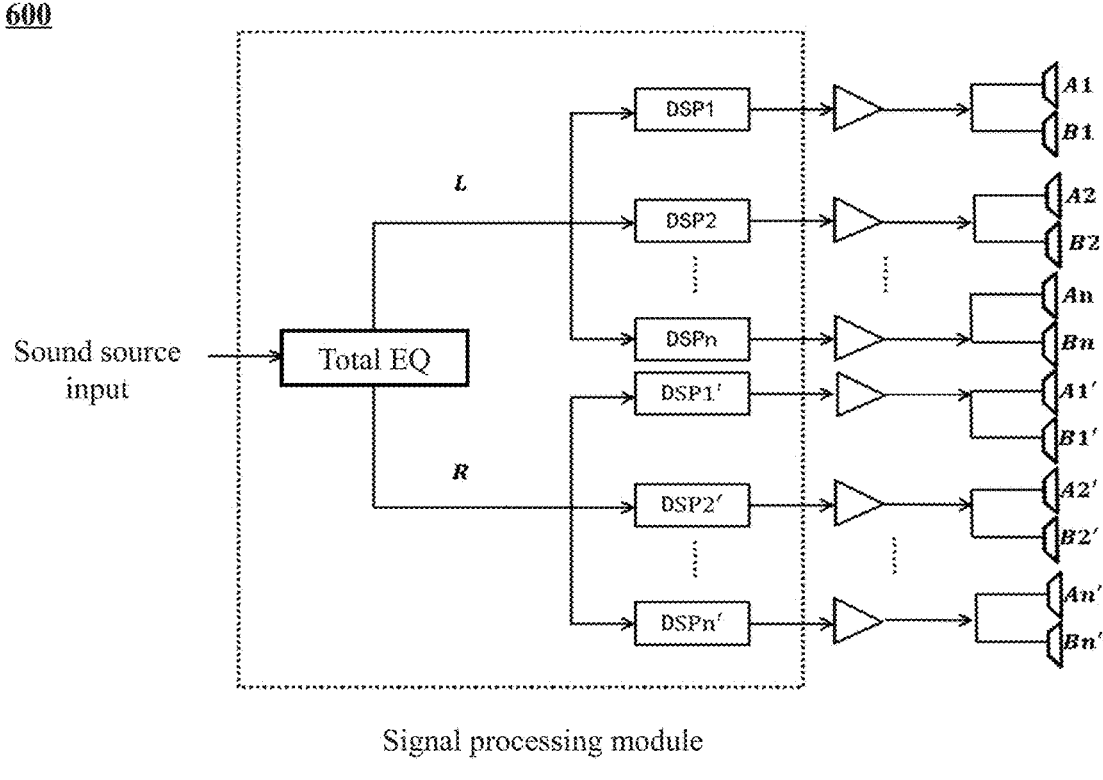
FIGS. 11A and 11B are schematic diagrams illustrating exemplary acoustic output devices according to some embodiments of the present disclosure.
Figure 11B:
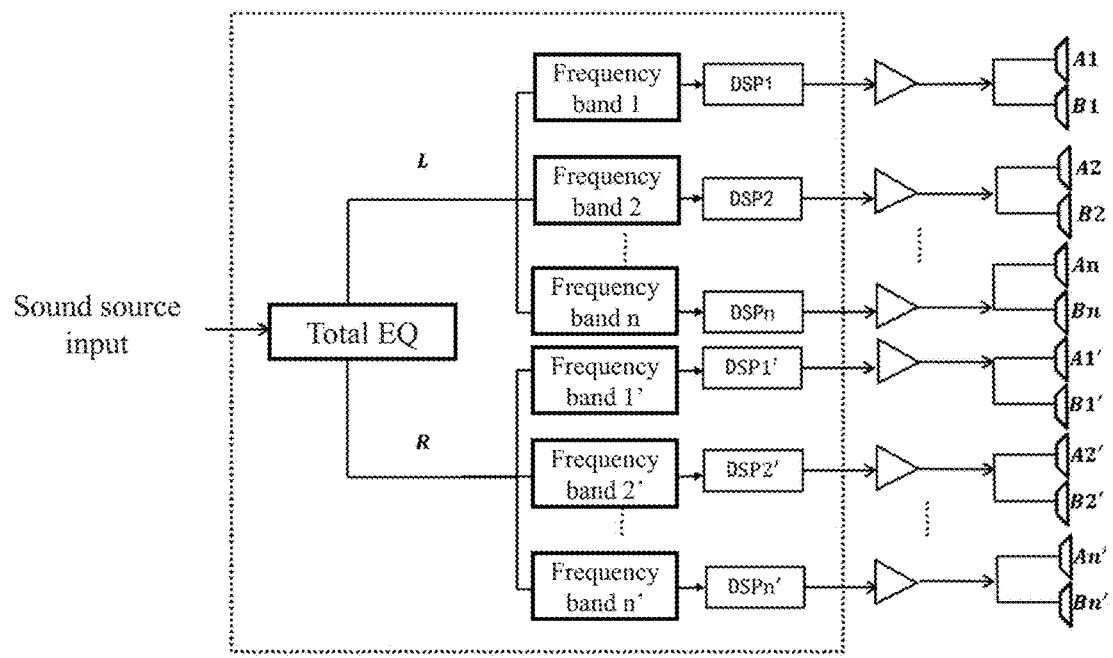

FIG. 11A is a schematic diagram illustrating an exemplary acoustic output device according to some embodiments of the present disclosure. FIG. 11B is a schematic diagram illustrating another acoustic output device according to some embodiments of the present disclosure.

In some embodiments, acoustic drivers (e.g., acoustic drivers 1010 or 1020) may include multiple groups of narrow-band speakers. As shown in FIG. 11A, the acoustic output device may include a plurality of groups of narrow-band speaker units and a signal processing unit. On the left or right side of the user, the acoustic output device may include n groups, respectively, with a total number of 2*n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 11A as an example: A1~An and B1~Bn form n groups of two point sound sources, respectively. When the same electrical signal is an input, each two point sound sources may generate sound with different frequency ranges. By setting the distance do of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing unit may include an Equalizer (EQ) processing unit, and a Digital Signal Processor (DSP) processing unit. The signal processing unit may be used to implement signal equalization and other general digital signal processing algorithms (such as amplitude modulation and equal modulation). The processed signal may output sound by being connected with a corresponding acoustic driver (e.g., a narrow-band speaker) structure. In some embodiments, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as the acoustic driver 1010 or 1020) may include multiple groups of full-band speakers. As shown in FIG. 11B, the acoustic output device may include a plurality of sets of full-band speaker units and a signal processing unit. On the left or right side of the user, the acoustic output device may include n groups, respectively, with a total number of 2*n full-band speaker units. Each full-band speaker unit may have the same or similar frequency response curve, and may cover a wide frequency range.

Taking the speaker unit located on the left side of the user as shown in FIG. 11B as an example: A1~An and B1~Bn form n dual-point sound sources, respectively. The difference from FIG. 11A may be that the signal processing unit in FIG. 11B may include at least one set of filters for frequency division of the sound source signal, and the electric signals corresponding to different frequency ranges may be input into each group of full-band speakers. In this way, each group of speaker units (similar to the dual-point sound sources) may produce sounds with different frequency ranges separately.

Figure 12A:
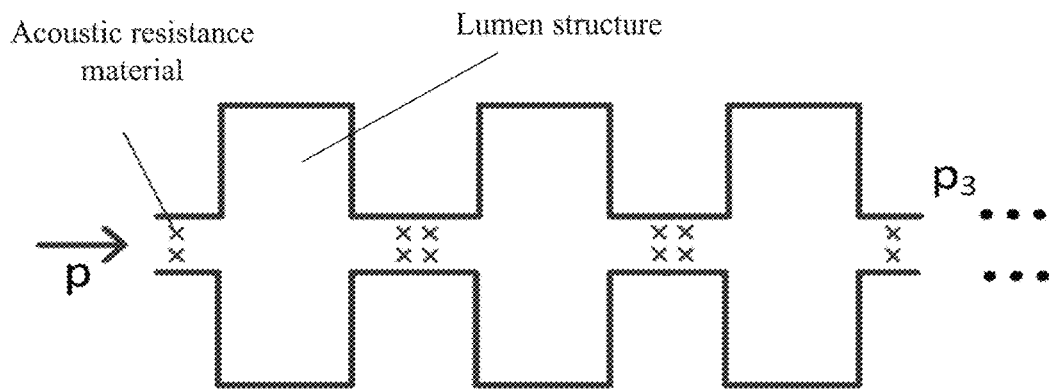
FIGS. 12A, 12B, and 12C are schematic diagrams illustrating acoustic routes according to some embodiments of the present disclosure.
Figure 12B:
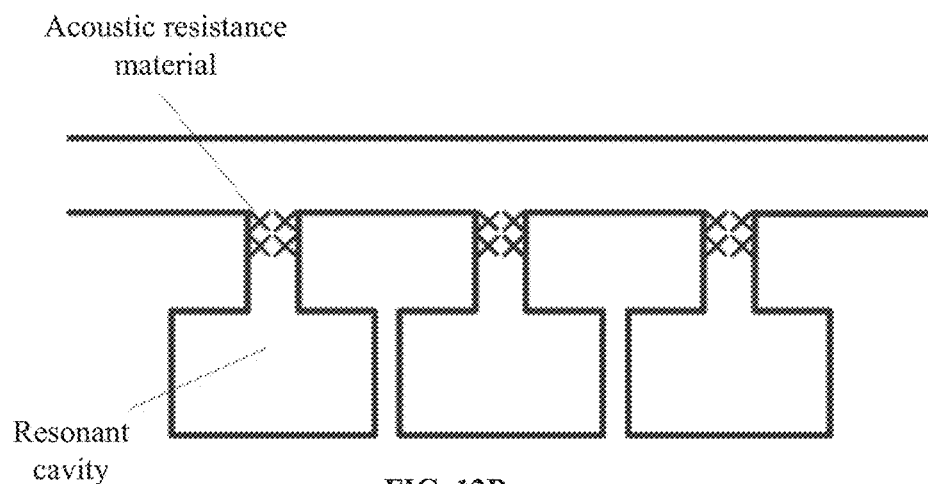
Figure 12C:
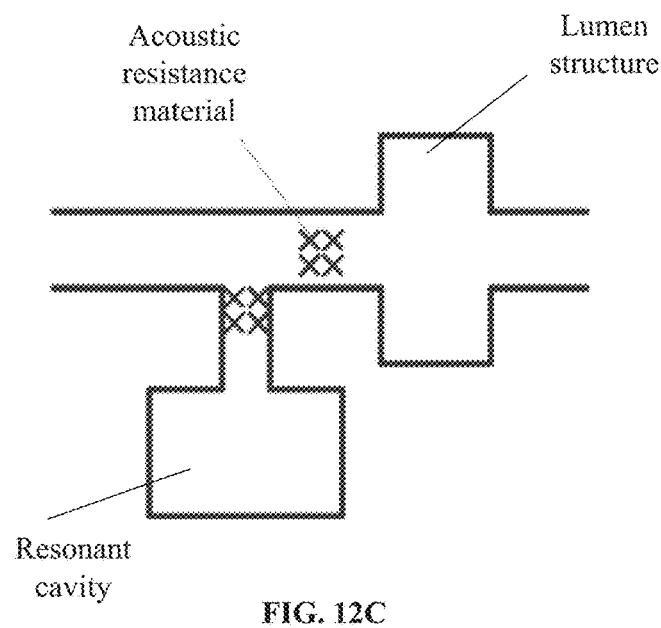

FIGS. 12A-12C are schematic diagrams illustrating acoustic routes according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 12A-12C show a schematic structural diagram of frequency division of a voice signal using an acoustic route. It should be noted that FIGS. 12A-12C may be examples of setting the acoustic route when using the acoustic route to divide the voice signal, and may not be a limitation on the present disclosure.

As shown in FIG. 12A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 12B, a structure with one or more sets of resonant cavities (e.g., Helmholtz cavity) may be constructed on the acoustic route branch, and the filtering effect may be achieved by adjusting the size of each structure and the acoustic resistance material. As shown in FIG. 12C, a combination of a lumen and a resonant cavity (e.g., a Helmholtz cavity) structure may be constructed in an acoustic route, and a filtering effect may be achieved by adjusting the size of each structure and the acoustic resistance material.

Figure 13:
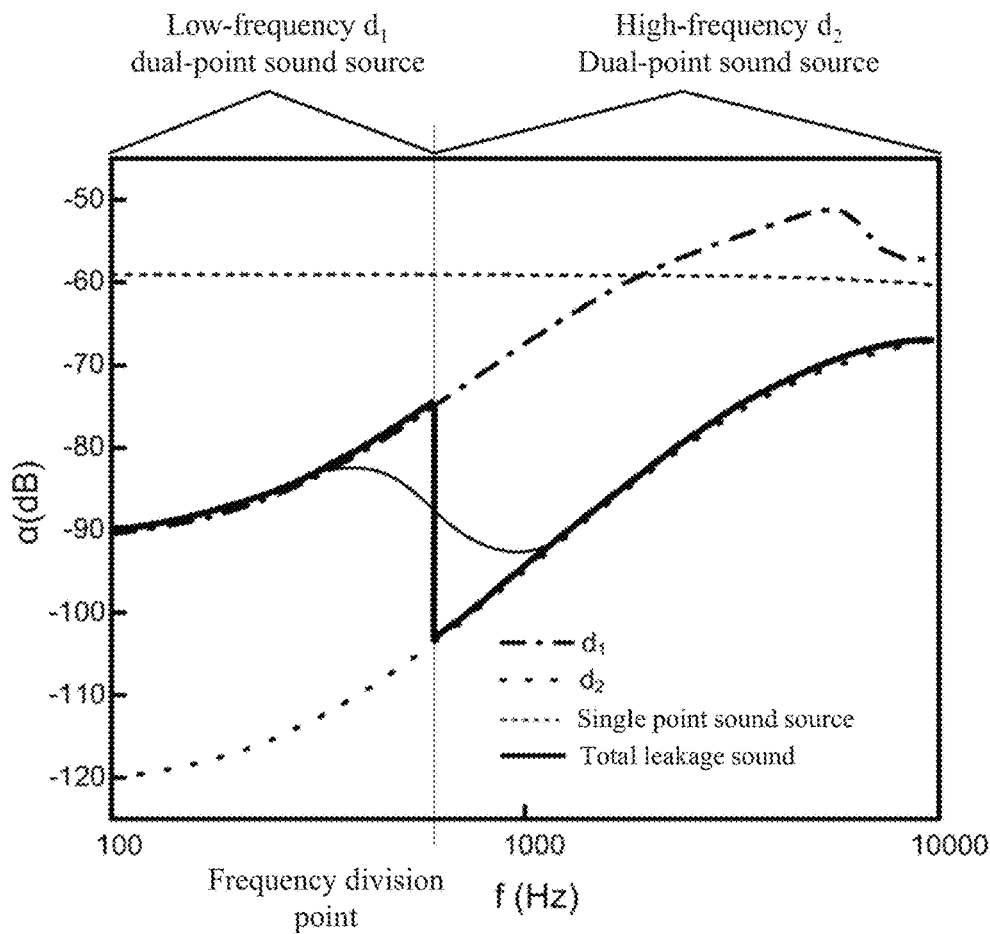
FIG. 13 is a graph illustrating sound leakage under a combined action of two sets of exemplary dual-point sound sources according to some embodiments of the present disclosure.

FIG. 13 is an exemplary graph illustrating sound leakage under a combined action of two sets of dual-point sound sources according to some embodiments of the present disclosure.

FIG. 13 shows a curve of the sound leakage of an acoustic output device (e.g., the glasses 100, the acoustic output device 200, the acoustic output device 800, etc.) under the combined action of two sets of dual-point sound sources (e.g., a set of high-frequency dual-point sound source and a set of low-frequency dual-point sound source). The frequency division points of the two sets of dual-point sound sources may be around 700 Hz.

A normalization parameter a may be used to evaluate the volume of the leakage sound (for calculation of a, see Equation (4)). As shown in FIG. 13, compared with the case of a single point sound source, the dual-point sound source may have a relatively strong ability to reduce sound leakage. In addition, compared with the acoustic output device provided with only one set of dual-point sound source, the two sets of dual-point sound sources may output high-frequency sounds and low-frequency sounds, separately. A distance between the low-frequency dual-point sound source may be greater than that of the high-frequency dual-point sound source. In the low-frequency range, by setting a larger distance ($d_1$) between two point sound sources of a dual-point sound source, increment of the volume of the near-field sound may be greater than increment of the volume of the far-field leakage and may achieve a higher volume of the near-field sound output in the low-frequency band. At the same time, in the low-frequency range, the sound leakage of the dual-point sound source may originally be relatively small. After the distance between the two point sound sources is increased, the slightly increased sound leakage may still maintain a low level. In the high-frequency range, by setting a relatively small distance (d2) between the two point sound sources of the dual-point sound source, the problems of the cutoff frequency of high-frequency sound leakage reduction being too low and the audio band of the sound leakage reduction being too narrow may be overcome. By setting the distance $d_1$ between the two point sound sources of the dual-point sound source in the low-frequency band and the distance $d_2$ between the two point sound sources of the dual-point sound source in the high-frequency band, the acoustic output device provided in the embodiments of the present disclosure may obtain a stronger sound leakage suppressing capability than a single point sound source and a set of dual-point sound source.

In some embodiments, affected by factors such as the filter characteristics of the actual circuit, the frequency characteristics of the transducer, and the frequency characteristics of the acoustic channel, the actual low-frequency and high-frequency sounds of the acoustic output device may differ from those shown in FIG. 13. In addition, low-frequency and high-frequency sounds may have a certain crossover (aliasing) in the frequency band near the frequency division point, causing the total sound leakage reduction of the acoustic output device not to have a mutation at the frequency division point as shown in FIG. 13. Instead, there may be gradients and transitions in the frequency band near the frequency division point, as shown in the thin solid line in FIG. 13. It should be understood that these differences may not affect the overall leakage reduction effect of the acoustic output device provided by the embodiment of the present disclosure.

According to FIG. 8 to FIG. 13 and the related descriptions, the acoustic output device provided by the present disclosure may be used to output sounds in different frequency bands by setting at least one high-frequency dual-point sound source and at least one low-frequency dual-point sound source, so as to achieve a better sound output effect. In addition, by setting different sets of dual-point sound sources with different distances, the acoustic output device may have a relatively stronger capability to reduce the sound leakage in a high frequency band and meet the requirements of an open acoustic output device.

In another aspect of the present disclosure, another acoustic output device may be provided. The acoustic output device may include at least one set of acoustic drivers, and the sound generated by the at least one set of acoustic drivers may propagate outwards through at least two guiding holes acoustically coupled with the at least one set of acoustic drivers. In some embodiments, the acoustic output device may include a baffle, and the at least two guiding holes may be distributed on both sides of the baffle, respectively. In some embodiments, the at least two guiding holes may be distributed on both sides of the user's auricle. In this case, the auricle may serve as a baffle to separate the at least two guiding holes, and the at least two guiding holes may have different acoustic routes to the user's ear canal. More descriptions regarding the dual-point sound source and the baffle may be found in International applications No. PCT/CN2019/130921 and No. PCT/CN2019/130942, both filed on Dec. 31, 2019, the entire contents of each of which are hereby incorporated by reference.

Figure 14:
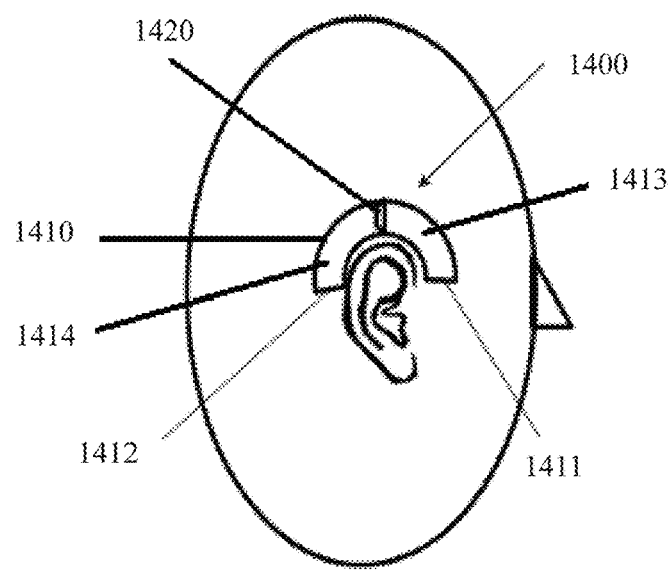
FIG. 14 is a schematic diagram illustrating an exemplary acoustic output device according to some embodiments of the present disclosure.

FIG. 14 is a schematic diagram illustrating an exemplary acoustic output device according to some embodiments of the present disclosure. As shown in FIG. 14, an acoustic output device 1400 may include a supporting structure 1410 and an acoustic driver 1420, which may be disposed in the supporting structure 1410. In some embodiments, the acoustic output device 1400 may be worn on a user's body (e.g., the head, the neck, the upper torso, etc. of the user) e.g., through the supporting structure 1410. The supporting structure 1410 and the acoustic driver 1420 may be close to and not block an ear canal of the user. The ear of the user may be in an open state. The user may hear a sound output from the acoustic output device 1400 and a sound from an external source. For example, the acoustic output device 1400 may be arranged around or partially around the user's ear and may transmit the sound via an air conduction manner or a bone conduction manner.

The supporting structure 1410 may be configured to support one or more acoustic drivers 1420. In some embodiments, the supporting structure 1410 may include an enclosed shell structure with an internal hollow, and the one or more acoustic drivers 1420 may be disposed in the supporting structure 1410. In some embodiments, the acoustic output device 1400 may be combined with a product such as a pair of glasses, a headset, a display device, an AR/VR helmet, etc. In this case, the supporting structure 1410 may be fixed near the user's ear via a hanging manner or a clamping manner. In some embodiments, the supporting structure 1410 may include a hook, a shape of the hook may be matched the shape of the auricle, and the acoustic output device 1400 may be worn on the user's ear through the hook, independently. The acoustic output device 1400, which is worn on the user's ear independently may be communicated with a signal source (e.g., a computer, a mobile phone, or other mobile devices) in a wired or wireless manner (e.g., Bluetooth). For example, the acoustic output device 1400 worn on the left ear and/or that worn on the right ear may be directly communicated with the signal source via a wireless manner. As another example, the acoustic output device 1400 worn at the left and/or right ear may include a first output part and a second output part. The first output part may be communicated with the signal source, and the second output part may be connected with the first output part via a wireless manner. The sound may be output synchronously by the first output part and the second output part controlled by one or more synchronization signals. The wireless manner may include but not limited to Bluetooth, a local area network, a wide area network, a wireless personal area network, a near-field communication, or the like, or any combination thereof.

In some embodiments, the supporting structure 1410 may include a shell structure, and a shape of the supporting structure 1410 may be matched a shape of the ear of the user. The shape of the supporting structure 1410 may include a circular ring, an oval, a (regular or irregular) polygonal, a U-shape, a V-shape, a semi-circle, etc., and the supporting structure 1410 may be directly anchored at the user's ear. In some embodiments, the supporting structure 1410 may also include one or more fixed parts. The fixed part may include an ear hook, a head beam, an elastic band, or the like, or any combination thereof, which may be used to fix the acoustic output device 1400 on the user and prevent the acoustic output device 1400 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1400 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 1410 of the acoustic output device 1400 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1400, the supporting structure 1410 may be placed above or below the auricle. The supporting structure 1410 may also include a guiding hole 1411 and a guiding hole 1412, which may be configured to transmit sounds. In some embodiments, the guiding hole 1411 and the guiding hole 1412 may be placed on two sides of the user's auricle, respectively. The acoustic driver 1420 may output sound(s) through the guiding hole 1411 and/or the guiding hole 1412.

The acoustic driver 1420 may be configured to receive an electrical signal, and convert the electrical signal into a voice signal which may be output. In some embodiments, a type of the acoustic driver 1420 may include an acoustic driver with a low-frequency, an acoustic driver with a high-frequency, an acoustic driver with a full-frequency, or the like, or any combination thereof, according to the frequency of the acoustic driver 1420. In some embodiments, the acoustic driver 1420 may include a moving coil acoustic driver, a moving iron acoustic driver, a piezoelectric acoustic driver, an electrostatic acoustic driver, a magnetostrictive acoustic driver according to a principle of the acoustic driver 1420.

In some embodiments, the acoustic driver 1420 may include a vibration diaphragm. When the vibration diaphragm vibrates, sounds may be transmitted from a front side and a rear side of the vibration diaphragm, respectively. In some embodiments, a front chamber 1413 may be disposed on the front side of the vibration diaphragm in the supporting structure 1410, which may be configured to transmit the sound(s). The front chamber 1413 may be acoustically coupled with the guiding hole 1411. The sound transmitted from the front side of the vibration diaphragm may be transmitted from the guiding hole 1411 through the front chamber 1413. A rear chamber 1414 may be disposed on the rear side of the vibration diaphragm in the supporting structure 1410, which may be configured to transmit the sound(s). The rear chamber 1414 may be acoustically coupled with the guiding hole 1412. The sound transmitted from the rear side of the vibration diaphragm may be transmitted from the guiding hole 1412 through the rear chamber 1414. It should be noted that, when the vibration diaphragm vibrates, the front side and the rear side of the vibration diaphragm may simultaneously generate sounds with opposite phases. After passing through the front chamber 1413 and rear chamber 1414, respectively, the sounds may be transmitted outward from the guiding hole 1411 and the guiding hole 1412. In some embodiments, the sounds output by the acoustic driver 1420, which may be transmitted through the guiding hole 1411 and the guiding hole 1412 may meet the specific requirement by setting a structure of at least one of the front chamber 1413 and the rear chamber 1414. For example, the guiding hole 1411 and the guiding hole 1412 may transmit a set of sounds with a specific phase relationship (e.g., opposite phases) by designing a length of at least one of the front chamber 1413 and the rear chamber 1414, thereby increasing a volume in the near-field of the acoustic output device 1400, avoiding sound leakage of the acoustic output device 1400, and effectively improving the performance of the acoustic output device 1400. As used herein, a length of a front chamber refers to a length of a route between the vibration diaphragm to a guiding hole coupled with the front chamber when a sound (i.e., vibration) propagates from the vibration diaphragm to the guiding hole along the route, and a length of a rear chamber refers to a length of a route between the vibration diaphragm to a guiding hole coupled with the rear chamber when a sound (i.e., vibration) propagates from the vibration diaphragm to the guiding hole along the route.

In some embodiments, the acoustic driver 1420 may include a plurality of vibration diaphragms (e.g., two vibration diaphragms). The plurality of vibration diaphragms may vibrate to generate sounds, respectively. Each of the sounds may be transmitted pass through a chamber that is connected with one of the vibration diaphragms in the supporting structure and may be output from a corresponding guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

As mentioned above (e.g., FIG. 11A, 11B and the related descriptions thereof), under a condition that a sound frequency is constant, as the distance between two point sound sources of the dual-point sound source increases, the volume of the hearing sound and the volume of the leakage sound corresponding to the dual-point sound source may increase. For a clearer description, the relationship between the volume of the hearing sound, the volume of the leakage sound, and the distanced of the two point sound sources may be further described according to FIG. 15 to FIG. 17.

Figure 15:
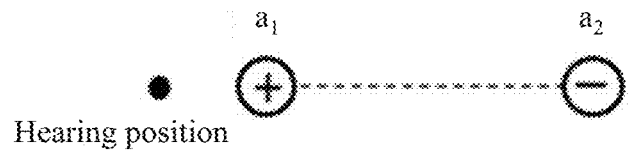
FIG. 15 is a schematic diagram illustrating two point sound sources and a hearing position according to some embodiments of the present disclosure.

FIG. 15 is a schematic diagram illustrating two point sound sources and a hearing position according to some embodiments of the present disclosure. As shown in FIG. 15, a point sound source a1 and a point sound source a2 may be disposed on the same side of the hearing position, and the point sound source a1 may be closer to the hearing position than the point sound source a2. The point sound source a1 and the point sound source a2 may output sounds with the same amplitude and opposite phases.

Figure 16:
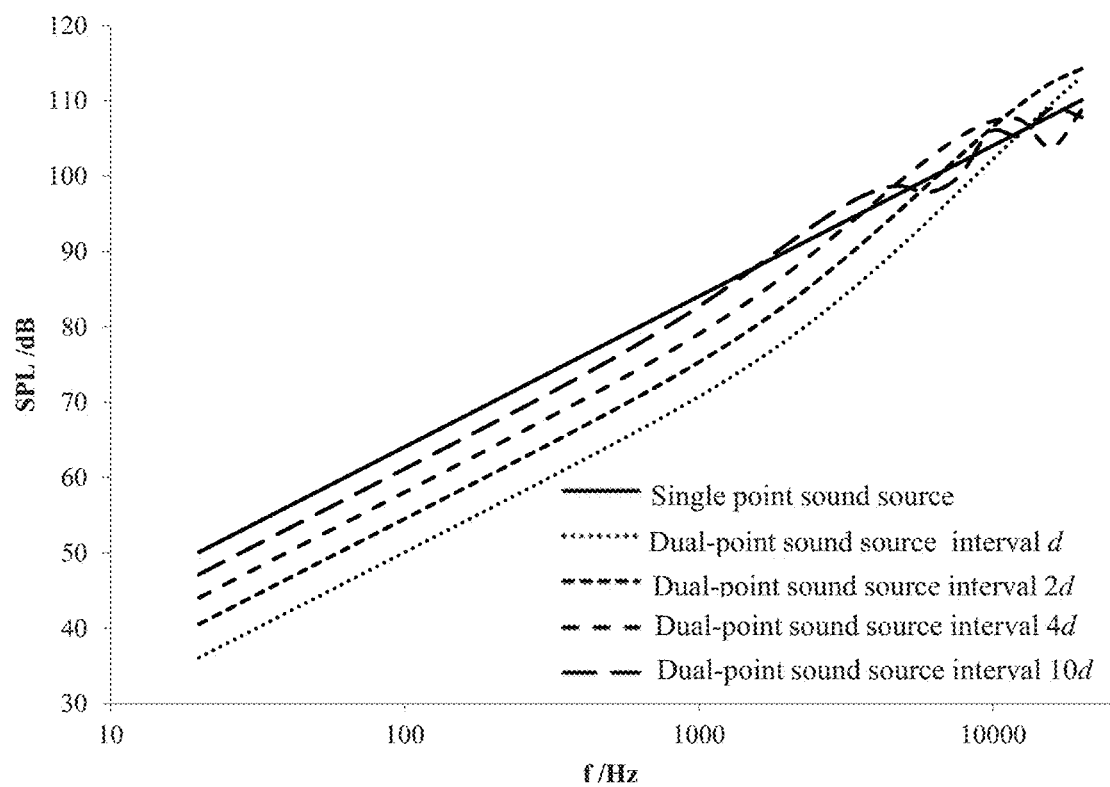
FIG. 16 is a graph illustrating a change of a volume of a hearing sound of a dual-point sound source with different distances along with a frequency according to some embodiments of the present disclosure.

FIG. 16 is a graph illustrating a change of a volume of a hearing sound of a dual-point sound source with different distances along with a frequency according to some embodiments of the present disclosure. The abscissa represents the frequency (f) of the sound output by the dual-point sound source, and the unit may be hertz (Hz). The ordinate represents the volume of the sound, and the unit may be decibel (dB). As shown in FIG. 16, as the distance between the point sound source a1 and the point sound source a2 gradually increases (e.g., from d to 10*d*), the sound volume at the hearing position may be gradually increased. As the distance between the point sound source a1 and the point sound source a2 increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single-point sound source with the same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume at the hearing position generated by the two-point sound sources may be greater than a sound volume at the hearing position generated by the single-point sound source. As used herein, the sound pressure amplitude (i.e., a sound pressure) refers to a pressure generated by the sound through the vibration of the air.

Figure 17:
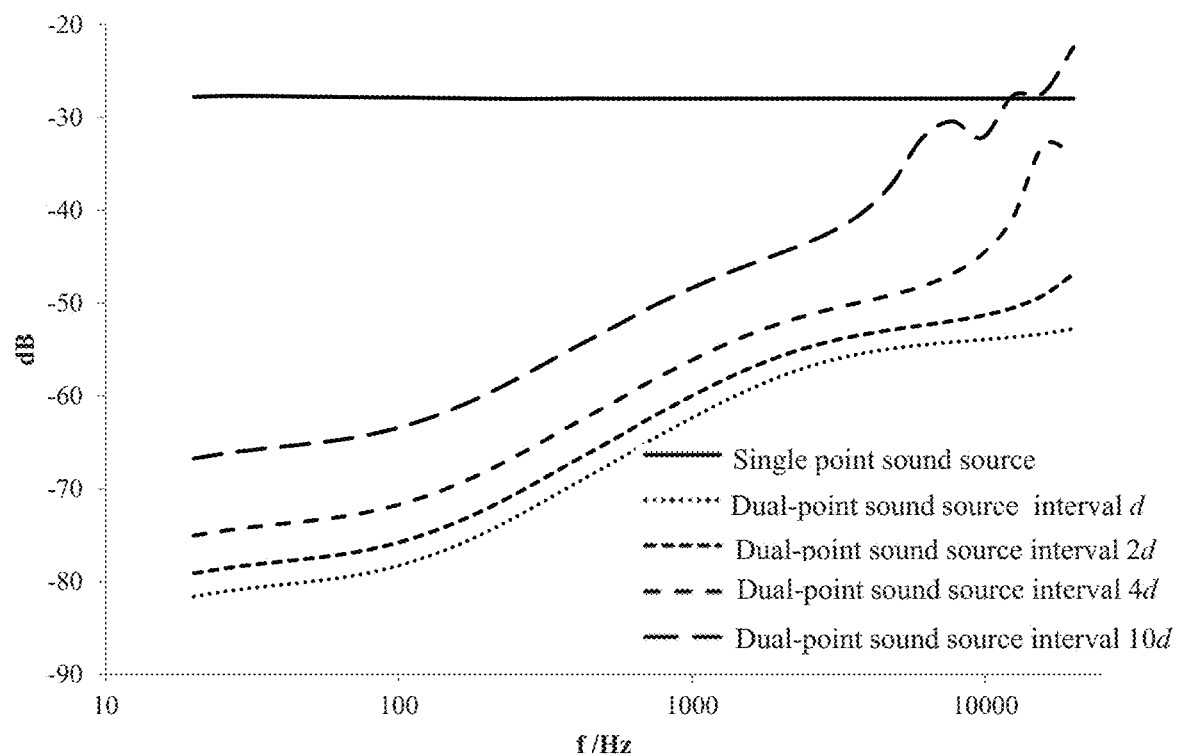
FIG. 17 is a graph illustrating a change of a normalized parameter of a dual-point sound source in a far-field along with a frequency according to some embodiments of the present disclosure.

In some embodiments, the sound volume at the hearing position may be increased by increasing the distance between the point sound sources (e.g., the point sound source a1 and the point sound source a2) of the dual-point sound source. As the distance increases, the sound cancellation of the dual-point sound source may be weakened, thereby increasing sound leakage in the far-field. For illustration purposes, FIG. 17 is a graph illustrating a change of a normalized parameter of a dual-point sound source in a far-field along with a frequency according to some embodiments of the present disclosure. The abscissa may represent the frequency (f) of the sound, the unit may be Hertz (Hz), the ordinate may use a normalized parameter a for evaluating the volume of the leakage sound, and the unit may be decibel (dB). As shown in FIG. 17, taking the far-field normalized parameter a of a single point sound source as a reference, as the distance between two point sound sources of the dual-point sound source increases from d to 10*d*, the far-field normalized parameter a may gradually increase, indicating the sound leakage may gradually increase. More descriptions regarding the normalized parameter a may be found in Equation (4) and related descriptions.

Figure 18:
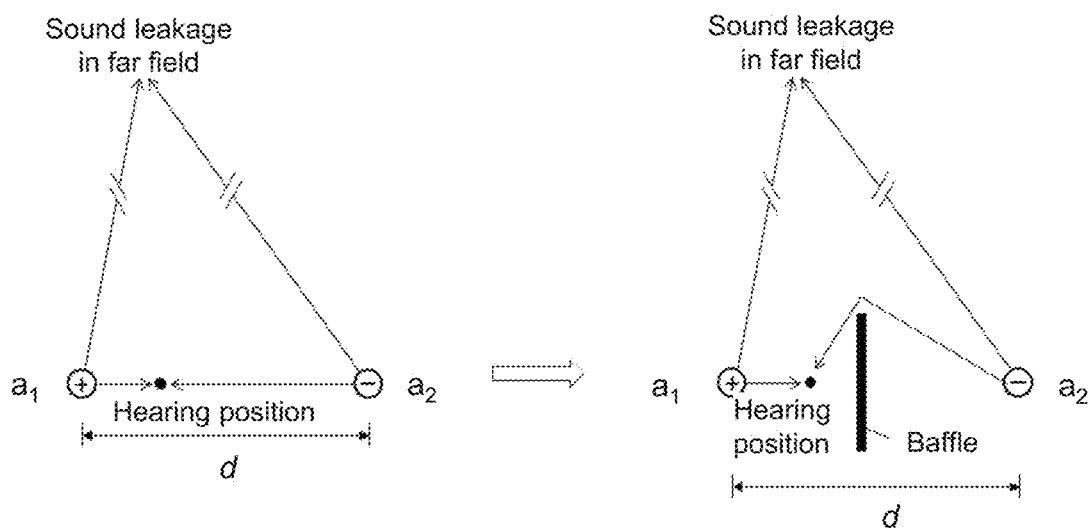
FIG. 18 is a schematic diagram illustrating an exemplary baffle disposed between two point sound sources of a dual-point sound source according to some embodiments of the present disclosure.

In some embodiments, adding a baffle to the acoustic output device may be beneficial to improve the output effect of the acoustic output device, for example, increase the sound intensity of the hearing position in the near-field and reduce the sound leakage in the far-field. For illustration purposes, FIG. 18 is a schematic diagram illustrating an exemplary baffle disposed between two point sound sources of a dual-point sound source according to some embodiments of the present disclosure. As shown in FIG. 18, when the baffle is disposed between a point sound source a1 and a point sound source a2, a sound field of the point sound source a2 may bypass the baffle to interfere with a sound wave of the point sound source a1 at a hearing position in the near-field, which may increase a length of an acoustic route between the point sound source a2 and the hearing position. Assuming that the point sound source a1 and the point sound source a2 have the same amplitude, an amplitude difference between the sound waves of the point sound source a1 and that of the point sound source a2 at the hearing position may be greater than that in a case without a baffle, thereby reducing a sound cancellation of the two sounds at the hearing position, increasing a sound volume at the hearing position. In the far-field, the sound waves generated by the point sound source a1 and the point sound source a2 may not bypass the baffle in a relatively large space, the sound waves may be interfered (as a case without the baffle). Compared to the case without the baffle, the sound leakage in the far-field may be not increased significantly. Therefore, the baffle being disposed between the point sound source a1 and the point sound source a2 may significantly increase the sound volume at the hearing position in the near-field and not significantly increase that of the leakage sound in the far-field.

Figure 19:
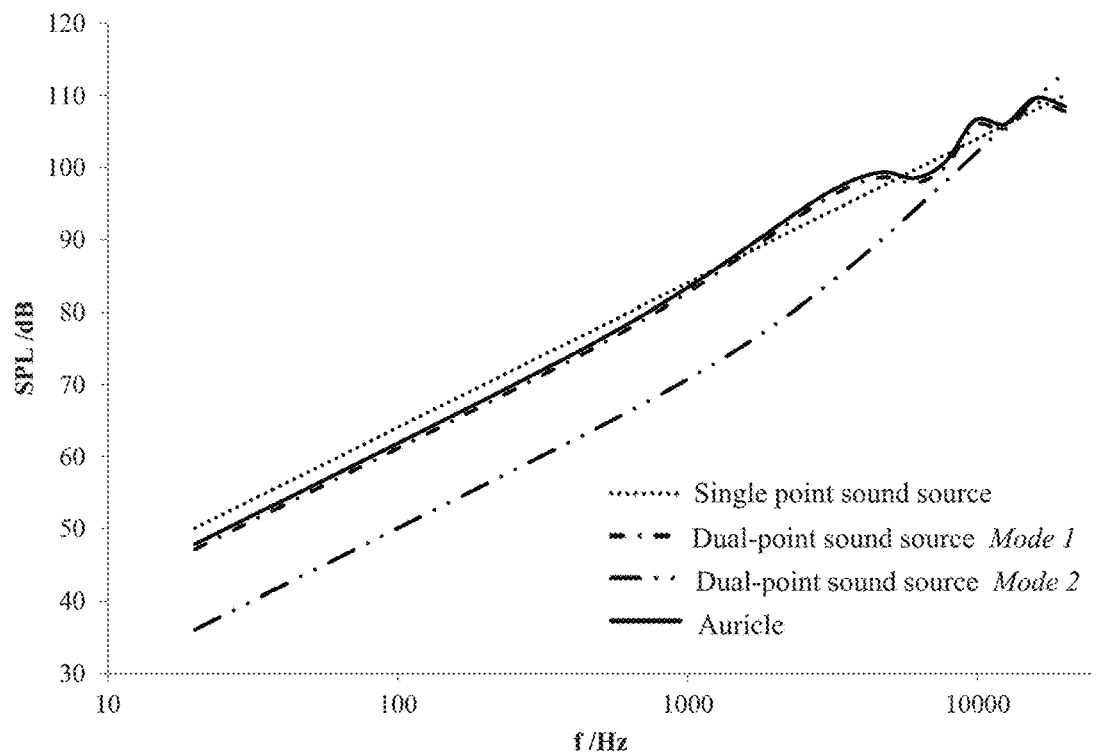
FIG. 19 is a graph illustrating a change of a volume of a hearing sound along with a frequency when a user's auricle is arranged between two point sound sources of a dual-point sound source according to some embodiments of the present disclosure.
Figure 20:
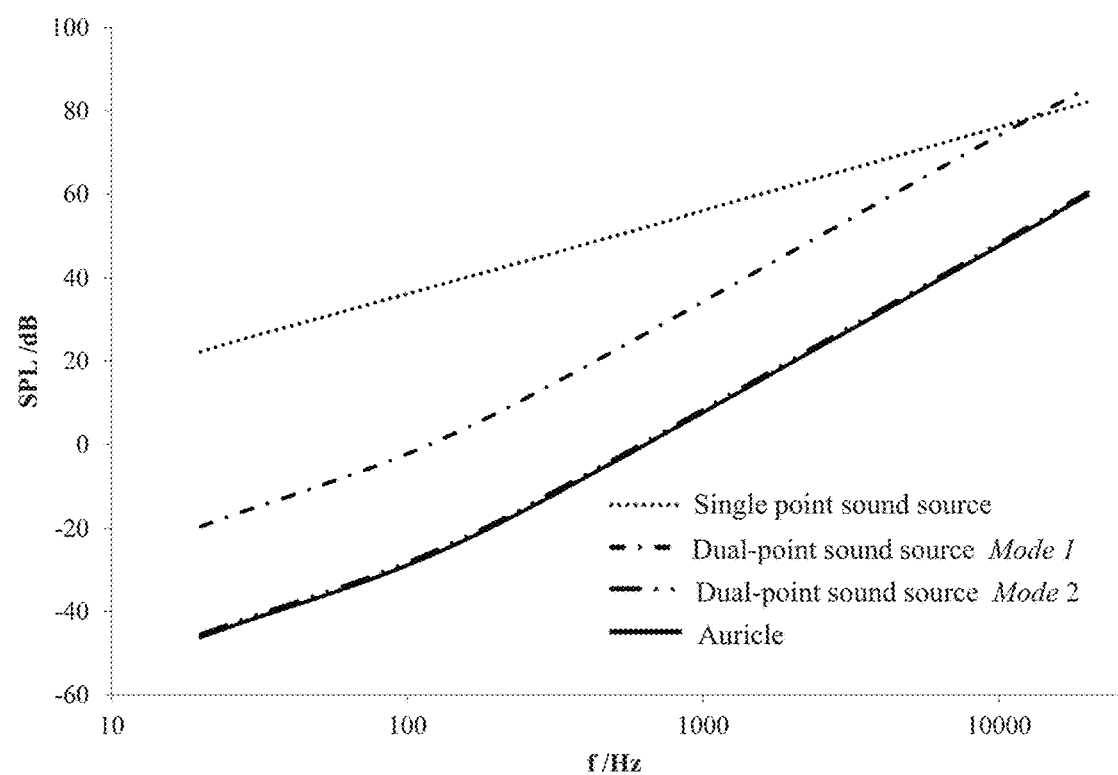
FIG. 20 is a graph illustrating a change of a volume of a leakage sound along with a frequency when an auricle is arranged between two point sound sources of a dual-point sound source according to some embodiments of the present disclosure.
Figure 21:
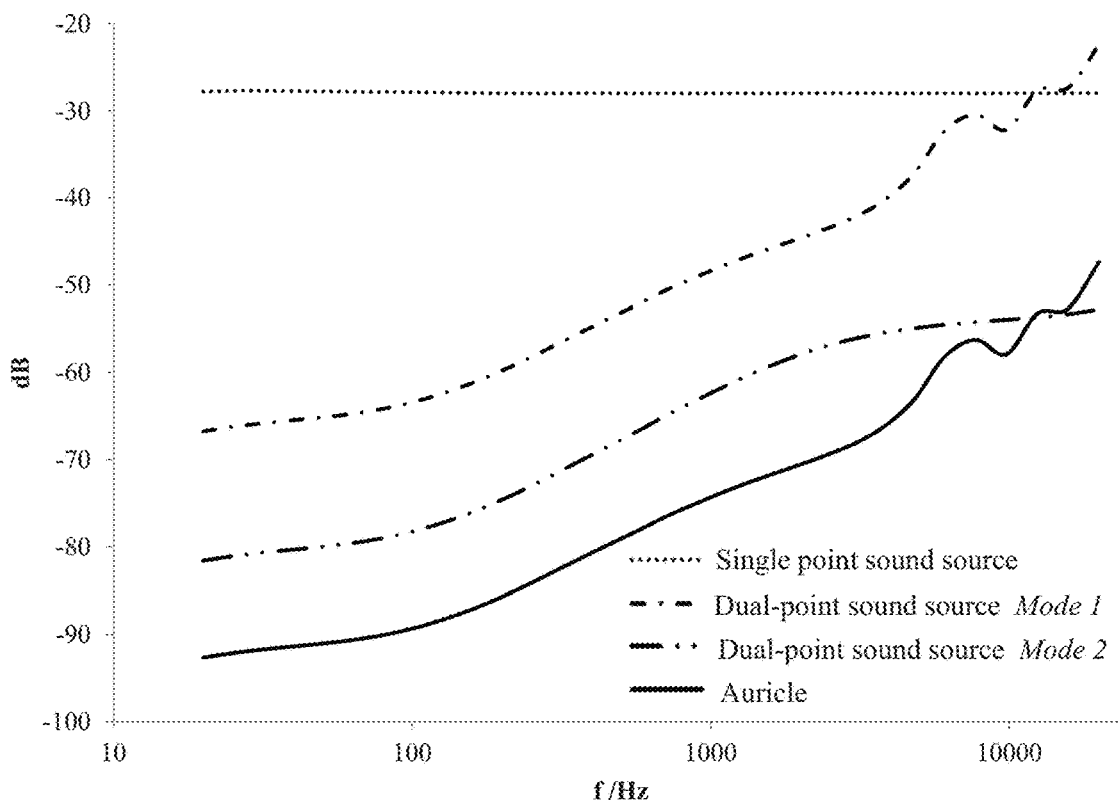
FIG. 21 is a graph illustrating a change of a normalized parameter along with a frequency when two point sound sources of a dual-point sound source of an acoustic output device are disposed on two sides of an auricle according to some embodiments of the present disclosure.

In the present disclosure, when the two point sound sources of the dual-point sound source are arranged on both sides of the auricle, the auricle may serve as a baffle, thus the auricle may also be referred to as a baffle for convenience. Merely by way of example, due to the existence of the auricle, a sound in the near-field may be generated by the dual-point sound source with a distance D1 (also referred to as Mode 1). A sound in the far-field may be generated by the dual-point sound source with a distance D2 (also referred to as Mode 2), and D1>D2. FIG. 19 is a graph illustrating a change of a volume of a hearing sound along with a frequency when a user's auricle is arranged between two point sound sources of a dual-point sound source according to some embodiments of the present disclosure. As shown in FIG. 19, for a low-frequency (e.g., a frequency less than 1000 Hz), a volume of the sound in the near-field (i.e., a sound heard by an ear of a user) may be the same as or similar to that in Mode 1 when the dual-point sound source are located on two sides of the auricle, which may be greater than a volume of a sound in the near-field in Mode 2 and may be close to a volume of a sound in a near-field of a single-point sound source. As the frequency increases (e.g., 2000 Hz-7000 Hz), the volume of the sound in the near-field in Mode 1 and generated by the two point sound sources of the dual-point sound source located on two sides of the auricle may be greater than that of the single-point sound source. It should be understood that, when the auricle is located between the two point sound sources of the dual-point sound source, the volume of the sound in the near-field transmitted from a sound source to the ear may be effectively increased. FIG. 20 is a graph illustrating a change of a volume of a leakage sound along with a frequency when an auricle is arranged between two point sound sources of a dual-point sound source according to some embodiments of the present disclosure. As shown in FIG. 20, as the frequency increases, the sound leakage in the far-field may be increased. When the dual-point sound source is located on two sides of the auricle, the sound leakage in the far-field leakage generated by the dual-point sound source may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two point sound sources of the dual-point sound source, the sound transmitted from the sound source to the far-field may be effectively reduced, that is, the sound leakage from the sound source to the surroundings may be effectively reduced. FIG. 21 is a graph illustrating a change of a normalized parameter along with a frequency when two point sound sources of a dual-point sound source of an acoustic output device are disposed on two sides of an auricle according to some embodiments of the present disclosure. As shown in FIG. 21, when the frequency is less than 10000 Hz, the normalized parameter when two point sound sources of the dual-point sound source are distributed on both sides of the auricle may be less than the normalized parameter in the Mode 1 (in which there is no the baffle disposed between the two point sound sources of the dual-point sound source, and a distance between the two point sound sources is $D_1$), a Mode 2 (in which there is no baffle disposed between the two point sound sources of the dual-point sound source, and the distance between the two point sound sources is $D_2$), or a single point sound source, which may indicate that when the two point sound sources of the dual-point sound source are disposed on the two sides of the auricle, the acoustic output device may have a better capability to reduce the sound leakage.

In order to further explain an effect on the acoustic output of the acoustic output device 100 with or without a baffle between two point sound sources of a dual-point sound source or two guiding holes, a volume of a sound at the hearing position in a near-field and/or a volume of sound leakage in a far-field leakage under different conditions may be described below.

Figure 22:
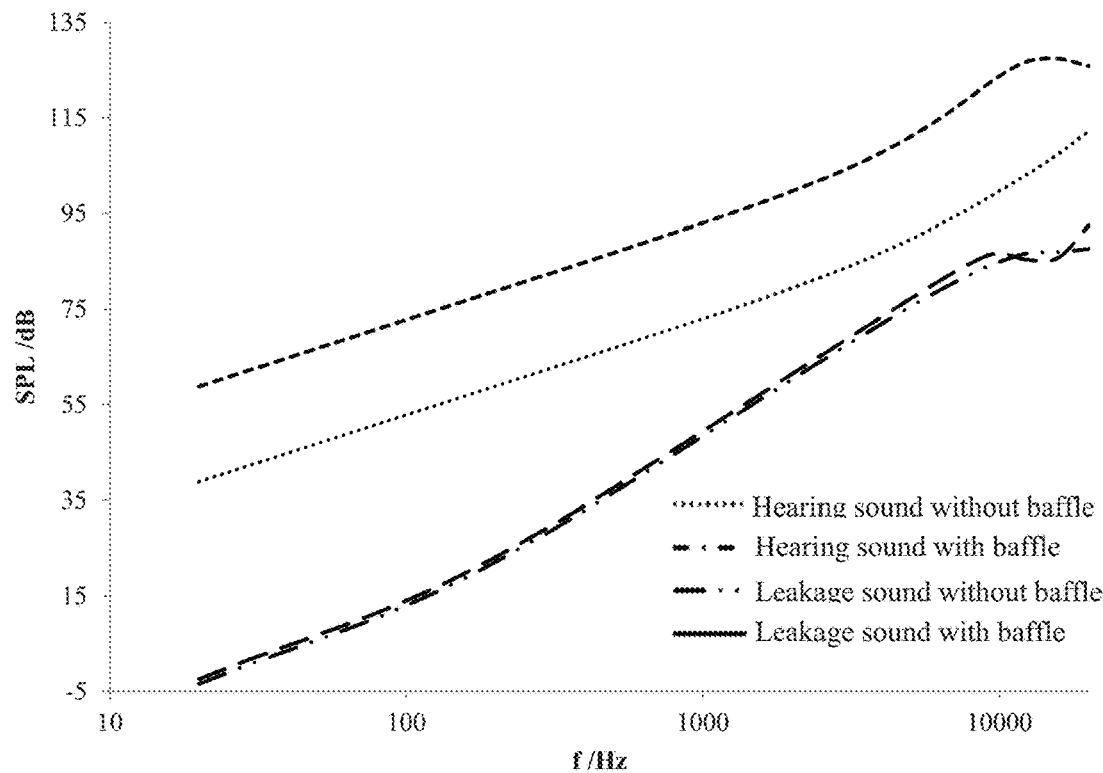
FIG. 22 is a graph illustrating a change of a volume of hearing sound and a volume of leakage sound along with a frequency with and without a baffle between two point sound sources of a dual-point sound source according to some embodiments of the present disclosure.

FIG. 22 is a graph illustrating a change of a volume of hearing sound and a volume of leakage sound along with a frequency with and without a baffle between two point sound sources of a dual-point sound source according to some embodiments of the present disclosure. As shown in FIG. 22, when the baffle is disposed between the two point sound sources of the dual-point sound source (i.e., two guiding holes) of the acoustic output device, a distance between the two point sound sources of the dual-point sound source may be increased in the near-field, and the volume of the sound at the hearing position in the near-field may be equivalent to being generated by dual-point sound source with a relatively large distance, thereby increasing the volume of the sound in the near-field compared to a case without the baffle. In the far-field, the interference of sound waves generated by the dual-point sound source may be not significantly affected by the baffle, the sound leakage may be regarded as being generated by a set of dual-point sound source with a relatively small distance, and the sound leakage may be not changed significantly with or without the baffle. The baffle disposed between the two guiding holes (the dual-point sound source) may improve the performance of the acoustic output device by reducing the sound leakage, and increase the volume of the sound in the near-field, thereby reducing requirements for a component that plays an acoustic role in the acoustic output device, reducing the electrical loss of the acoustic output device, and prolonging a working time of the acoustic output device.

Figure 23:
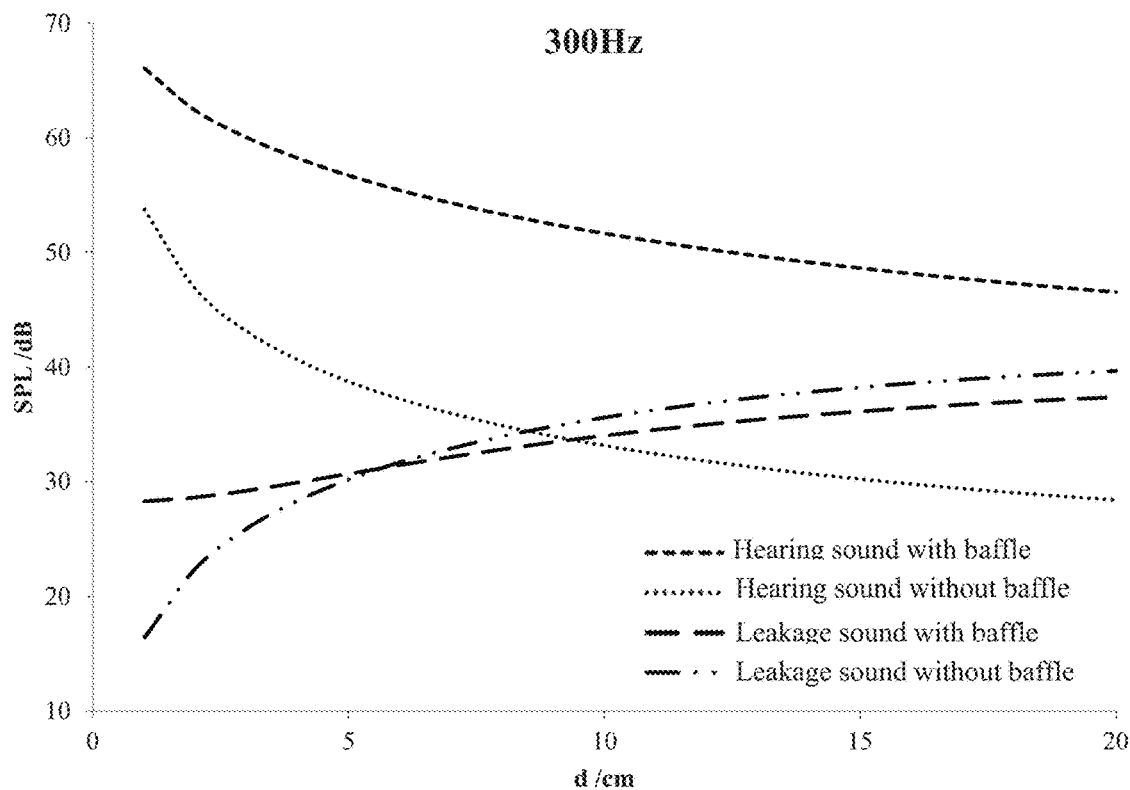
FIG. 23 is a graph illustrating changes of a volume of a hearing sound and a volume of a leakage sound along with a distance between two point sound sources of a dual-point sound source at a frequency of 300 Hz and with or without a baffle according to some embodiments of the present disclosure.
Figure 24:
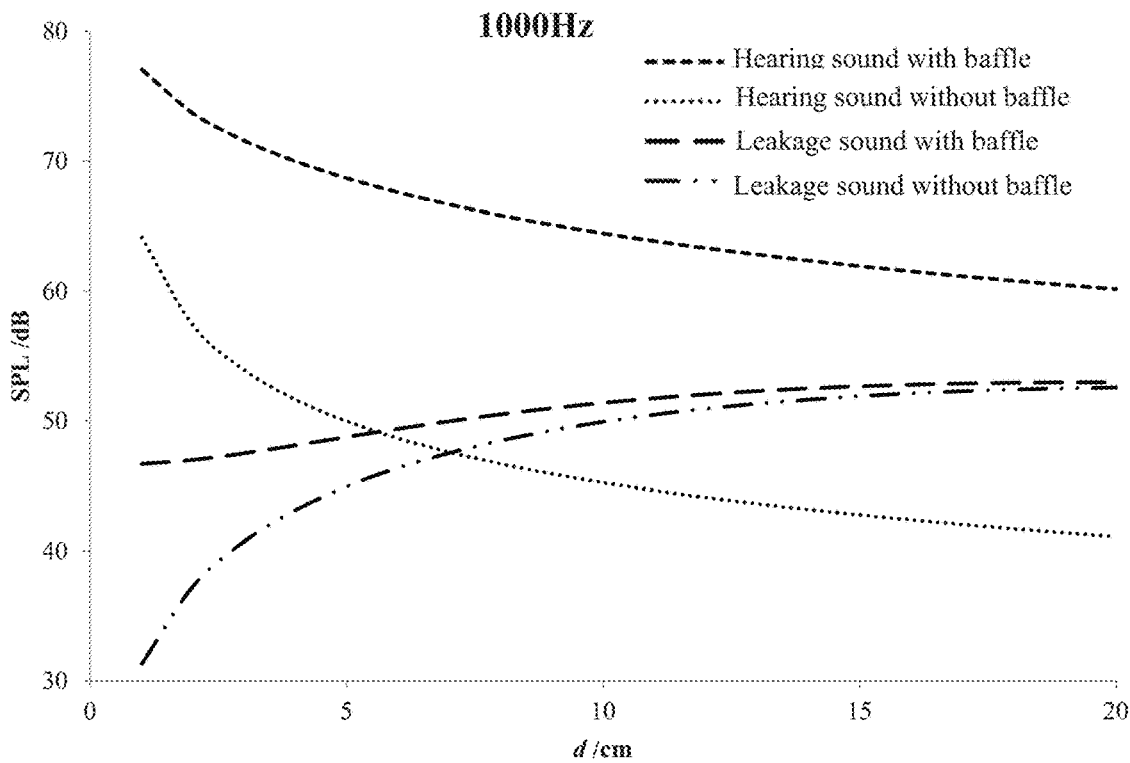
FIG. 24 is a graph illustrating changes of a volume of a hearing sound and a volume of a leakage sound along with a distance between two point sound sources of a dual-point sound source at a frequency of 1000 Hz and with or without a baffle according to some embodiments of the present disclosure.

FIG. 23 is a graph illustrating changes of a volume of a hearing sound and a volume of a leakage sound along with a distance between two point sound sources of a dual-point sound source at a frequency of 300 Hz and with or without a baffle according to some embodiments of the present disclosure. FIG. 24 is a graph illustrating changes of a volume of a hearing sound and a volume of a leakage sound along with a distance between two point sound sources of a dual-point sound source at a frequency of 1000 Hz and with or without a baffle according to some embodiments of the present disclosure. As shown in FIG. 23 and FIG. 24, in the near-field, when the frequency is 300 Hz or 1000 Hz, a volume of a heard sound when a baffle is disposed between the two point sound sources of the dual-point sound source is greater than a volume of a heard sound when the baffle is not disposed between the two point sound sources of the dual-point sound source as the distance d of the dual-point sound source is increased. In this case, the baffle disposed between the two point sound sources of the dual-point sound source may effectively increase the volume of the heard sound in the near-field when the frequency is 300 Hz or 1000 Hz. In a far-field, a volume of a leakage sound when the baffle is disposed between the two point sound sources of the dual-point sound source may be equivalent to (or substantially equivalent to) a volume of the leakage sound when the baffle is not disposed between the two point sound sources of the dual-point sound source, which may show that the baffle disposed between the two point sound sources of the dual-point sound source may not affect on the sound leakage in the far-field when the frequency is 300 Hz or 1000 Hz.

Figure 25:
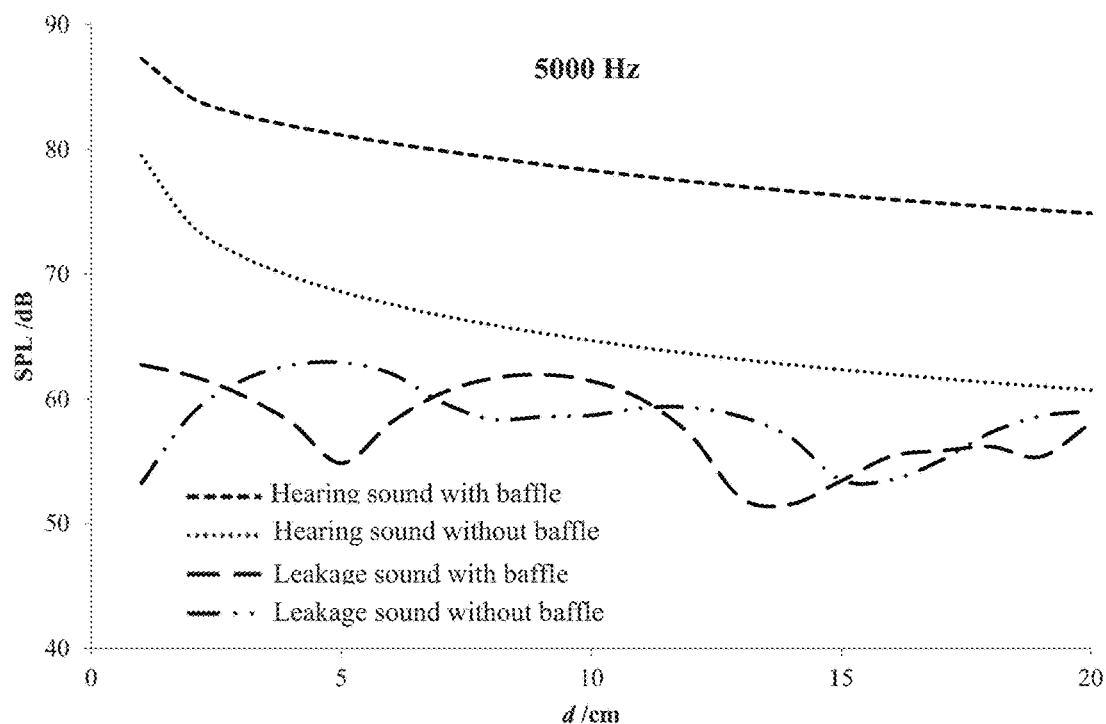
FIG. 25 is a graph illustrating changes of a volume of a hearing sound and a volume of a leakage sound along with a distance between two point sound sources of a dual-point sound source at a frequency of 5000 Hz and with or without a baffle according to some embodiments of the present disclosure.

FIG. 25 is a graph illustrating changes of a volume of a hearing sound and a volume of a leakage sound along with a distance between two point sound sources of a dual-point sound source at a frequency of 5000 Hz and with or without a baffle according to some embodiments of the present disclosure. As shown in FIG. 25, in the near-field, when the frequency is 5000 Hz, a volume of a heard sound when a baffle is disposed between the two point sound sources of the dual-point sound source is greater than a volume of a heard sound when the baffle is disposed between the two point sound sources of the dual-point sound source as the distance d of the dual-point sound source is increased. In the far-field, a volume of a leakage sound of the dual-point sound source may be fluctuant as a function of the distance d when the baffle is disposed and not disposed between the two point sound sources of the dual-point sound source. Overall, whether the baffle is disposed between the two point sound sources of the dual-point sound source may have little effect on the sound leakage in the far-field.

Figure 26:
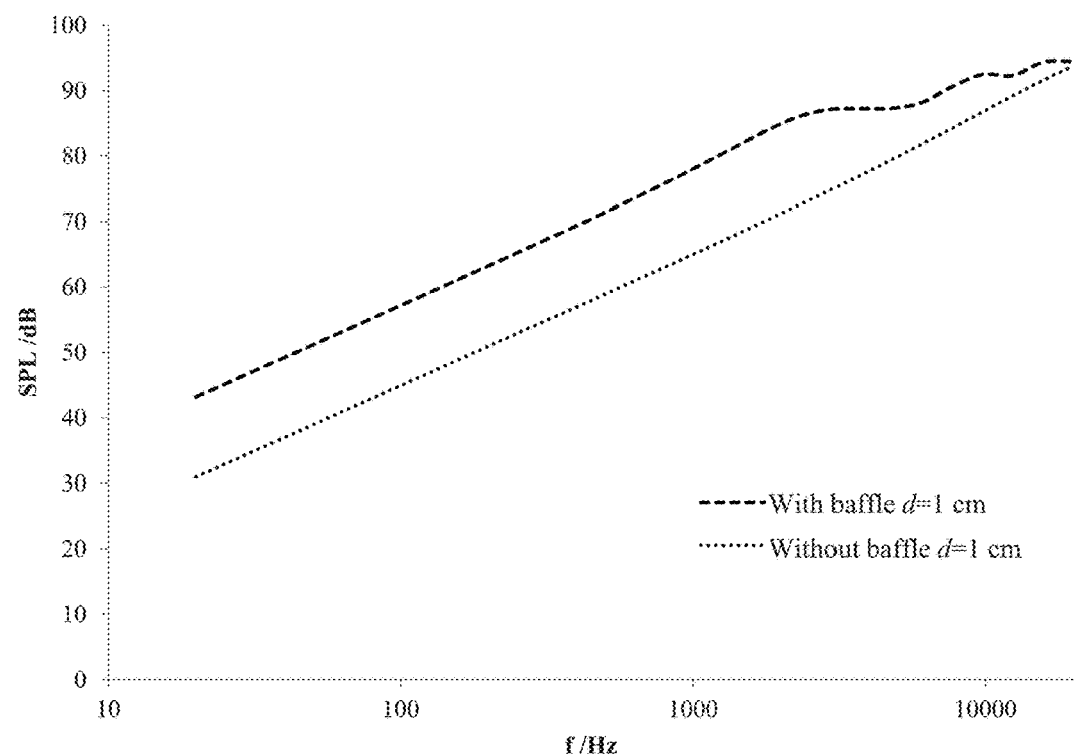
FIG. 26 is a graph illustrating a change of a volume of hearing sound along with a frequency when a distance d between two point sound sources of a dual-point sound source is 1 cm according to some embodiments of the present disclosure.
Figure 27:
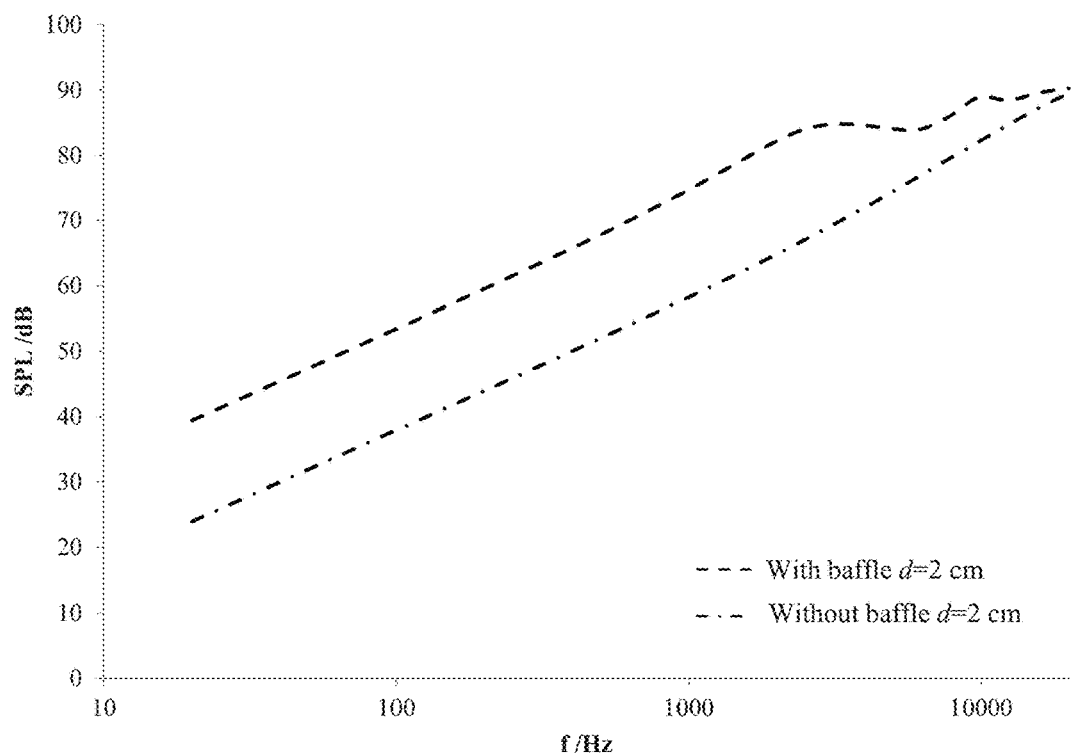
FIG. 27 is a graph illustrating a change of a volume of a hearing sound along with a frequency when a distance d between two point sound sources dual-point sound source is 2 cm according to some embodiments of the present disclosure.
Figure 28:
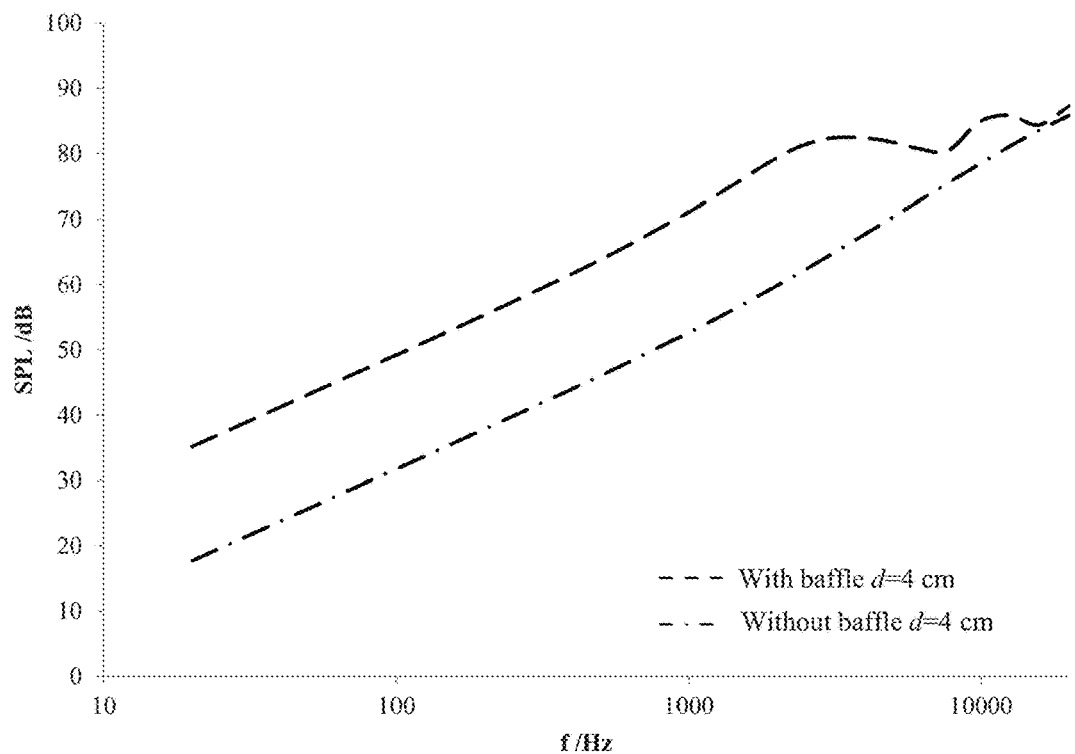
FIG. 28 is a graph illustrating a change of a volume of hearing sound along with a frequency when a distance d between two point sound sources of a dual-point sound source is 4 cm according to some embodiments of the present disclosure.
Figure 29:
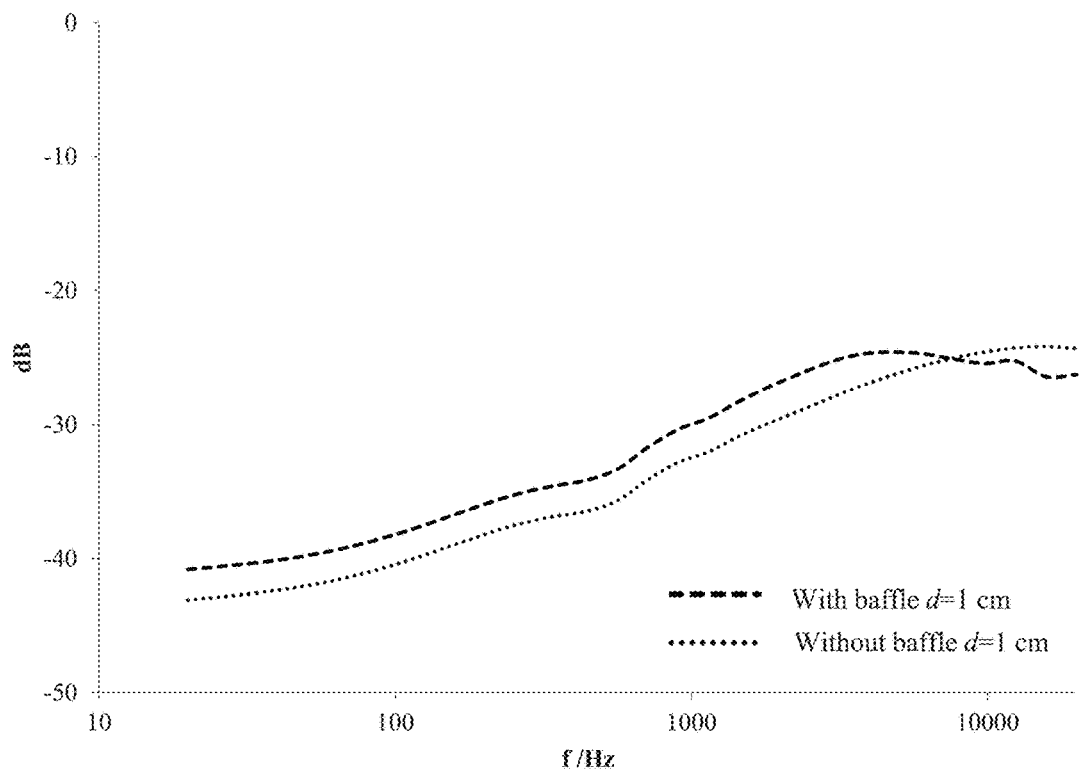
FIG. 29 is a graph illustrating a change of a normalized parameter along with a frequency when a distance d between two point sound sources of a dual-point sound source is 1 cm according to some embodiments of the present disclosure.
Figure 30:
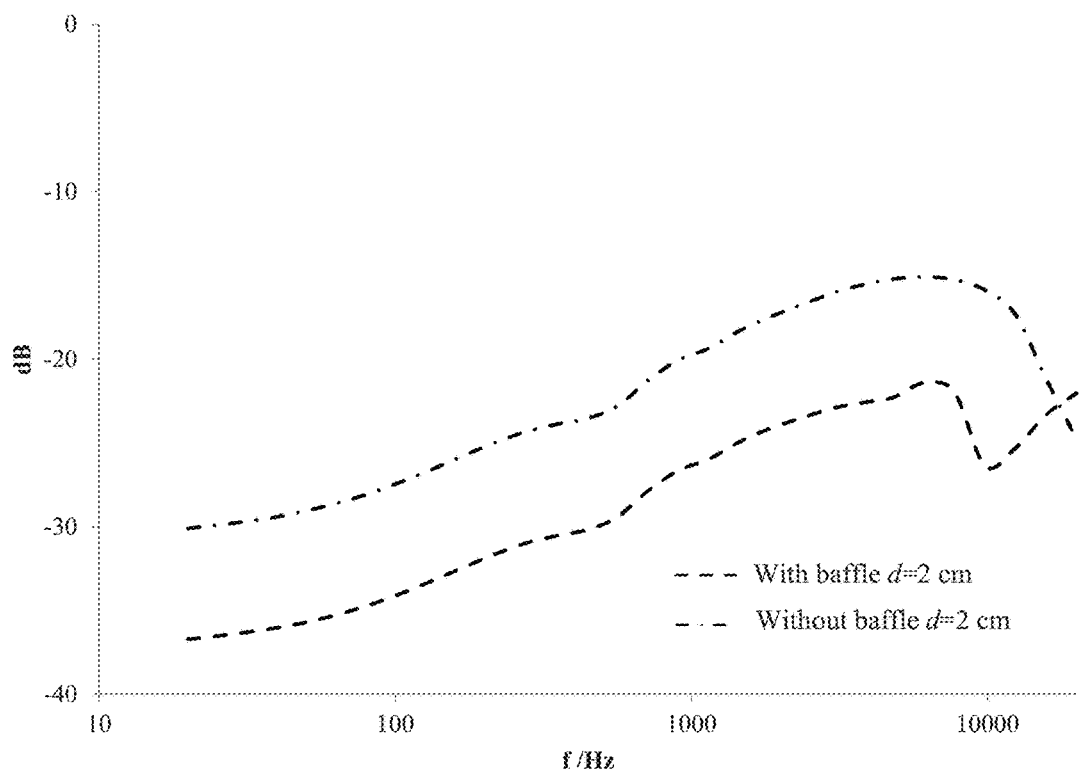
FIG. 30 is a graph illustrating a change of a normalized parameter along with a frequency when a distance d between two point sound sources of a dual-point sound source is 2 cm according to some embodiments of the present disclosure.
Figure 31:
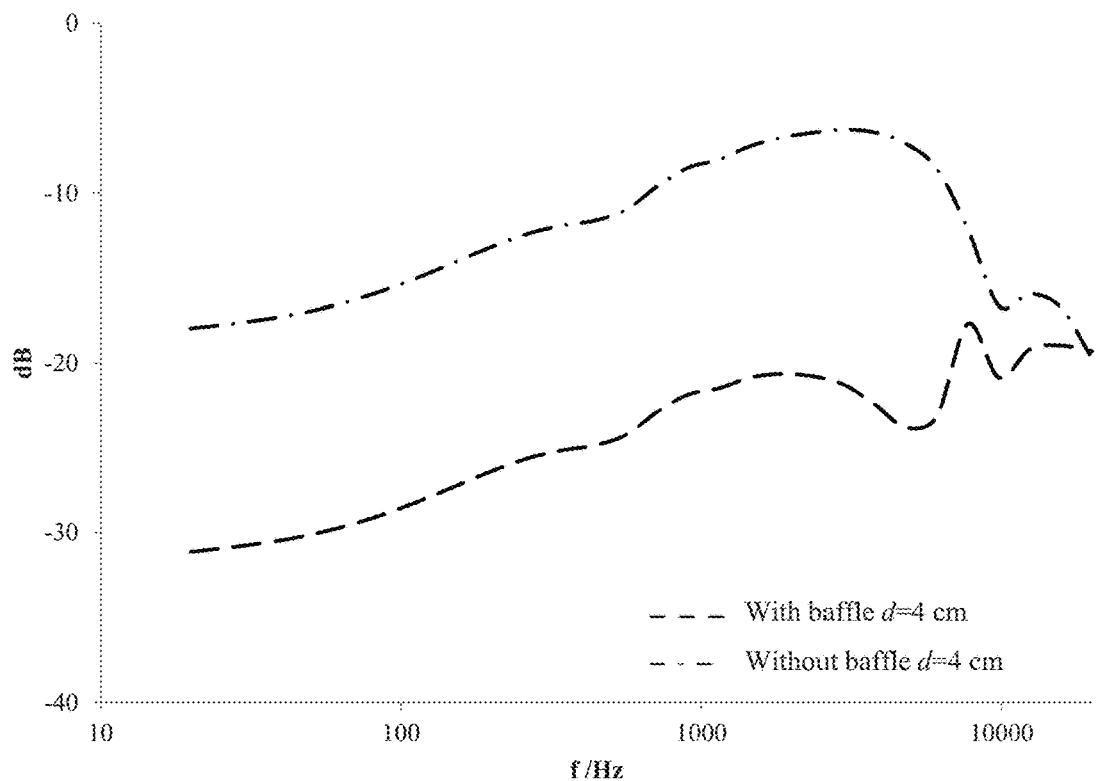
FIG. 31 is a graph illustrating a change of a normalized parameter along with a frequency when a distance d between two point sound sources of a dual-point sound source is 4 cm according to some embodiments of the present disclosure.

FIG. 26 is a graph illustrating a change of a volume of hearing sound along with a frequency when a distance d between two point sound sources of a dual-point sound source is 1 cm according to some embodiments of the present disclosure. FIG. 27 is a graph illustrating a change of a volume of a hearing sound along with a frequency when a distance d between two point sound sources dual-point sound source is 2 cm according to some embodiments of the present disclosure. FIG. 28 is a graph illustrating a change of a volume of hearing sound along with a frequency when a distance d between two point sound sources of a dual-point sound source is 4 cm according to some embodiments of the present disclosure. FIG. 29 is a graph illustrating a change of a normalized parameter along with a frequency when a distance d between two point sound sources of a dual-point sound source is 1 cm according to some embodiments of the present disclosure. FIG. 30 is a graph illustrating a change of a normalized parameter along with a frequency when a distance d between two point sound sources of a dual-point sound source is 2 cm according to some embodiments of the present disclosure. FIG. 31 is a graph illustrating a change of a normalized parameter along with a frequency when a distance d between two point sound sources of a dual-point sound source is 4 cm according to some embodiments of the present disclosure. As shown in FIG. 26 to FIG. 28, for different distance d (e.g., 1 cm, 2 cm, 4 cm) between guiding holes, at a certain frequency, in a hearing position in the near-field (e.g., an ear of a user), a volume of a sound generated by two guiding holes which may be disposed on two sides of the auricle (i.e., in the case of "without baffle" shown in FIGS. 26-28) may be greater than a volume of a sound generated by two guiding holes which may be not disposed on the two sides of the auricle. The certain frequency may be below 10000 Hz, 5000 Hz, or 1000 Hz.

As shown in FIGS. 29 to 31, for different distances d (e.g., 1 cm, 2 cm, 4 cm, etc.) between guiding holes, at a certain frequency, in far-field (e.g., a position away from an ear of a user), a volume of a leakage sound generated by the two guiding holes which may be disposed on two sides of an auricle, may be smaller than that generated by the two guiding holes which may be not disposed on two sides of the auricle. It should be noted that as the distance between the two guiding holes or two-point sound sources increases, the interference cancellation of a sound at a position in the far-field may be weakened, the sound leakage in the far-field may be increased, and the ability for reducing the sound leakage may be reduced. The distance d between the two guiding holes or the two-point sound sources may be not greater than a distance threshold. In some embodiments, the distance d between the two guiding holes may be set to be less than 20 cm to increase the volume in the near-field and reduce the sound leakage in the far-field. In some embodiments, the distance d between the two guiding holes may be set to be less than 12 cm. In some embodiments, the distance d between the two guiding holes may be set to be less than 10 cm. In some embodiments, the distance d between the two guiding holes may be set to be less than 6 cm. In some embodiments, considering a size of the acoustic output device and a structural requirement for the guiding hole(s), the distance d between the two guiding holes may be set to be no less than 1 cm and no greater than 12 cm. In some embodiments, the distance d between the two guiding holes may be set to be no less than 1 cm and no more than 10 cm. In some embodiments, the distance d between the two guiding holes may be set to be no less than 1 cm and no more than 8 cm. In some embodiments, the distance d between the two guiding holes may be set to be no less than 1 cm and no more than 6 cm. In some embodiments, the distance d between the two guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of guiding holes may be set on two sides of the baffle. The count of the plurality of guiding holes disposed on each of the two sides of the baffle may be the same or different. For example, the count of guiding holes disposed on one side of the baffle may be two, and the count of guiding holes disposed on the other side may be two or three. These modifications and changes may still be within the protection scope of the present disclosure.

Figure 32:
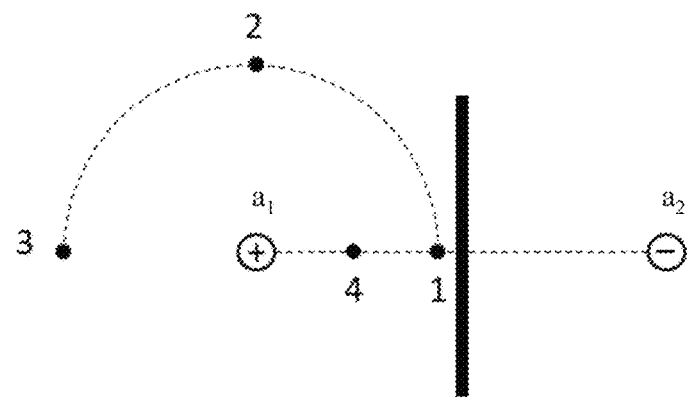
FIG. 32 is a schematic diagram illustrating exemplary hearing positions according to some embodiments of the present disclosure.

In some embodiments, for a certain distance between the two point sound sources of the dual-point sound source, a relative position of the hearing position to the dual-point sound source may affect the volume of the sound in the near-field and the sound leakage in the far-field. To improve the acoustic output performance of the acoustic output device, in some embodiments, the acoustic output device may include at least two guiding holes. The at least two guiding holes may include two guiding holes which may be disposed on a front side and/or a rear side of the auricle of a user, respectively. In some embodiments, a sound propagated from the guiding hole disposed on the rear side of the auricle may bypass the auricle to an ear canal of the user, and an acoustic route between the guiding hole disposed on the front side of the auricle and the ear canal (i.e., the acoustic distance from the guiding hole to an ear canal entrance) may be shorter than an acoustic route between the guiding hole disposed on the rear side of the auricle and the ear. FIG. 32 is a schematic diagram illustrating exemplary hearing positions according to some embodiments of the present disclosure. In order to further explain an effect of the hearing position on the acoustic output, four hearing positions (i.e., a hearing position 1, a hearing position 2, a hearing position 3, and a hearing position 4) may be selected as shown in FIG. 32, which may be used to describe the effect and criteria of the hearing positions. A distance between each of the hearing position 1, the hearing position 2, and the hearing position 3 and a point sound source a1 may be equal, which may be denoted by $r_1$. A distance between the hearing position 4 and the point sound source a1 may be denoted by $r_2$, and $r_2 < r_1$. The point sound source a1 and a point sound source a2 may generate sounds with opposite phases.

Figure 33:
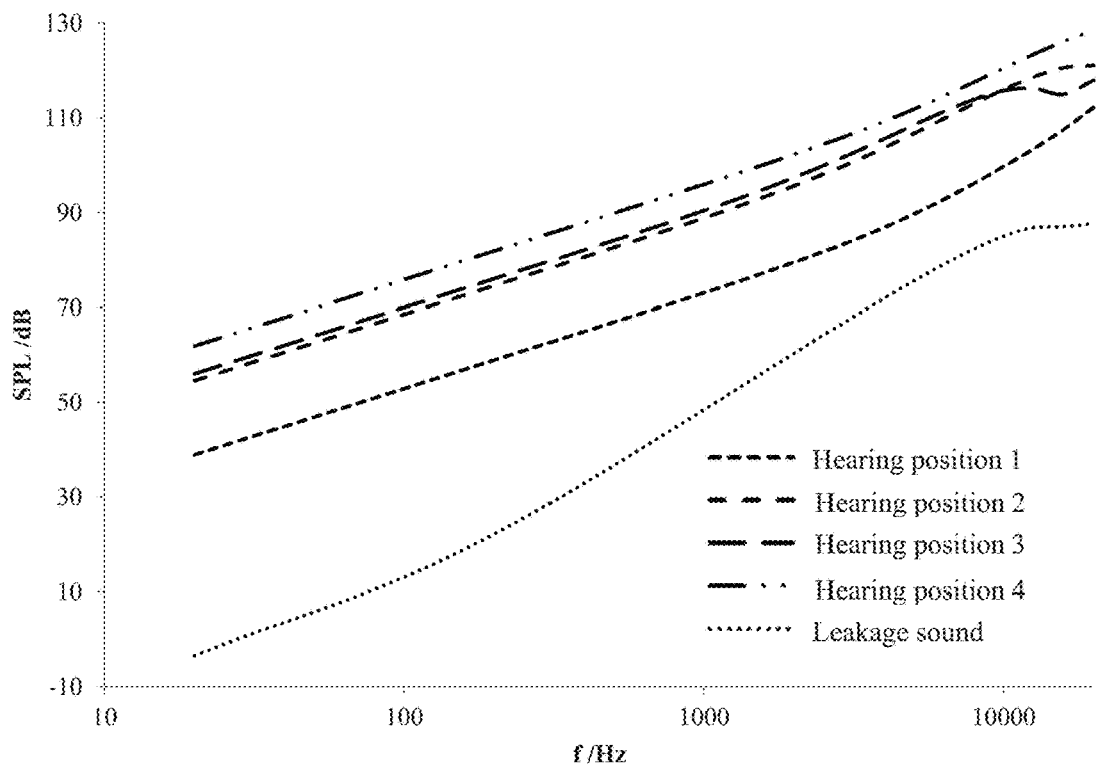
FIG. 33 is a graph illustrating a volume of hearing sound generated by a dual-point sound source without baffle at different hearing positions in a near field along with a frequency according to some embodiments of the present disclosure.
Figure 34:
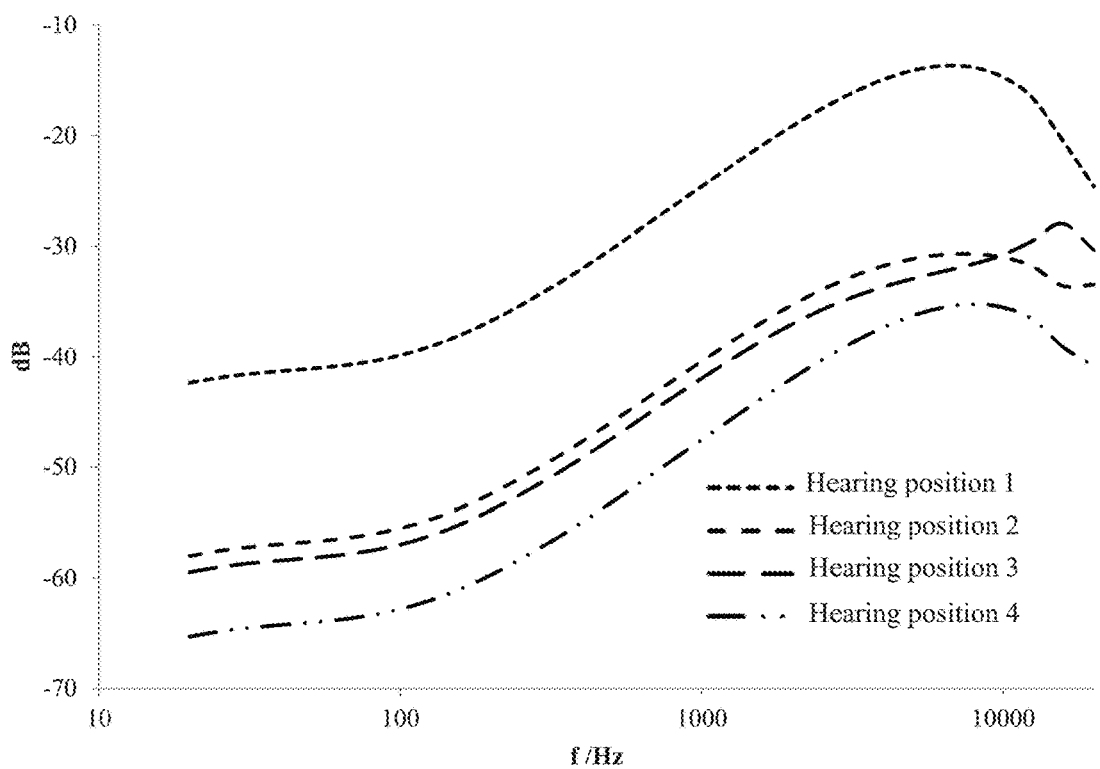
FIG. 34 is a graph illustrating a change of a normalized parameter of a dual-point sound source in a far-field along with a frequency according to some embodiments of the present disclosure.

FIG. 33 is a graph illustrating a volume of hearing sound generated by a dual-point sound source without baffle at different hearing positions in a near field along with a frequency according to some embodiments of the present disclosure. FIG. 34 is a graph illustrating a normalized parameter at different hearing positions obtained with reference to Equation (4) on the basis of FIG. 33 along with a frequency. As shown in FIGS. 33 and 34, an acoustic route difference between an acoustic route from the point sound source a1 to the hearing position 1 and an acoustic route from the point sound source a2 to the hearing position 1 is relatively small, and accordingly an interference of sounds generated by the dual-point sound source at the hearing position 1 may decrease the volume of a heard sound at the hearing position 1 to be relatively smaller than that of other hearing positions. For a hearing position 2, compared with the hearing position 1, a distance between the hearing position 2 and the point sound source a1 may be the same as that between the hearing position 1 and the point sound source a1, that is, an acoustic route from the point sound source a1 to the hearing position 2 may be the same as that from the point sound source a1 to the hearing position. A distance between the hearing position 2 and the point sound source a2 may be longer than that between the hearing position 1 and the point sound source a2, and an acoustic route from the point sound source a2 to the hearing position 2 may be greater than that from the point sound source a2 to the hearing position 1. An amplitude difference between the sound generated by the point sound source a1 and the sound generated by the point sound source a2 may be increased at the hearing position 2. Accordingly, a volume of the sound transmitted from the dual-point sound source after being interfered at the hearing position 2 may be greater than that at the hearing position 1. Among a plurality of positions on an arc with a radius of $r_1$, a difference between the acoustic route from the point sound source a1 to the hearing position 3 and the acoustic route from the point sound source a2 to the hearing position 3 may be the longer than other acoustic routes. Compared with the hearing position 1 and the hearing position 2, a volume of a heard sound at the hearing position 3 may be higher than that at other hearing positions. For the hearing position 4, a distance between the hearing position 4 and the point sound source a1 may be relatively short, a sound amplitude of a sound generated by the point sound source a1 at the hearing position 4 may be greater than the sound amplitude of the sound generated by the point sound source a1 at other hearing positions, and a volume of a heard sound at the hearing position 4 may be greater than other volumes of heard sounds at other hearing positions. In closing, the volume of the heard sound at the hearing position in the near-field may be changed when the hearing position and/or a relative position of the dual-point sound source is changed. When the hearing position (e.g., hearing position 3) is on the line between the two point sound sources of the dual-point sound source and on the same side of the dual-point sound source, the acoustic route difference between the two point sound sources of the dual-point sound source at the hearing position may be the largest (the acoustic route difference may be the distance d between the two point sound sources of the dual-point sound source). In this case (i.e., when the auricle is not used as a baffle), the volume of the heard sound at the hearing position may be greater than that at other positions. According to Equation (4), the sound leakage in the far-field is constant, the normalized parameter corresponding to the hearing position may be relatively small, and a capability for reducing the sound leakage may be relatively strong. Further, the distance $r_1$ between the hearing position (e.g., the hearing position 4) and the point sound source a1 may be decreased, thereby increasing the volume of the heard sound at the hearing position, reducing the sound leakage parameter, and improving the capability of reducing sound leakage.

Figure 35:
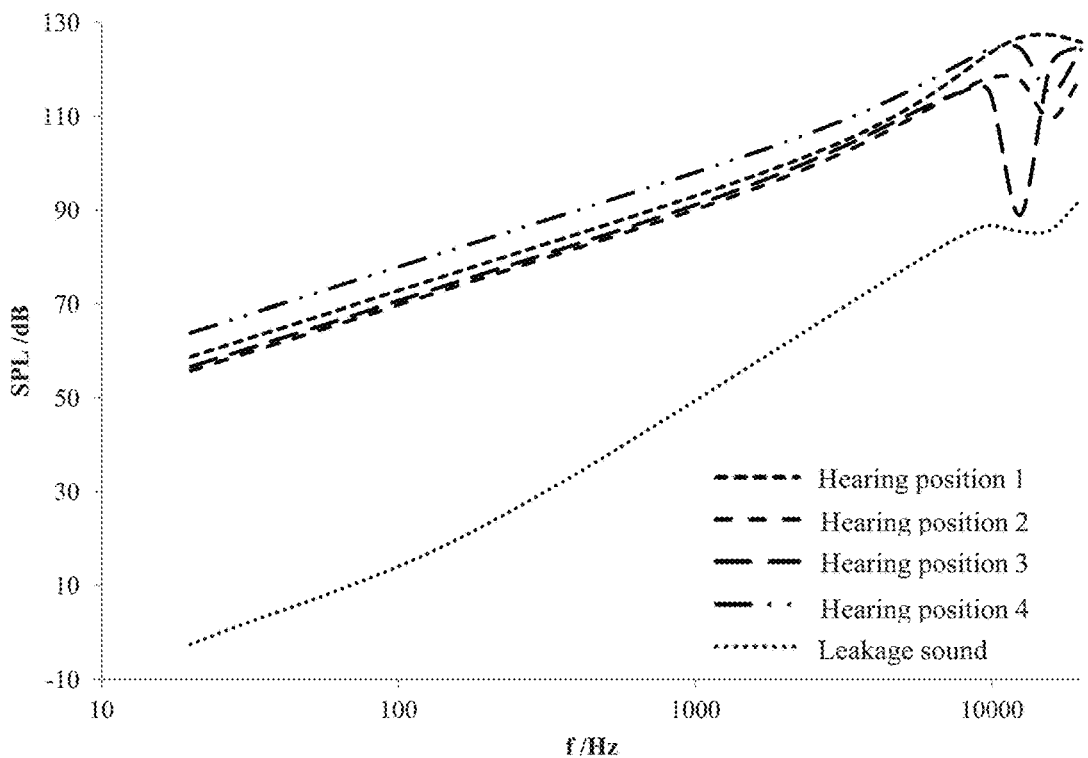
FIG. 35 is a graph illustrating a change of a volume of a hearing sound at different hearing positions in a near field of a dual-point sound source with a baffle along with a frequency according to some embodiments of the present disclosure.
Figure 36:
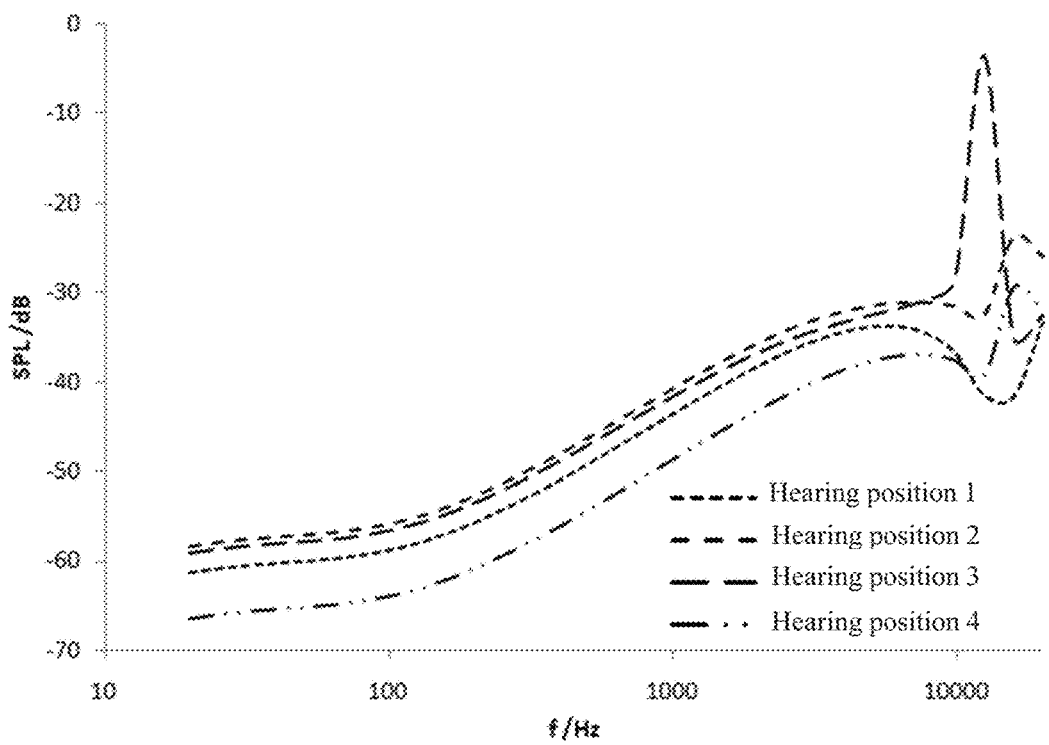
FIG. 36 is a graph illustrating a normalized parameter at different hearing positions along with a frequency according to some embodiments of the present disclosure.

FIG. 35 is a graph illustrating a change of volume of a hearing sound at different hearing positions in a near field of a dual-point sound source (e.g., the dual-point sound source shown in FIG. 32) with a baffle along with a frequency according to some embodiments of the present disclosure. FIG. 36 is a graph illustrating a normalized parameter at different hearing positions obtained with reference to Equation (4) on the basis of FIG. 35 along with a frequency. As shown in FIGS. 35 and 36, compared to a case without a baffle, a volume of a heard sound generated by the dual-point sound source at the hearing position 1 may be increased when the baffle is disposed between the two point sound sources of the dual-point sound source. The volume of the heard sound at the hearing position 1 may be greater than that at the hearing position 2 and/or the hearing position 3. An acoustic route from the point sound source a2 to the hearing position 1 may be increased when the baffle is disposed between the two point sound sources of the dual-point sound source, and accordingly, an acoustic route difference between the two point sound sources of the dual-point sound source and the hearing position 1 may be increased. An amplitude difference between the sounds generated by the dual-point sound source at the hearing position 1 may be increased, and the sound interference cancellation may be not formed, thereby increasing the volume of the heard sound generated at the hearing position 1. At the hearing position 4, a distance between the hearing position 4 and the point sound source a1 may be decreased, the sound amplitude of the point sound source a1 at the hearing position may be relatively great. The volume of the heard sound at the hearing position 4 may be greater than that at other hearing positions (i.e., the hearing position 1, the hearing position 2, and/or the hearing position 3). For the hearing position 2 and the hearing position 3, an effect of the baffle on the acoustic route from the point sound source a2 to the hearing positions may be not obvious, the increase of the volume of the heard sound at the hearing position 2 and the hearing position 3 may be less than that at the hearing position 1 and the hearing position 4 which are located close to the baffle.

The volume of leakage sound in the far-field may be not changed, and the volume of the heard sound at the hearing position in the near-field may be changed when the hearing position is changed. In this case, according to Equation (4), the normalized parameter of the acoustic output device may be different at different hearing positions. Specifically, a hearing position with a relatively large volume of the heard sound (e.g., the hearing position 1 and/or the hearing position 4) may correspond to a small normalized parameter and a strong capability for reducing the sound leakage. A hearing position with a low volume of the heard sound (e.g., the hearing position 2 and hearing position 3) may correspond to a large normalized parameter and a weak capability for reducing the sound leakage.

According to an actual application scenario of the acoustic output device, an auricle of a user may be served as the baffle. In this case, the two guiding holes on the acoustic output device may be arranged on a front side and a rear side of the auricle, respectively, and an ear canal may be located between the two guiding holes as a hearing position. In some embodiments, a distance between the guiding hole on the front side of the auricle and the ear canal may be smaller than a distance between the guiding hole on the rear side of the auricle and the ear canal by adjusting positions of the two guiding holes on the acoustic output device. In this case, the acoustic output device may produce a relatively large sound amplitude at the ear canal since the guiding hole on the front side of the auricle is close to the ear canal. The sound amplitude formed by the guiding hole on the rear side of the auricle may be smaller at the ear canal, which may avoid the interference cancellation of the sounds from the two guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two guiding holes or on one side of the line connecting the two guiding holes. And a ratio of a distance between the guiding hole disposed on the front side of the auricle and the contact point(s) and a distance between the guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 37:
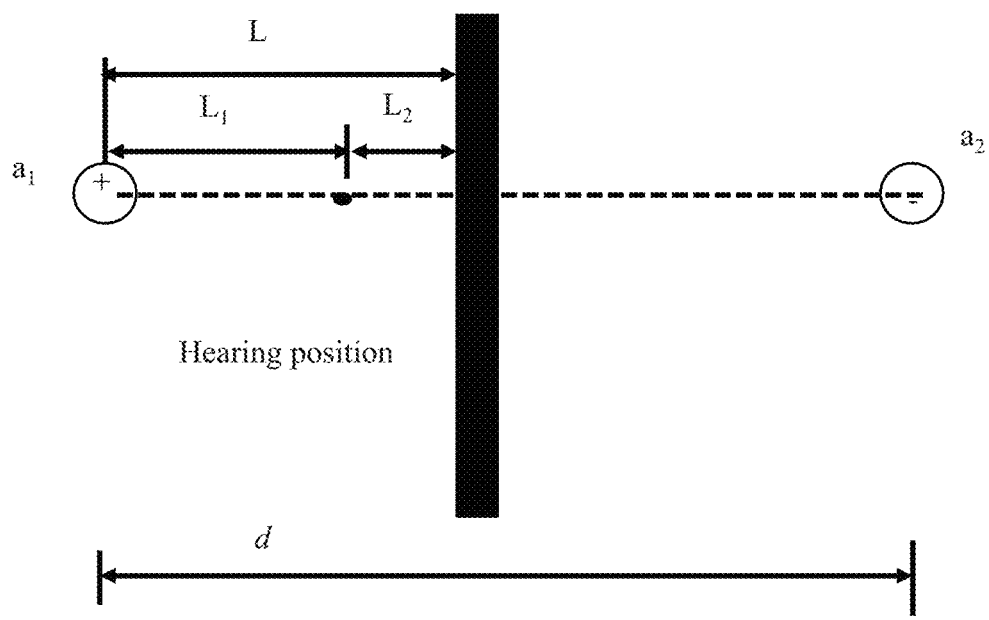
FIG. 37 is a schematic diagram illustrating a dual-point sound source and a baffle according to some embodiments of the present disclosure.

FIG. 37 is a diagram illustrating a dual-point sound source and a baffle (e.g., an auricle) according to some embodiments of the present disclosure. In some embodiments, a position of the baffle disposed between the two guiding holes may affect the acoustic output of an acoustic output device. Merely by way of example, as shown in FIG. 37, the baffle may be disposed between a point sound source a1 and a point sound source a2, a hearing position may be located on a line connecting the point sound source a1 and the point sound source a2. In addition, the hearing position may be located between the point sound source a1 and the baffle. A distance between the point sound source a1 and the baffle may be L. A distance between the point sound source a1 and the point sound source a2 may be d. A distance between the point sound source a1 and the heard sound may be $L_1$. A distance between the hearing position and the baffle may be $L_2$. When the distance $L_1$ is constant, a movement of the baffle may change a ratio of L to d, and a volume of the heard sound at the hearing position and/or a volume of a sound leakage in a far-field may be obtained.

Figure 38:
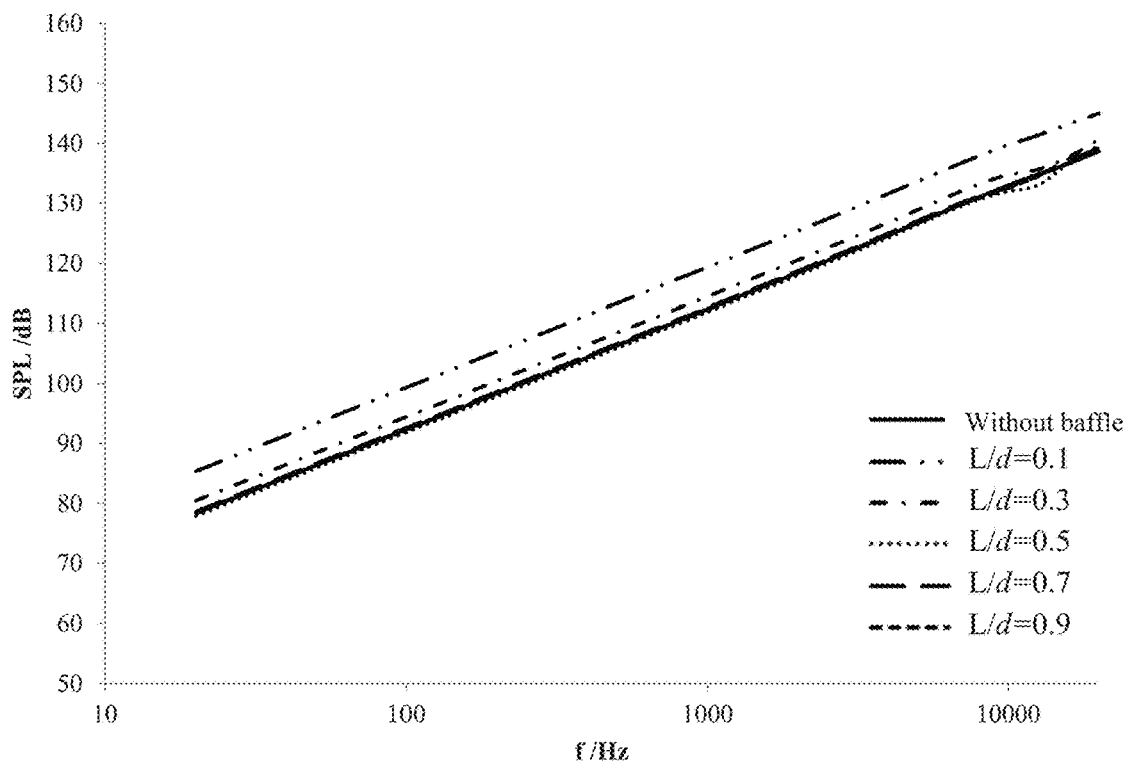
FIG. 38 is a graph illustrating a change of a volume of a sound in a near-field along with a frequency when a baffle is at different positions according to some embodiments of the present disclosure.
Figure 39:
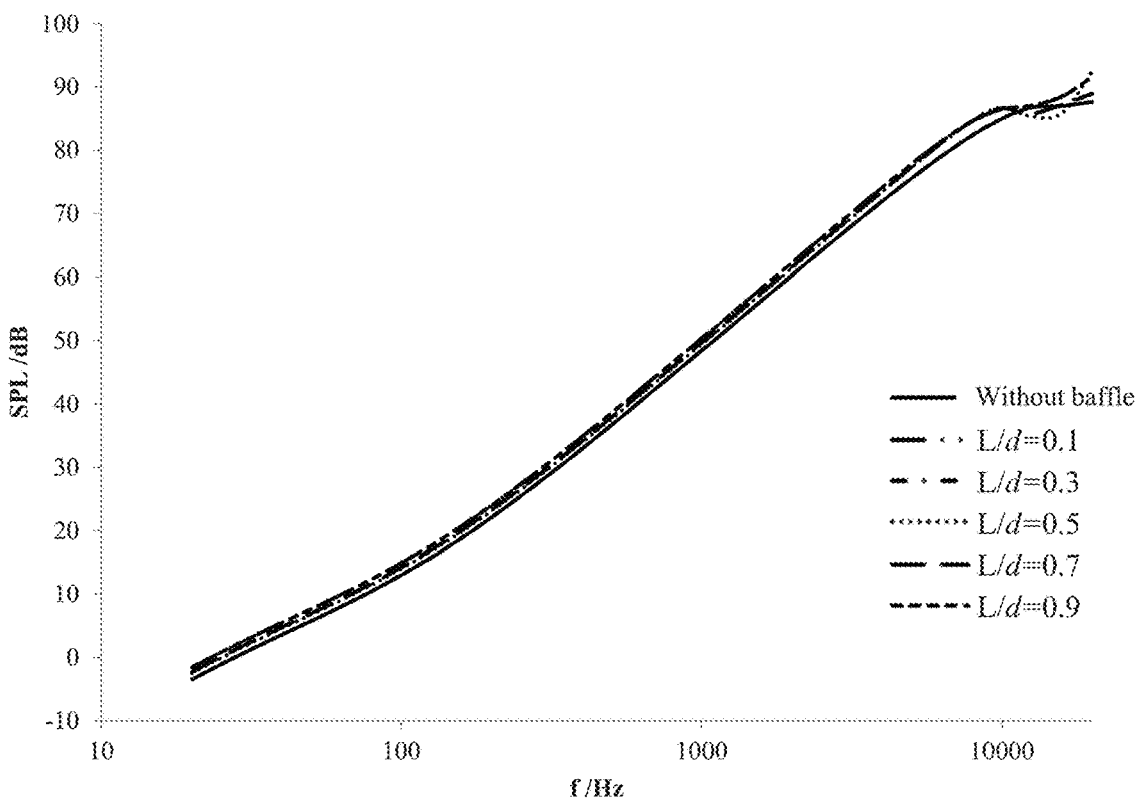
FIG. 39 is a graph illustrating a change of a volume of a leakage sound in a far-field along with a frequency when a baffle is at different positions according to some embodiments of the present disclosure.
Figure 40:
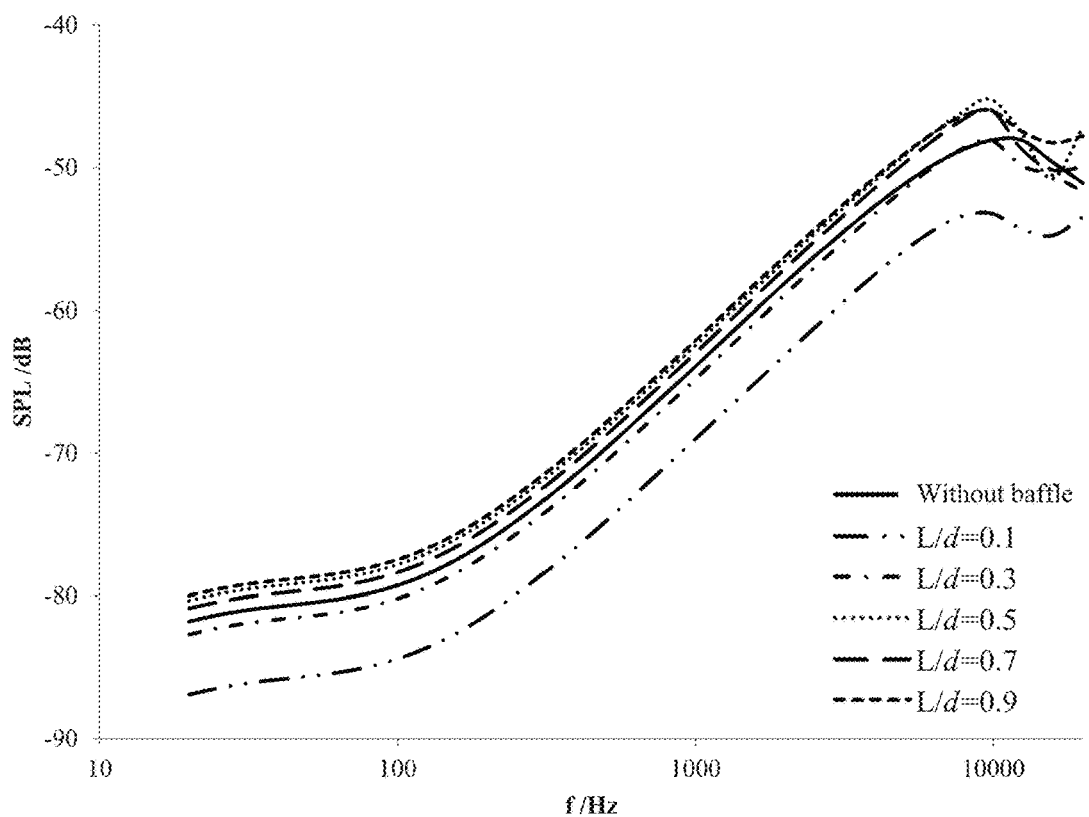
FIG. 40 is a graph illustrating a change of a normalized parameter along with a frequency when a baffle is at different positions according to some embodiments of the present disclosure.

FIG. 38 is a graph illustrating a change of a volume of a sound in a near-field along with a frequency when a baffle is at different positions according to some embodiments of the present disclosure. FIG. 39 is a graph illustrating a change of a volume of a leakage sound in a far-field along with a frequency when a baffle is at different positions according to some embodiments of the present disclosure. FIG. 40 is a graph illustrating a change of a normalized parameter along with a frequency when a baffle is at different positions according to some embodiments of the present disclosure. As shown in FIGS. 38-40, the sound leakage in the far-field may be not changed or a change of the sound leakage in the far-field may be less than a sound threshold when the position of the baffle is changed between the two point sound sources of the dual-point sound source. When a distance d between the point sound source a1 and the point sound source a2 is constant, when L is decreased, a volume of a sound at a hearing position may be increased, the normalized parameter may be decreased, and the capability for reducing sound leakage may be enhanced. When L increases, the volume at the hearing position may be increased, the normalized parameter may be increased, and the capability for reducing the sound leakage may be weakened. When L is relatively small, the hearing position may be close to the baffle, an acoustic route of a sound wave from the point sound source a2 to the hearing position may be increased in the existence of the baffle. In this case, an acoustic route difference between an acoustic route from the point sound source a1 to the hearing position and an acoustic route from the point sound source a2 to the hearing position may be increased and the interference cancellation of the sound may be reduced. The volume of the sound at the hearing position may be increased in the existence of the baffle. When L is relatively large, the hearing position may be far away from the baffle. The baffle may not affect (or barely affect) the acoustic route difference. The volume at the hearing position may be not changed when the baffle is added.

As described above, by adjusting positions of the guiding holes on the acoustic output device, the auricle of the user may be served as the baffle to separate guiding holes when the user wears the acoustic output device. In this case, the structure of the acoustic output device may be simplified, and the output effect of the acoustic output device may be further improved. In some embodiments, the positions of the two guiding holes may be determined so that a ratio of a distance between the guiding hole on the front side of the auricle and the auricle (or a contact point on the acoustic output device for contact with the auricle) to a distance between the two guiding holes may be less than or equal to 0.5 when the user wears the acoustic output device. In some embodiments, the ratio of the distance between the guiding hole on the front side of the auricle and the auricle to the distance between the two guiding holes may be less than or equal to 0.3. In some embodiments, the ratio of the distance between the guiding hole on the front side of the auricle and the auricle to the distance between the two guiding holes may be less than or equal to 0.1. In some embodiments, the ratio of the distance between the guiding hole on the front side of the auricle and the auricle to the distance between the two guiding holes may be larger than or equal to 0.05. In some embodiments, a ratio of the distance between the two guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a guiding hole in the acoustic output device may affect the volume of the sound in the near-field and sound leakage in the far-field. The acoustic route may be changed by adjusting a length of a chamber between a vibration diaphragm in the acoustic output device and the guiding hole. In some embodiments, the acoustic driver may include the vibration diaphragm. A front side and a rear side of the vibration diaphragm may be coupled to two guiding holes through a front chamber and a rear chamber, respectively. The acoustic route from the vibration diaphragm to each of the two guiding holes may be different. In some embodiments, a ratio of the acoustic route from the vibration diaphragm to one of the two guiding holes to the acoustic route from the vibration diaphragm to another of the two guiding holes may be 0.5-2. In some embodiments, the ratio may be 0.6-1.5. In some embodiments, the ratio may be 0.8-1.2.

In some embodiments, when the two guiding holes transmit the sounds with opposite phases, amplitudes of the sounds may be adjusted to improve the output performance of the acoustic output device. Specifically, the amplitude of the sound transmitted by each of the two guiding holes may be adjusted by adjusting an impedance of an acoustic route between the guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two guiding holes may be adjusted to change the acoustic resistance of the acoustic route. In some embodiments, a ratio of acoustic impedance between the acoustic driver (e.g., the vibration diaphragm of the acoustic driver) and the two guiding holes may be 0.5-2. In some embodiments, the ratio of the acoustic impedance between the acoustic driver and the two guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output device without departing from this principle. For example, the hearing position may not be on the line connecting the dual-point sound source, but may also be above, below, or in an extension direction of the line connecting the dual-point sound source. As another example, a method for measuring the distance between a point sound source and the auricle, and a method for measuring the height of the auricle may also be adjusted according to different conditions. These similar changes may be all within the protection scope of the present disclosure.

Figure 41:
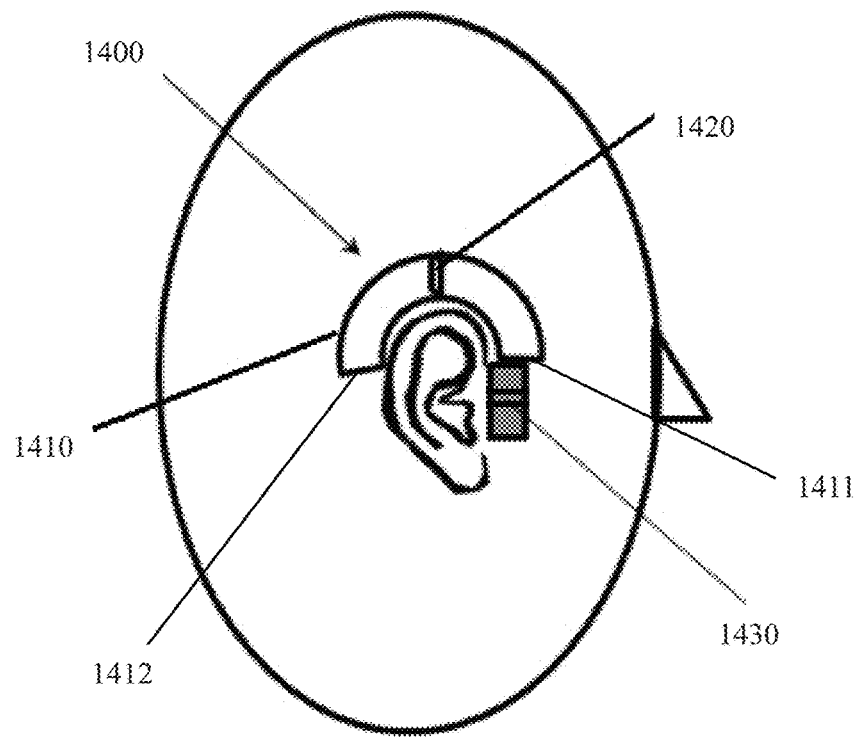
FIG. 41 is a schematic diagram illustrating an exemplary acoustic output device according to some embodiments of the present disclosure.

FIG. 41 is a schematic diagram illustrating an exemplary acoustic output device according to some embodiments of the present disclosure.

For a human ear, a frequency band of a sound that can be heard may be in a middle-low-frequency band. An optimization goal of the acoustic output device in the mid-low-frequency bands may be to increase a volume of a heard sound. When a hearing position is fixed, parameters of the dual-point sound source may be adjusted to increase the volume of the heard sound and not increase a volume of a leakage sound (e.g., an increase of the volume of the heard sound may be greater than an increase of the volume of the leakage sound). In a high-frequency band, a sound leakage of the dual-point sound source may be not decreased significantly. In the high-frequency band, an optimization goal of the acoustic output device may be reducing the sound leakage. The sound leakage may be further reduced and a leakage-reducing frequency band may be expanded by adjusting the parameters of the dual-point sound source of different frequencies. In some embodiments, the acoustic output device 1400 may include an acoustic driver 1430. The acoustic driver 1430 may output sound through two of the second guiding holes. More descriptions regarding the acoustic driver 1430, the second guiding holes, and a structure therebetween may be described with reference to the acoustic driver 1420 and/or the first guiding holes and the relevant descriptions thereof. In some embodiments, the acoustic driver 1430 and the acoustic driver 1420 may output sounds with different frequencies, respectively. In some embodiments, the acoustic output device 1400 may include a controller configured to cause the acoustic driver 1420 to output a sound within a first frequency range and cause the acoustic driver 1430 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1420 may be a low-frequency speaker, and the acoustic driver 1030 may be a middle-high-frequency speaker. Due to different frequency response characteristics of the low-frequency speaker and the middle-high-frequency speaker, frequency bands of sounds output by the acoustic driver 1420 and the acoustic driver 1430 may be different. A high-frequency band and a low-frequency band may be divided using the low-frequency speaker and the middle-high-frequency speaker, and accordingly, a dual-point sound source with a low-frequency and a dual-point sound source with a middle-high-frequency may be constructed to output sound in the near-field output and/or reduce sound leakage in the far-field. For example, the dual-point sound source for outputting low-frequency sound may be formed when the acoustic driver 1420 outputs the low-frequency sound through the guiding hole 1411 and the guiding hole 1412 shown in FIG. 14. The dual-point sound source with low-frequency may be disposed on two sides of an auricle to increase a volume heard by an ear near the near-field. A dual-point sound source for outputting middle-high-frequency sound may be formed when the acoustic driver 1430 outputs the middle-high-frequency sound through two second guiding holes. A middle-high-frequency sound leakage may be reduced by adjusting a distance between the two second guiding holes. The dual-point sound source with middle-high-frequency may be disposed on two sides of the auricle, or the same side of the auricle. Alternatively, the acoustic driver 1420 may provide a dual-point sound source for outputting full-frequency sound through the guiding hole 1411 and the guiding hole 1412 to increase the volume of the sound in the near-field.

Further, a distance $d_2$ between the two second guiding holes may be less than a distance $d_1$ between the guiding hole 1411 and the guiding hole 1412, that is, $d_1$ may be greater than $d_2$. For illustration purposes, as shown in FIG. 17, two sets of dual-point sound sources may have a stronger sound leakage reduction capability than that of a single point sound source and that of one single set of dual-point sound source, and the two sets of dual-point sound sources may include one set of a low-frequency dual-point sound source and one set of a high-frequency dual-point sound source, and a distance between two point sound sources of each set of the dual-point sound sources may be different.

It should be noted that the guiding holes of the acoustic output device may be not limited to the two guiding holes 1411 and 1412 corresponding to the acoustic driver 1420 shown in FIG. 41 distributed on two sides of the auricle, and the two guiding holes corresponding to the acoustic driver 1430 may be distributed on the front side of the auricle. For example, in some embodiments, the two second guiding holes corresponding to the acoustic driver 1430 may be disposed on the same side of the auricle (e.g., a rear side, an upper side, or a lower side of the auricle). As another example, the two second guiding holes corresponding to the acoustic driver 1430 may be disposed on two sides of the auricle. In some embodiments, when the guiding holes 1411 and the guiding hole 1412 and/or the two second guiding holes are disposed on the same side of the auricle, a baffle may be disposed between the guiding holes 1411 and the guiding hole 1412 and/or the two second guiding holes to further increase the volume of the sound in the near-field and reduce the sound leakage in the far-field. As yet another example, the two guiding holes corresponding to the acoustic driver 1420 may be disposed on the same side of the auricle (e.g., the front side, the rear side, the upper side, the lower side, etc. of the auricle).

The beneficial effects of the embodiments of the present disclosure may include but be not limited to the following. (1) A wiring manner inside the acoustic output device may be simplified; (2) A mutual influence between the wires may be reduced, thereby improving the sound quality of the acoustic output device; (3) The sound with different frequency bands may be output by setting a high-frequency dual-point sound source and a low-frequency dual-point sound source, thereby improving the quality of the output sound; (4) The leakage reduction performance of an acoustic output device may be improved by setting that two point sound sources of the dual-point sound source with different distances, thereby satisfying requirements of an open binaural acoustic output device; (5) A baffle is set to increase the length difference between acoustic routes from the two point sound sources of a dual-point sound source to a hearing sound position, thereby increasing the volume of the hearing sound in the near field, reducing the volume of the leakage sound in the far-field, and improving the quality of the output sound of the open binaural acoustic output device. It should be noted that different embodiments may have different beneficial effects. In different embodiments, the possible beneficial effects may be any one or a combination of the beneficial effects described above, or any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Furthermore, the particular features, structures or characteristics may be combined as suitable in one or more embodiments of the present disclosure.

Further, it will be appreciated by those skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

What is claimed is:

1. An acoustic output device, comprising:
   an earphone core including at least one low-frequency acoustic driver and at least one high-frequency acoustic driver, the at least one low-frequency acoustic driver configured to output sounds from at least two first guiding holes, the at least one high-frequency acoustic driver configured to output sounds from at least two second guiding holes;
   a controller configured to direct the at least one low-frequency acoustic driver to output the sounds in a first frequency range and direct the at least one high-frequency acoustic driver to output the sounds in a second frequency range, the second frequency range including one or more frequencies higher than one or more frequencies in the first frequency range;
   a power source configured to provide power supply for the earphone core;
   a flexible circuit board configured to connect the earphone core with the power source; and
   a supporting structure configured to support the at least one high-frequency acoustic driver and the at least one low-frequency acoustic driver and keep the at least two second guiding holes closer to a user's ear than the at least two first guiding holes when the user wears the acoustic output device.

2. The acoustic output device of claim 1, wherein
   a first distance is between the two first guiding holes, a second distance is between the two second guiding holes, and the first distance exceeds the second distance.

3. The acoustic output device of claim 2, wherein the first distance is not greater than 40 millimeters, and the second distance is not greater than 7 millimeters.

4. The acoustic output device of claim 2, wherein the first distance is at least twice of the second distance.

5. The acoustic output device of claim 1, wherein
   the first frequency range includes frequencies lower than 650 Hz, and the second frequency range includes frequencies higher than 1000 Hz.

6. The acoustic output device of claim 1, wherein
   the controller includes an electronic frequency division module configured to divide an audio source signal to generate a low-frequency signal corresponding to the first frequency range and a high-frequency signal corresponding to the second frequency range, the low-frequency signal driving the at least one low-frequency acoustic driver to generate the sounds in the first frequency range, and the high-frequency signal driving the at least one high-frequency acoustic driver to generate the sounds in the second frequency range.

7. The acoustic output device of claim 1, wherein
   the at least one low-frequency acoustic driver includes a first transducer,
   the at least one high-frequency acoustic driver includes a second transducer, and
   the first transducer and the second transducer have different frequency response characteristics.

8. The acoustic output device of claim 1, wherein
   at least two first acoustic routes are formed between the at least one low-frequency acoustic driver and the at least two first guiding holes,
   at least two second acoustic routes are formed between the at least one high-frequency acoustic driver and the at least two second guiding holes, and
   the at least two first acoustic routes and the at least two second acoustic routes have different frequency selection characteristics.

9. The acoustic output device of claim 1, wherein the supporting structure includes a first housing, the low-frequency acoustic driver is encapsulated by the first housing, and the first housing defines a front chamber and a rear chamber of the low-frequency acoustic driver.

10. The acoustic output device of claim 9, wherein the front chamber of the low-frequency acoustic driver is acoustically coupled to one of the at least two first guiding holes, and the rear chamber is acoustically coupled to the other first guiding hole of the at least two first guiding holes.

11. The acoustic output device of claim 1, wherein the supporting structure includes a second housing, the high-frequency acoustic driver is encapsulated by the second housing, and the second housing defines a front chamber and a rear chamber of the high-frequency acoustic driver.

12. The acoustic output device of claim 11, wherein the front chamber of the high-frequency acoustic driver is acoustically coupled to one of the at least two second guiding holes, and the rear chamber of the high-frequency acoustic driver is acoustically coupled to the other second guiding hole of the at least two second guiding holes.

13. The acoustic output device of claim 1, wherein the sounds output from the at least two first guiding holes have opposite phases.

14. The acoustic output device of claim 1, wherein
    the flexible circuit board includes one or more first bonding pads and one or more second bonding pads,
    at least one of the one or more first bonding pads is connected with at least one component of the acoustic output device,
    at least one of the one or more first bonding pads is connected with at least one of the one or more second bonding pads, and
    at least one of the one or more second bonding pads is connected with at least one component of the acoustic output device that is different from the at least one component of the acoustic output device connected with the at least one of the one or more first bonding pads.

15. The acoustic output device of claim 14, wherein at least one of the first bonding pads and at least one of the second bonding pads are connected via a flexible wire.

16. The acoustic output device of claim 14, wherein a count of the one or more second bonding pads is two.

17. The acoustic output device of claim 14, wherein at least one of the one or more second bonding pads and the controller are connected via a flexible wire.

18. The acoustic output device of claim 14, wherein at least one of the one or more first bonding pads is configured to connect the power source and the controller.

19. The acoustic output device of claim 1, wherein
    the power source includes a battery,
    the battery includes a body area and a sealing area, a thickness of the body area is greater than a thickness of the sealing area such that a stepped structure is formed between a side surface of the sealing area and a side surface of the body area.

* * * * *